United States Patent
Nishi et al.

(10) Patent No.: US 10,014,023 B2
(45) Date of Patent: Jul. 3, 2018

(54) OPTICAL MEDIUM REPRODUCING APPARATUS, OPTICAL MEDIUM REPRODUCING METHOD, AND OPTICAL MEDIUM

(71) Applicant: SONY CORPORATION, Tokyo (JP)

(72) Inventors: Noriaki Nishi, Kanagawa (JP); Kimihiro Saito, Saitama (JP); Nobuhiko Ando, Tokyo (JP); Junya Shiraishi, Nagano (JP); Yutaka Tentaku, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/505,442

(22) PCT Filed: Nov. 9, 2015

(86) PCT No.: PCT/JP2015/005581
§ 371 (c)(1),
(2) Date: Feb. 21, 2017

(87) PCT Pub. No.: WO2016/075919
PCT Pub. Date: May 19, 2016

(65) Prior Publication Data
US 2017/0270957 A1    Sep. 21, 2017

(30) Foreign Application Priority Data

Nov. 10, 2014    (JP) .................................. 2014-228410

(51) Int. Cl.
*G11B 7/00*    (2006.01)
*G11B 7/007*    (2006.01)
(Continued)

(52) U.S. Cl.
CPC ............ *G11B 7/007* (2013.01); *B29D 17/005* (2013.01); *G11B 7/00454* (2013.01);
(Continued)

(58) Field of Classification Search
None
See application file for complete search history.

(56) References Cited

U.S. PATENT DOCUMENTS

| | | | |
|---|---|---|---|
| 7,548,505 B2 * | 6/2009 | Endoh | G11B 7/007 369/275.4 |
| 8,923,105 B2 * | 12/2014 | Sano | G11B 7/005 369/44.32 |

(Continued)

FOREIGN PATENT DOCUMENTS

| | | |
|---|---|---|
| JP | 5-242512 A | 9/1993 |
| JP | 8-249664 A | 9/1996 |

(Continued)

OTHER PUBLICATIONS

International Search Report dated Feb. 2, 2016, in PCT/JP2015/005581 filed Nov. 9, 2015.

*Primary Examiner* — Peter Vincent Agustin
(74) *Attorney, Agent, or Firm* — Oblon, McClelland, Maier & Neustadt, L.L.P.

(57) ABSTRACT

Provided is an optical medium reproducing apparatus including: a detection unit that divides a luminous flux into a plurality of regions including a first region and a second region which are different in a position in a radial direction and/or a tangential direction, and combines a plurality of detection signals in correspondence with the amount of light that is incident to each of the plurality of regions with combination patterns which are selected to form signals of a plurality of channels; a multi-input equalizer unit that includes a plurality of equalizer units to which the signals of the plurality of channels are respectively supplied, computes outputs of the plurality of equalizer units, and outputs the resultant value as an equalization signal; and a binarization unit that performs binarization processing with respect to the equalization signal to obtain binary data. An addition signal (Continued)

channel including a constant multiplication of detection signals of the first region and the second region is included in at least one of the combination patterns.

18 Claims, 55 Drawing Sheets

(51) Int. Cl.
- *G11B 7/0045* (2006.01)
- *G11B 20/00* (2006.01)
- *G11B 7/26* (2006.01)
- *B29D 17/00* (2006.01)
- *G11B 7/258* (2013.01)
- *G11B 23/28* (2006.01)

(52) U.S. Cl.
  CPC .............. *G11B 7/258* (2013.01); *G11B 7/263* (2013.01); *G11B 20/00086* (2013.01); *G11B 23/281* (2013.01); *G11B 23/284* (2013.01)

(56) References Cited

U.S. PATENT DOCUMENTS

| | | | | |
|---|---|---|---|---|
| 2003/0210634 | A1* | 11/2003 | Shimizu | G11B 20/10009 369/59.12 |
| 2004/0027958 | A1* | 2/2004 | Takeuchi | G11B 7/00456 369/53.41 |
| 2006/0280240 | A1* | 12/2006 | Kikugawa | G11B 20/10009 375/229 |
| 2008/0197270 | A1* | 8/2008 | Zheng | G01J 1/44 250/208.2 |
| 2009/0175155 | A1* | 7/2009 | Nakata | G11B 7/005 369/275.3 |
| 2012/0082201 | A1 | 4/2012 | Shiraishi | |
| 2014/0341006 | A1 | 11/2014 | Miyashita et al. | |
| 2014/0341007 | A1* | 11/2014 | Sano | G11B 7/005 369/47.17 |
| 2017/0270957 | A1* | 9/2017 | Nishi | G11B 7/007 |

FOREIGN PATENT DOCUMENTS

| | | |
|---|---|---|
| JP | 8-273202 A | 10/1996 |
| JP | 2012-79385 A | 4/2012 |
| WO | 2014/054246 A1 | 4/2014 |

* cited by examiner

FIG. 13
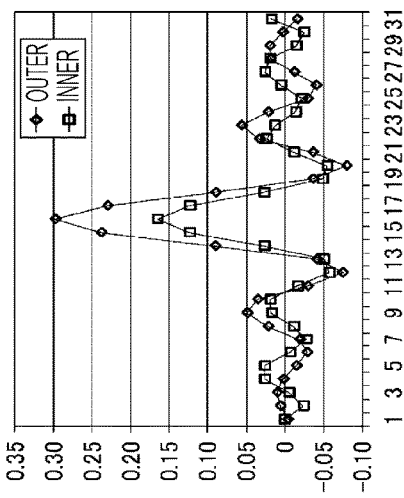
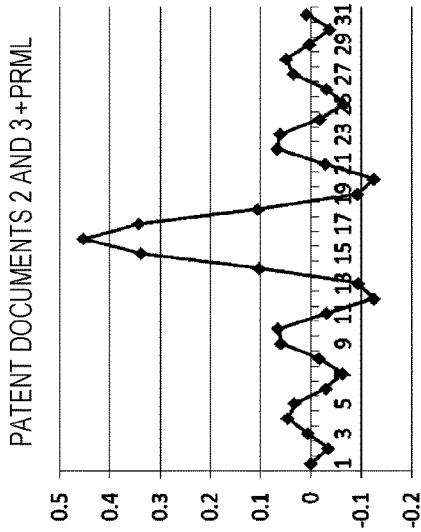
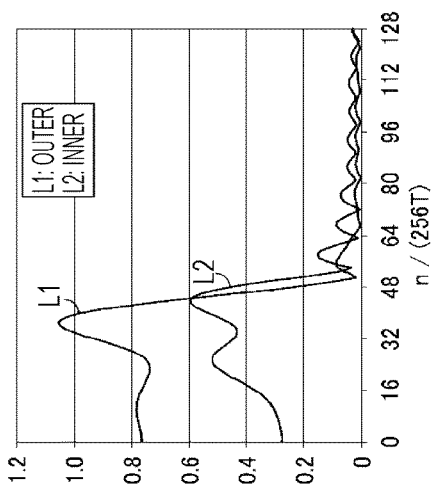
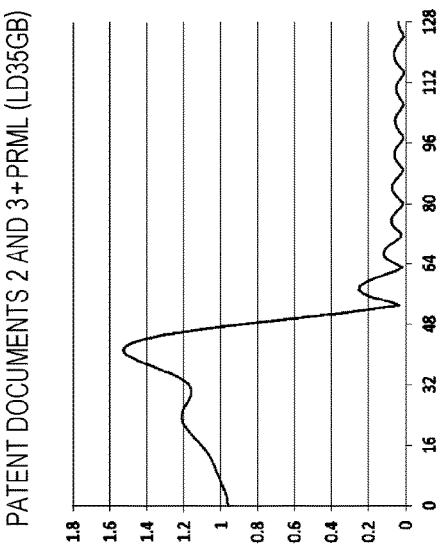

FIG. 15
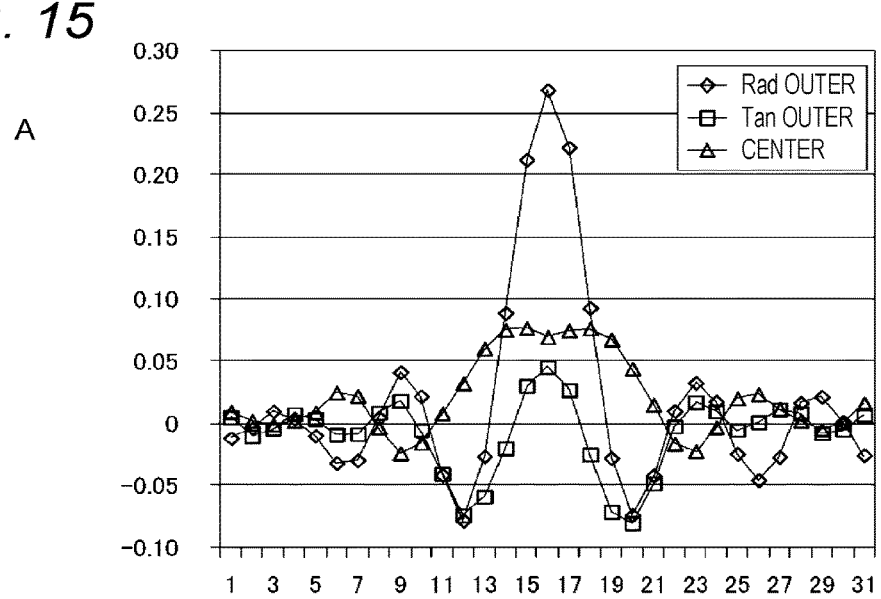
A
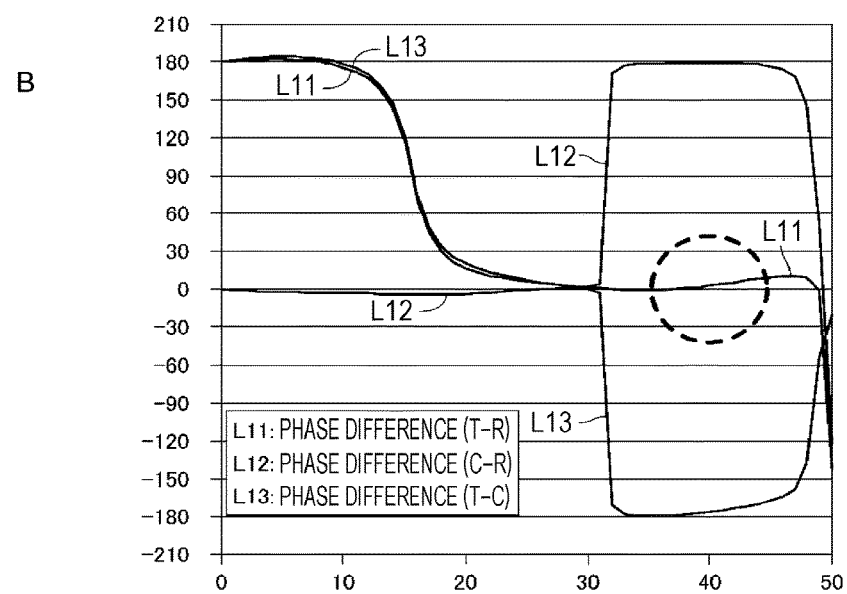
B

FIG. 17
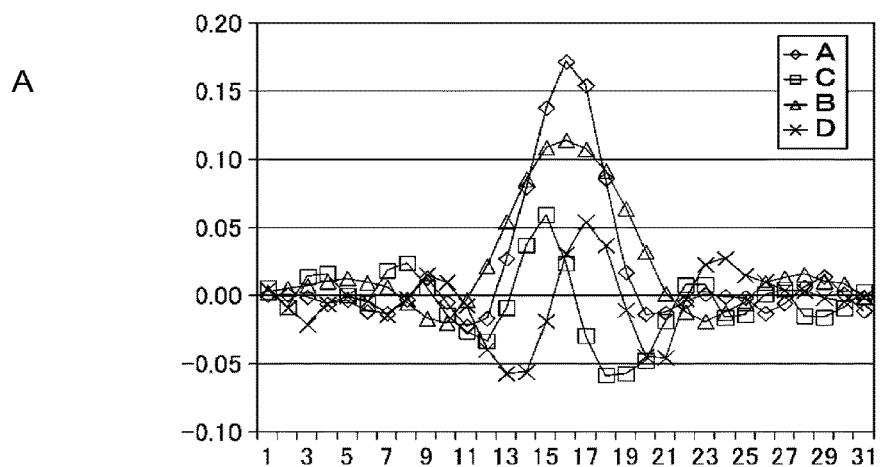
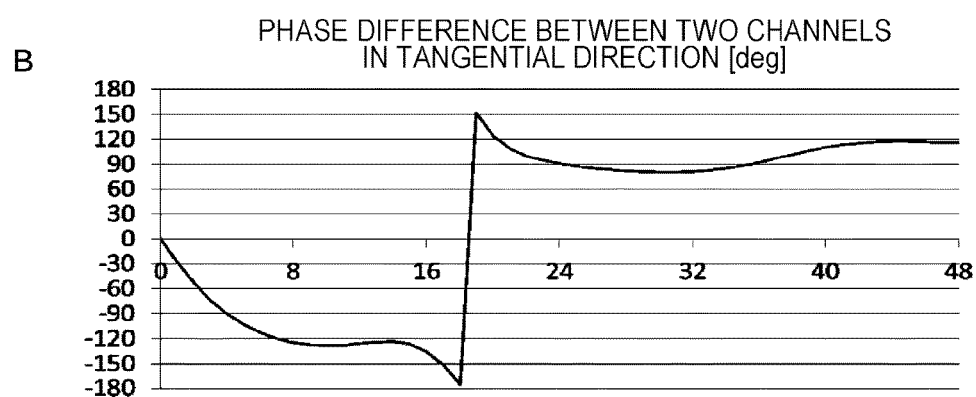

FIG. 22
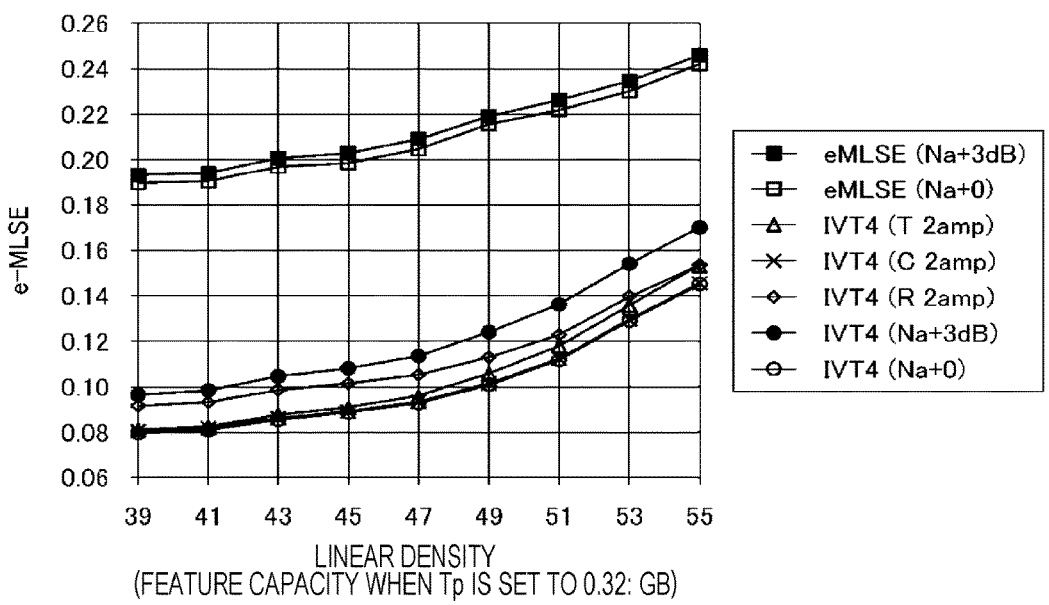
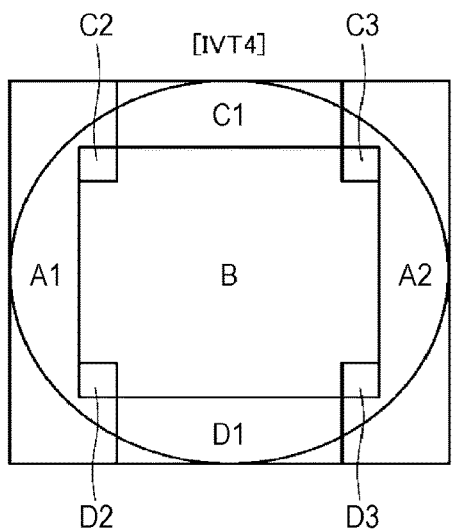

FIG. 23
A
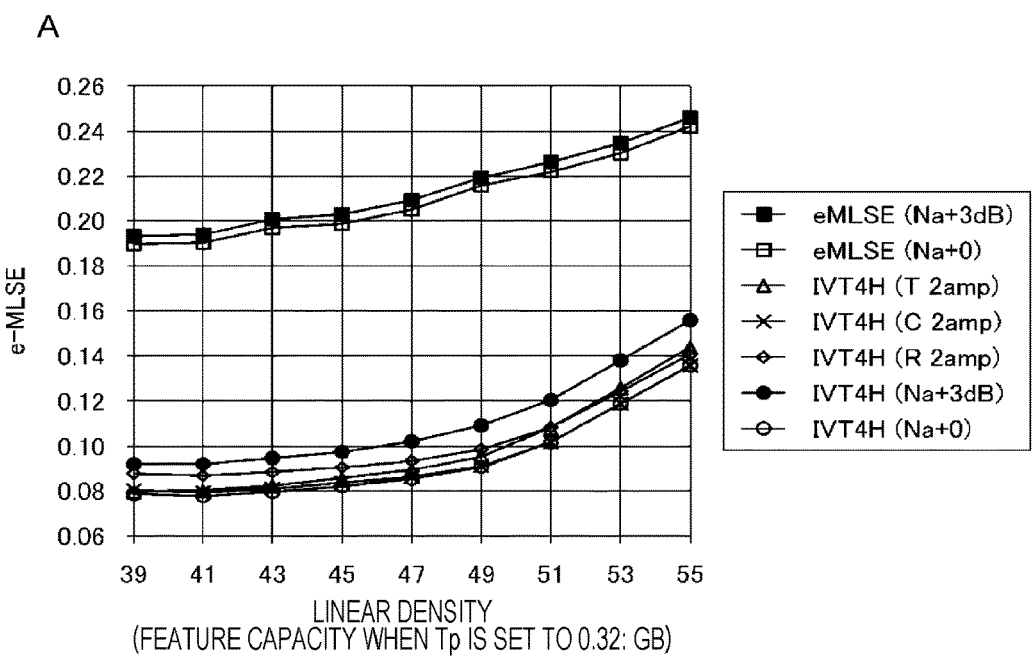
B
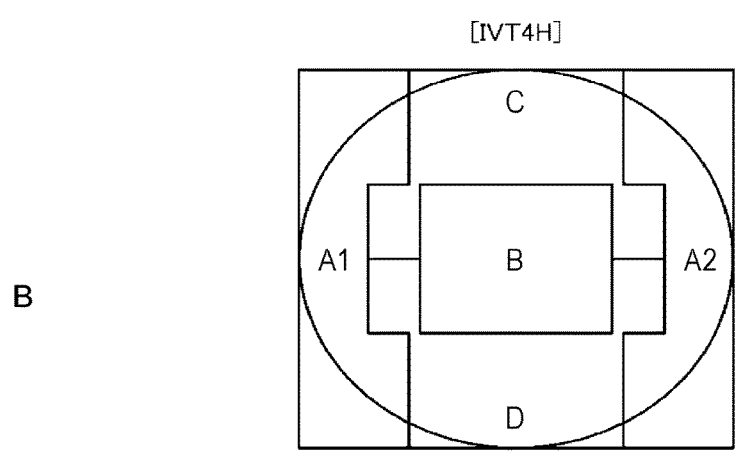

FIG. 25
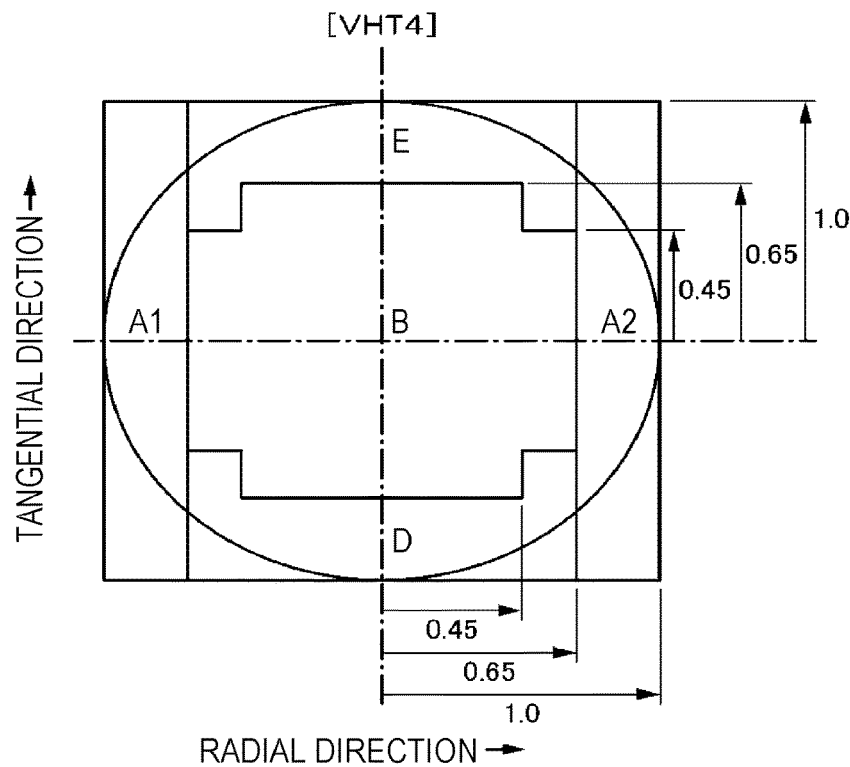
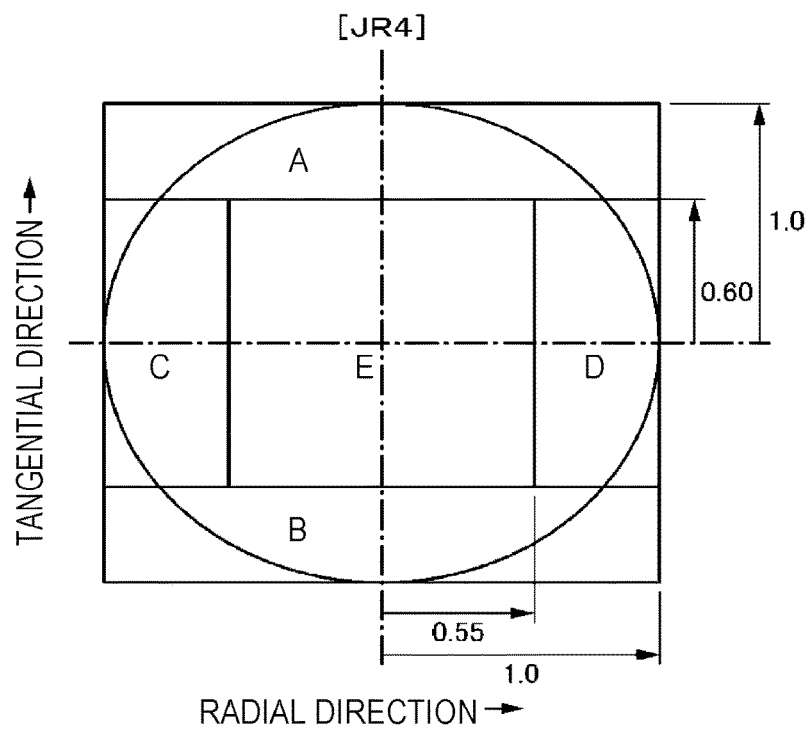

FIG. 26
A
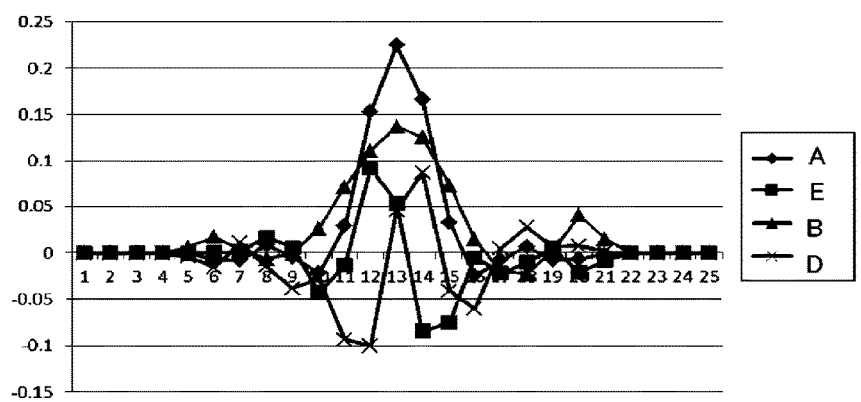
B
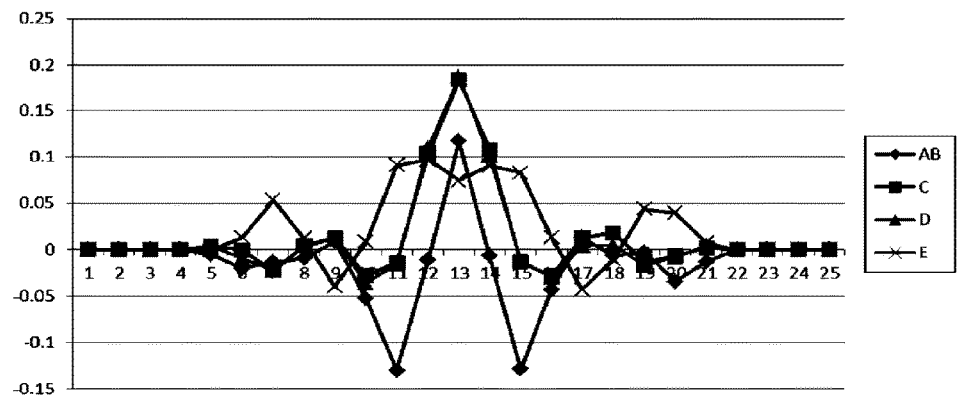

FIG. 31
A
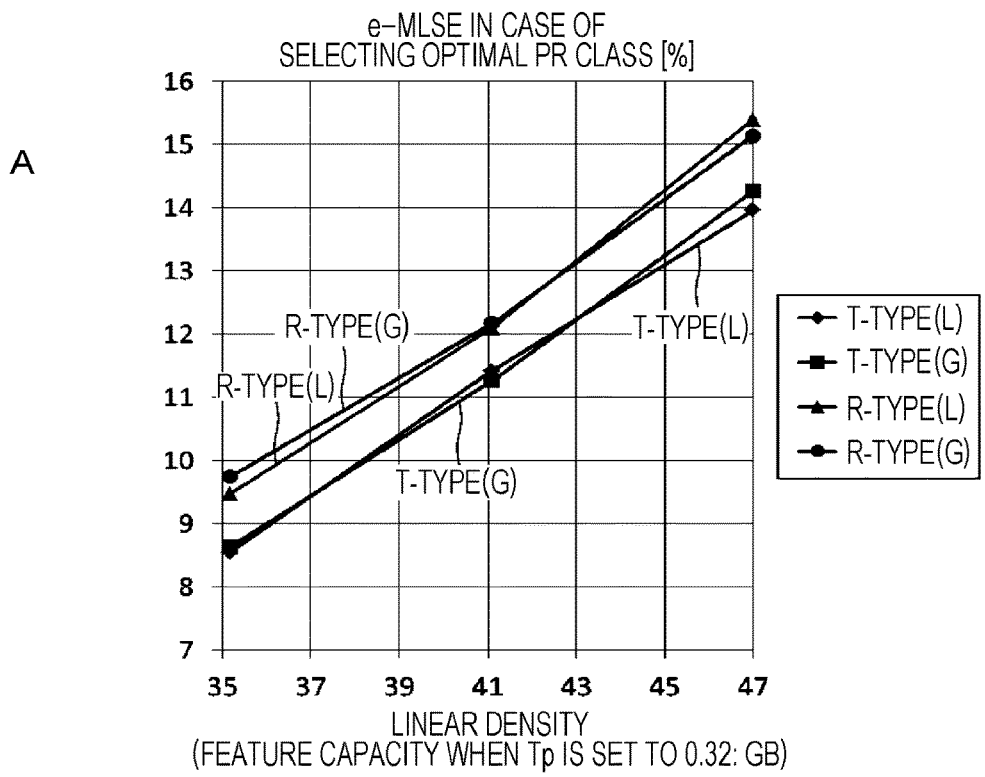
B
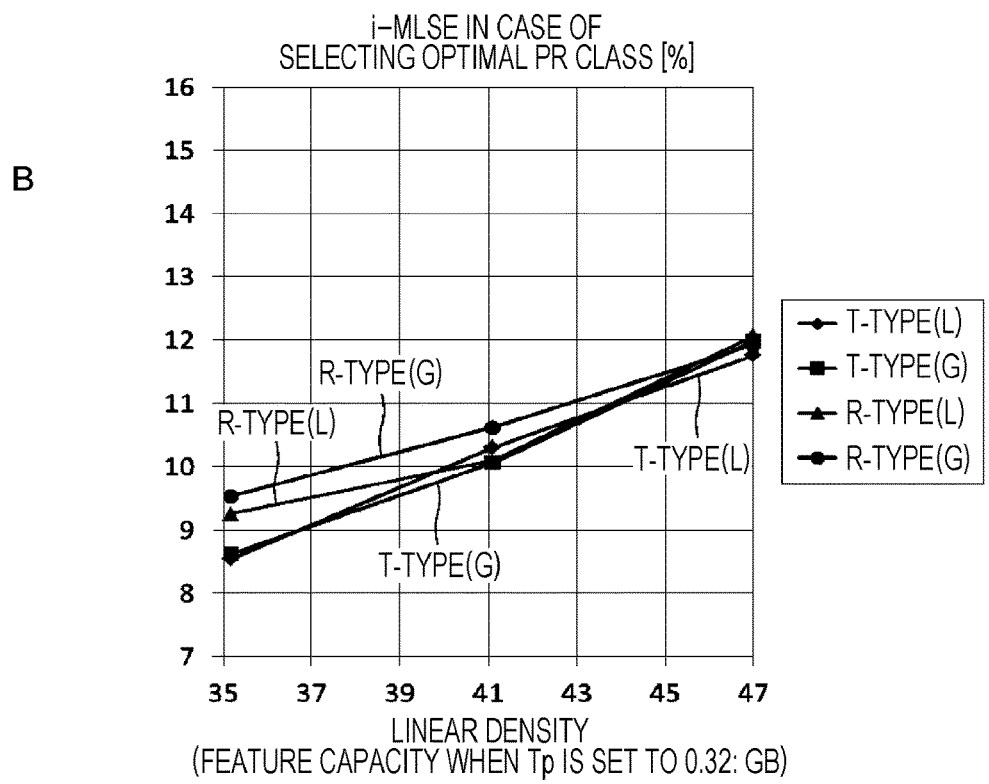

FIG. 43
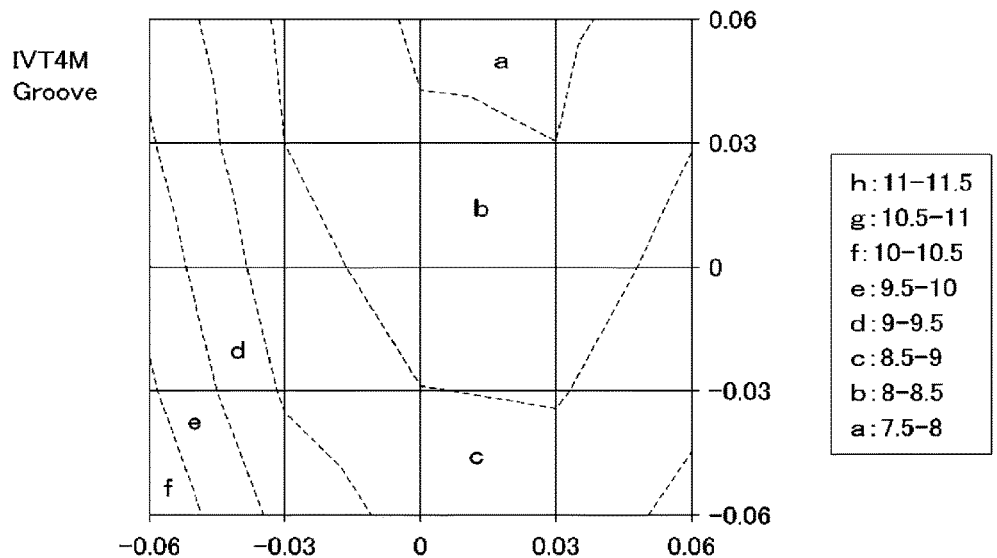
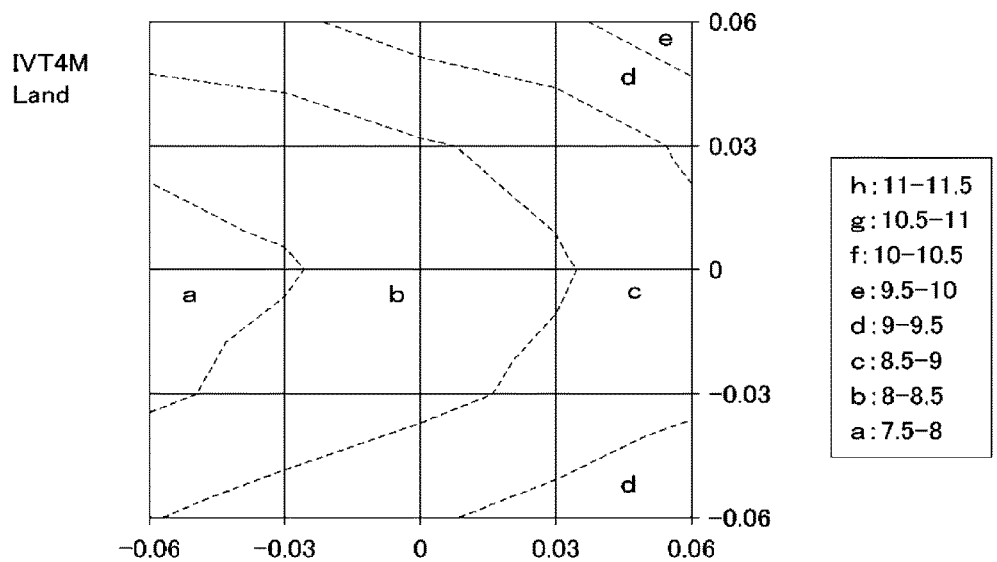

FIG. 44
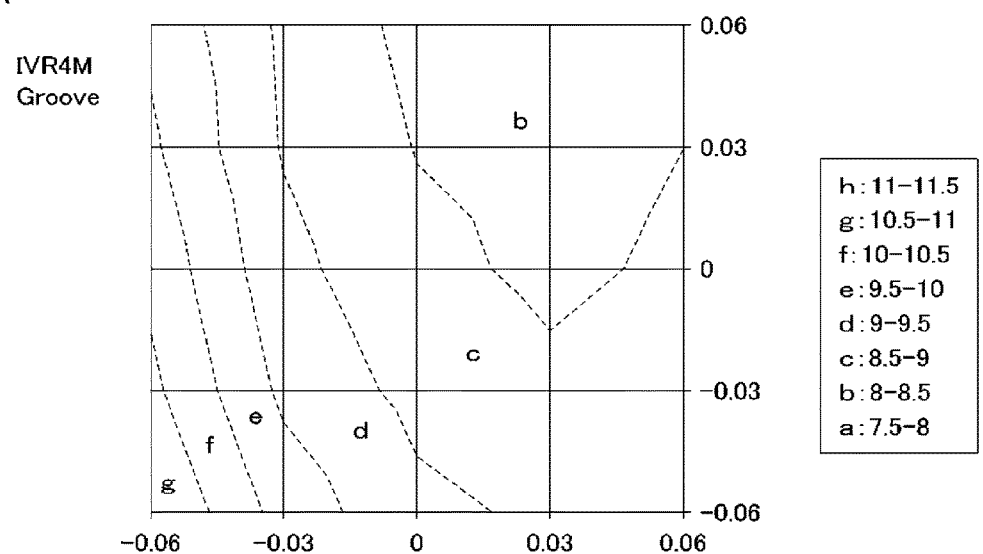
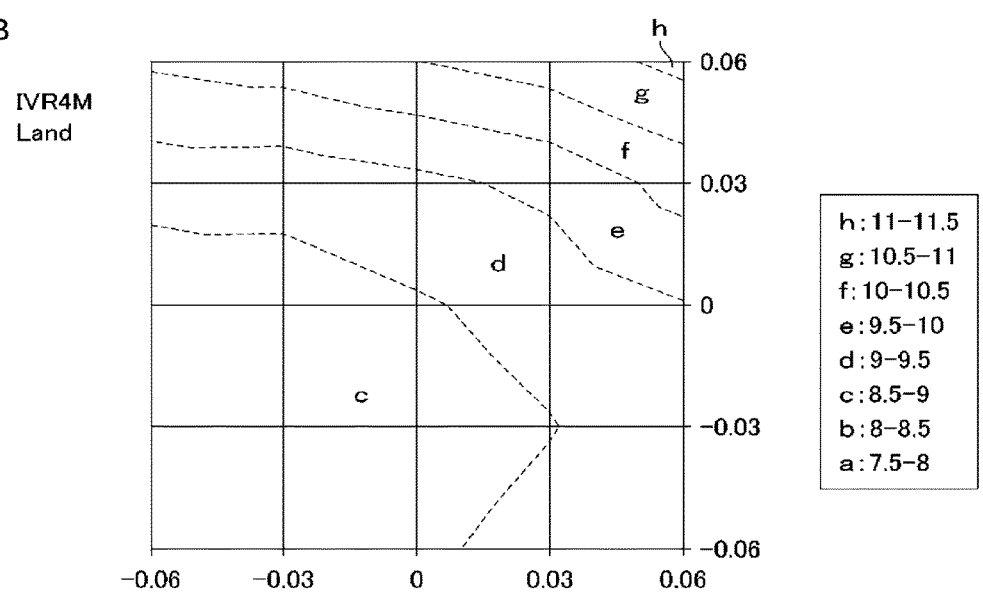

FIG. 45
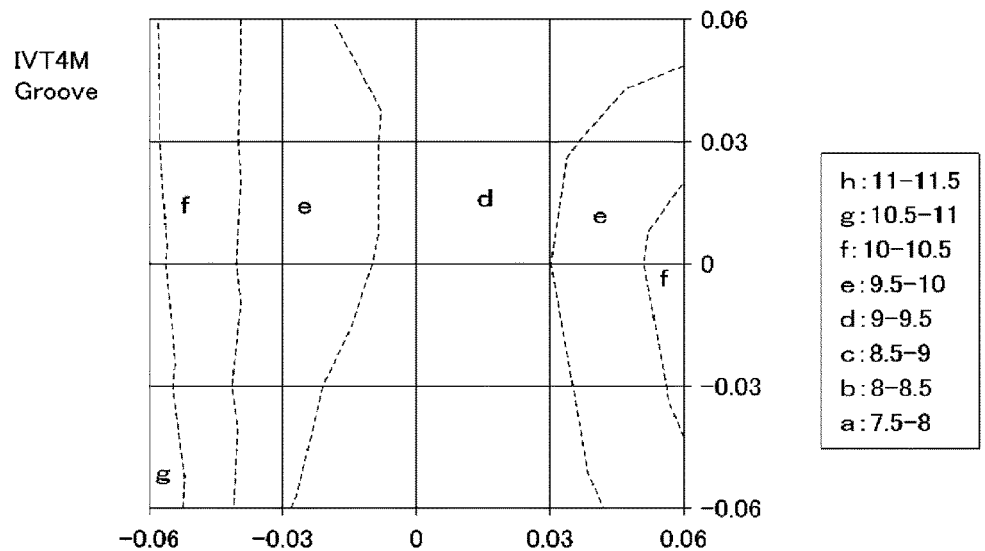
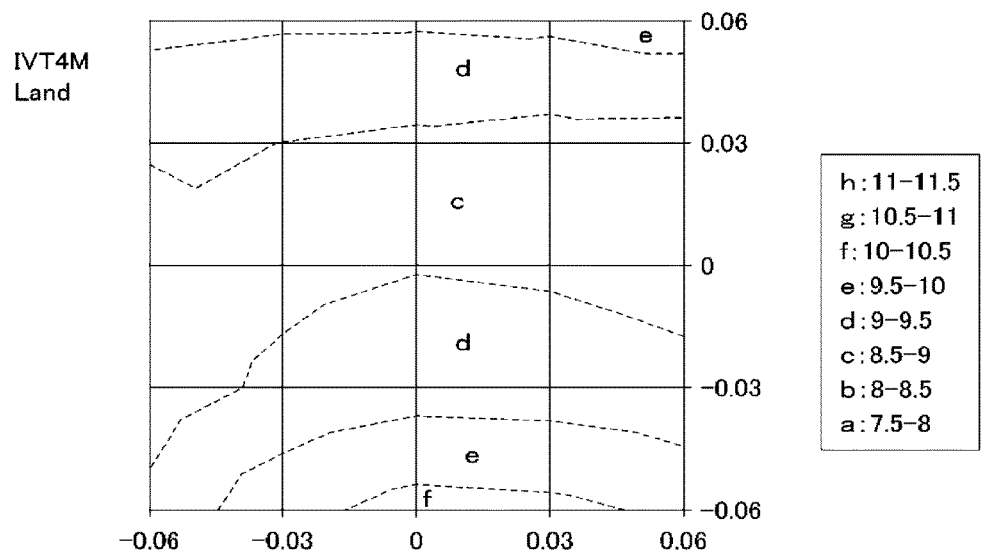

FIG. 46
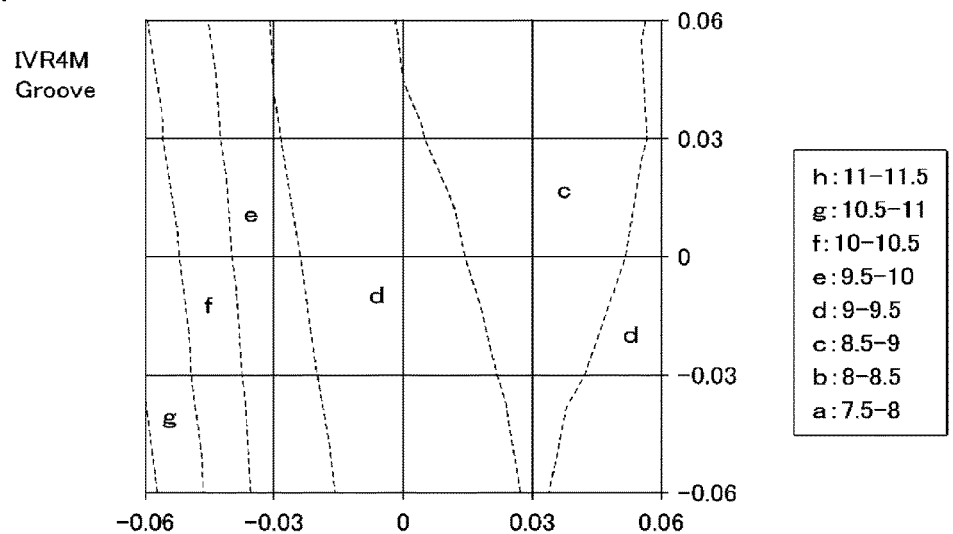
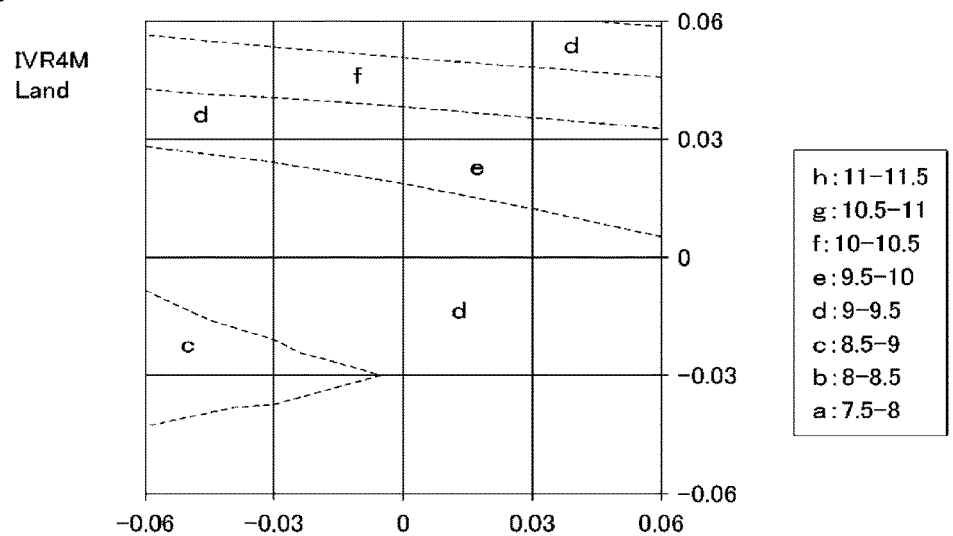

FIG. 47
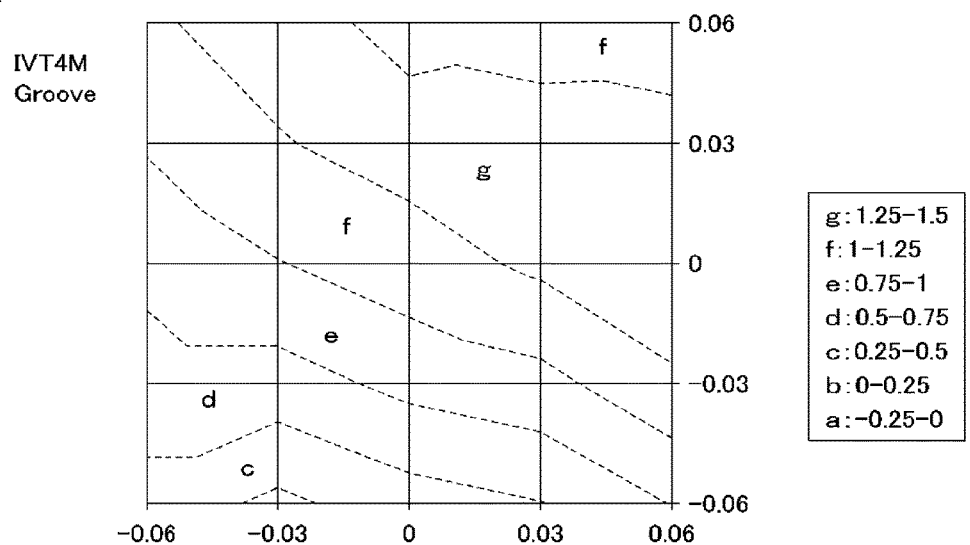
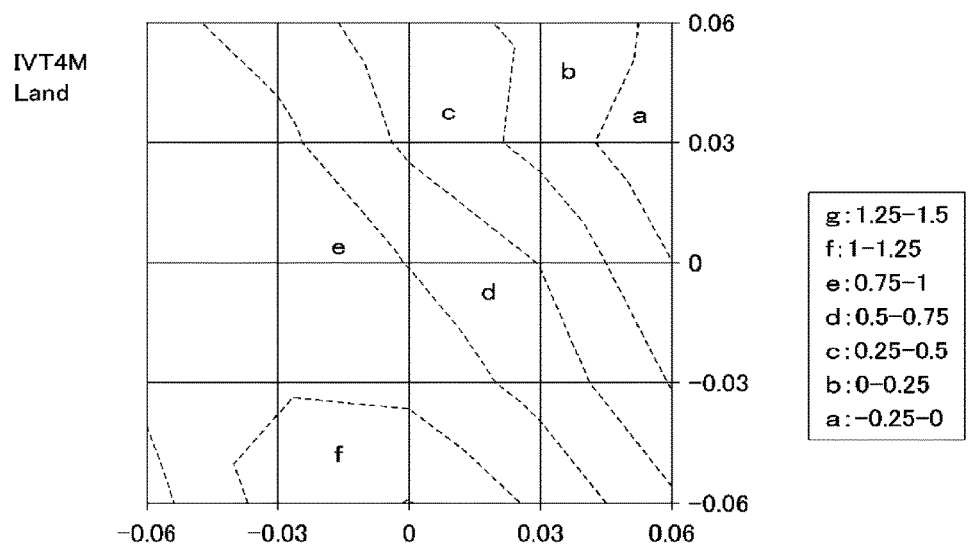

FIG. 48
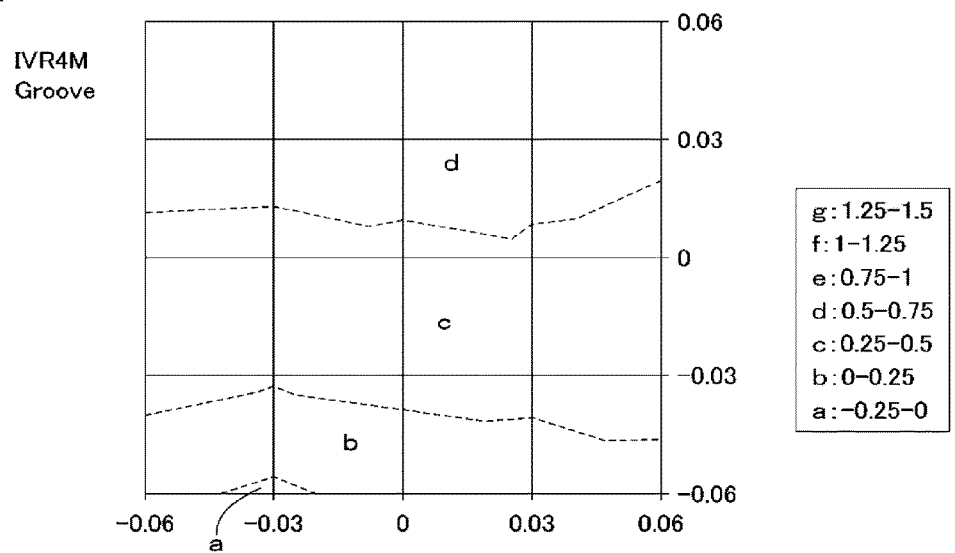
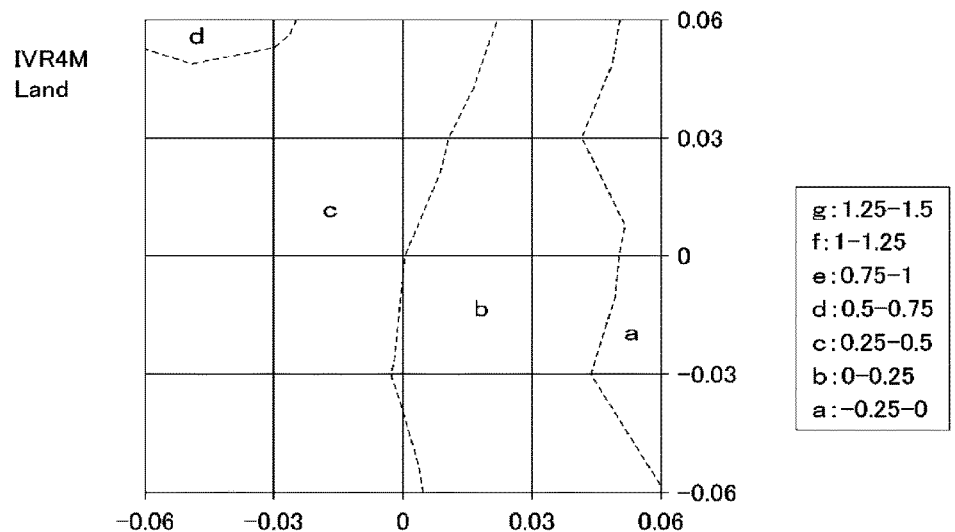

FIG. 49
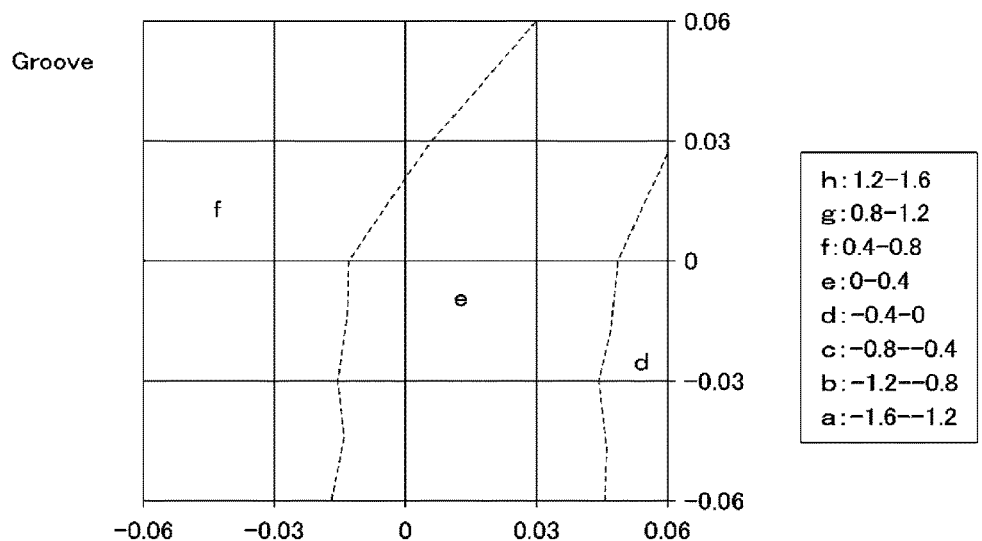
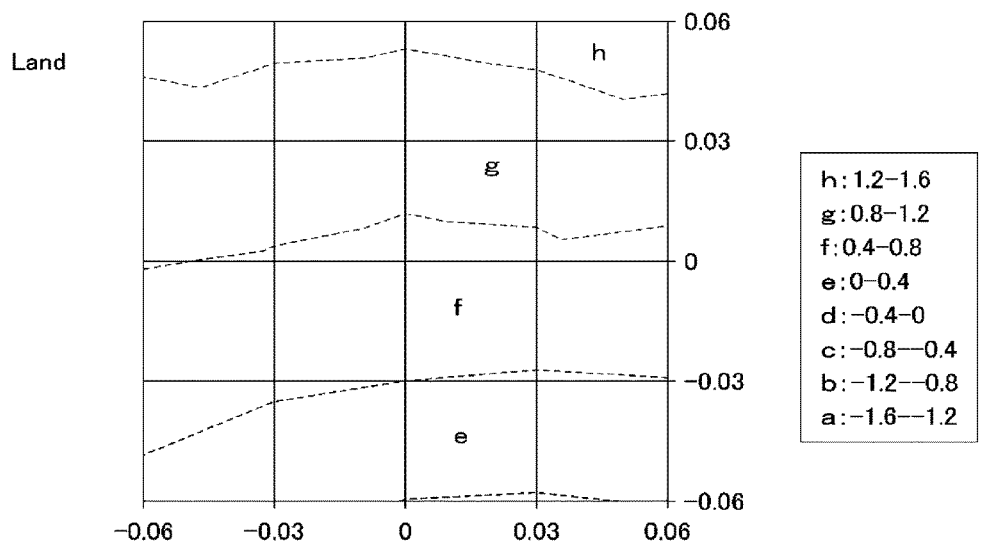

FIG. 50
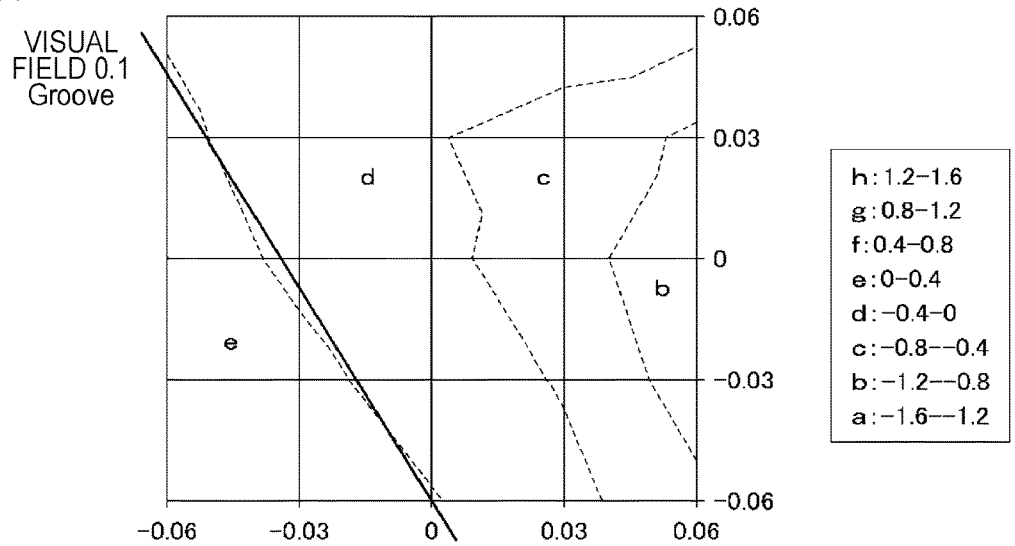
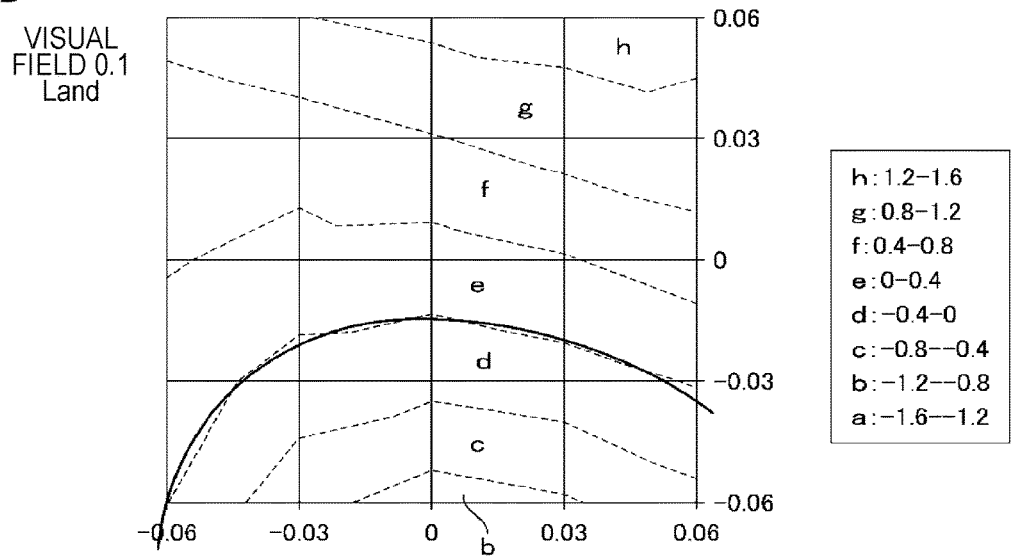

FIG. 51
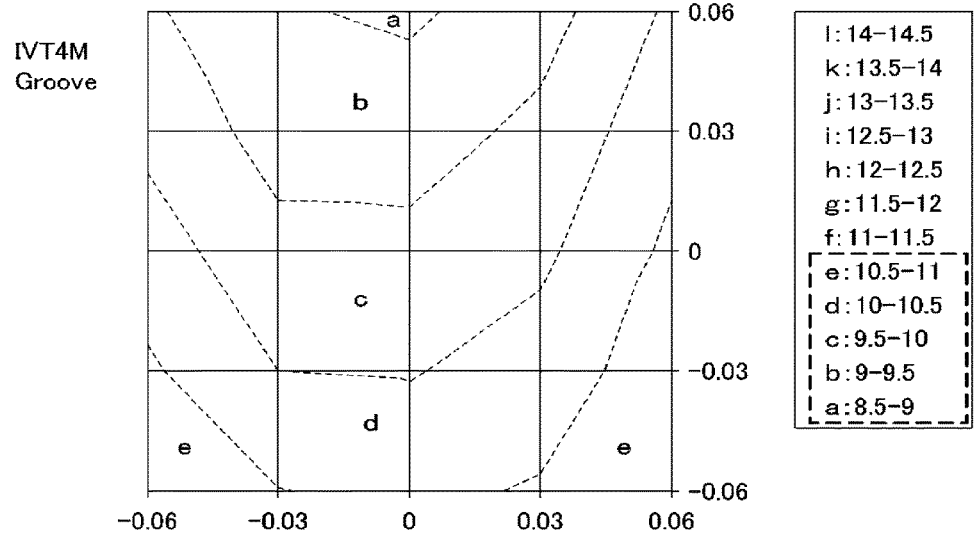
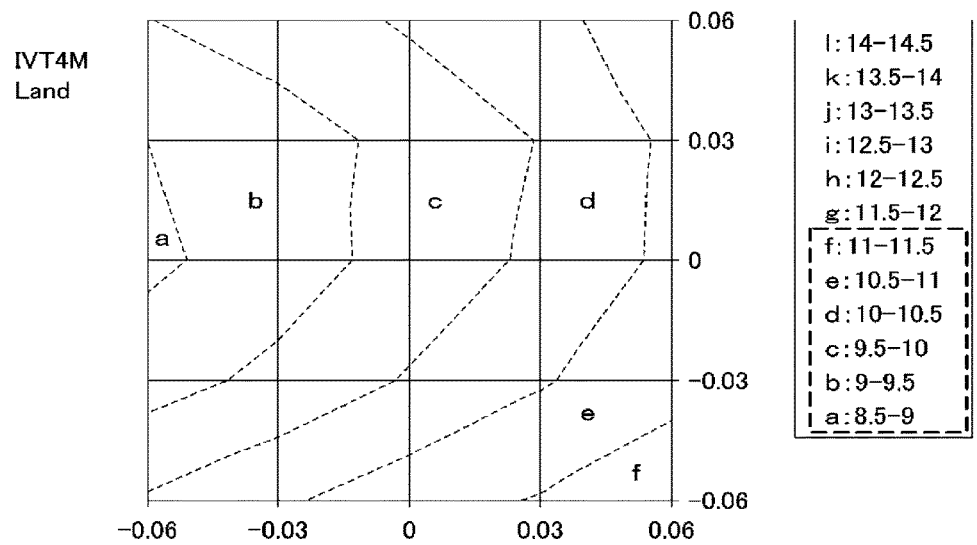

FIG. 52
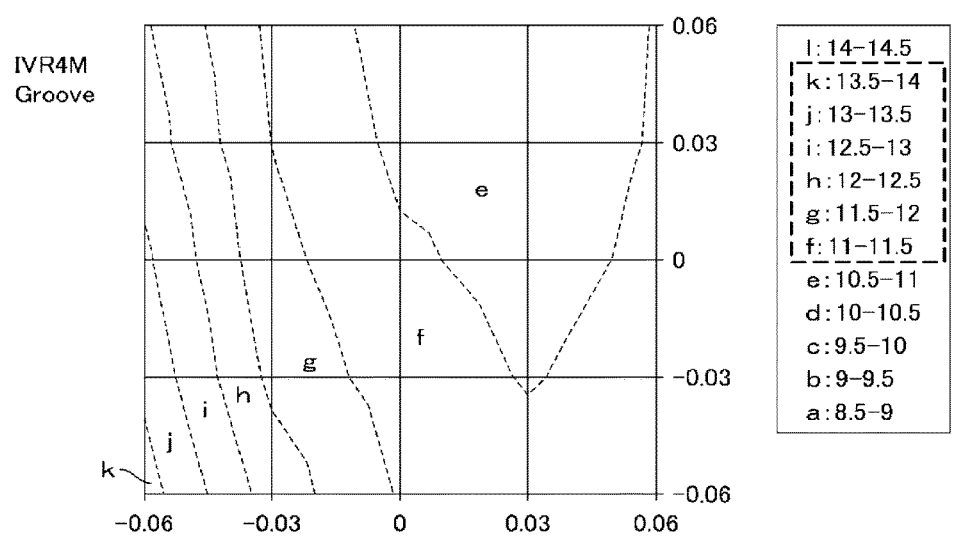
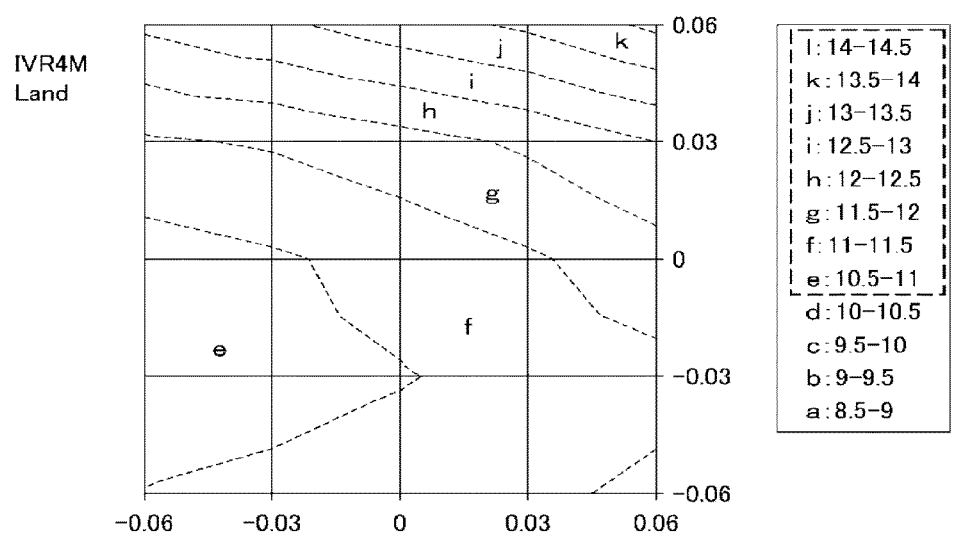

FIG. 53
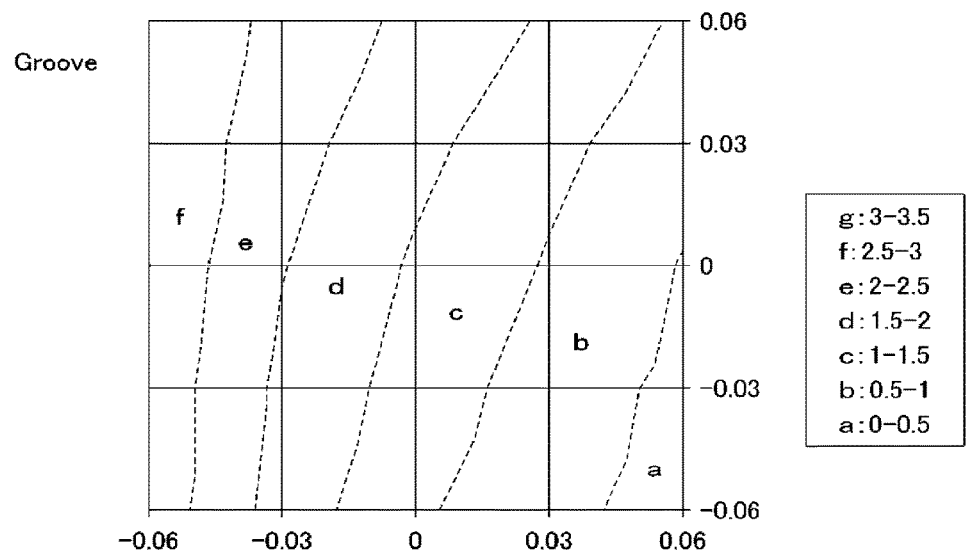
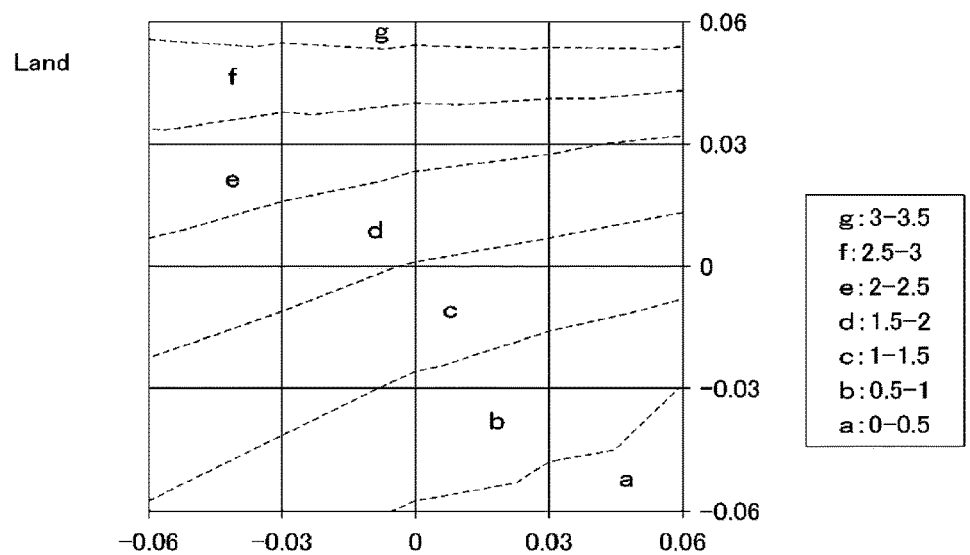

OPTICAL MEDIUM REPRODUCING APPARATUS, OPTICAL MEDIUM REPRODUCING METHOD, AND OPTICAL MEDIUM

TECHNICAL FIELD

The present disclosure relates to an optical medium reproducing apparatus that reproduces an optical medium such as an optical disc, an optical medium reproducing method, and an optical medium.

BACKGROUND ART

Examples of a method of realizing a high density of an optical disc include a method of realizing a high density in a linear density direction by shortening a channel bit length, that is, a mark length, and a method of narrowing a track pitch. However, when realizing the high density in the linear density direction, a problem related to an increase in intercode interference occurs. In addition, when the track pitch is narrowed, leakage (adjacent track crosstalk) of information from an adjacent track increases. A method of reducing the adjacent track crosstalk (hereinafter, simply referred to as "crosstalk") is suggested.

For example, Patent Document 1 discloses a configuration in which respective reproduction signals of a current reproduction track and tracks on both sides thereof are supplied to an adaptive equalizer unit, and a tap coefficient of the adaptive equalizer unit is controlled to remove the crosstalk.

In addition, Patent Document 2 and Patent Document 3 disclose the following configuration. Reflected light from an optical recording medium is spatially divided into three light beams in a track width direction, and the three light beams which are divided are respectively detected. Detection signals are multiplied (weighed) with a constant and are subjected to addition computation to reduce an effect of the crosstalk. In addition, Patent Document 2 implies a configuration in which weighing is performed even in a beam propagation direction so as to reproduce a reproduction signal of a small recording mark in an emphasizing manner as an idea.

CITATION LIST

Patent Document

Patent Document 1: Japanese Patent Application Laid-Open No. 2012-079385
Patent Document 2: Japanese Patent Application Laid-Open No. 8-249664
Patent Document 3: Japanese Patent Application Laid-Open No. 5-242512

SUMMARY OF THE INVENTION

Problems to be Solved by the Invention

In the configuration described in Patent Document 1, three light beams are necessary to read out the current reproduction track and the tracks on both sides of thereof. It is necessary to match phases of reproduction signals which are read out by the three beams. Reproduction signals can also be synchronized by sequentially reproducing the three tracks with one beam. In this case, a memory for synchronization is necessary. Accordingly, the configuration described in Patent Document 1 has a problem that an optical pickup configuration becomes complicated, phase matching becomes complicated, or a circuit scale increases. In addition, the configuration described in Patent Document 1 does not mention realization of a high density in a linear density direction.

In addition, the configuration described in Patent Document 2 and Patent Document 3 is intended to cancel the crosstalk by dividing a region into a plurality of regions and multiplying (weighing) a partial region with a constant for addition. However, Patent Document 2 and Patent Document 3 do not describe a signal characteristic improvement in high linear density recording, in which the shortest mark exceeds a cut-off spatial frequency of an optical system, in the present disclosure. In addition, Patent Document 2 and Patent Document 3 do not describe an optimal configuration in series using a partial response maximum likelihood decoding processing (partial response maximum likelihood (PRML) detection method), or a configuration in which a division pattern is appropriately changed to perform relatively satisfactory reproduction.

Accordingly, an object of the present disclosure is to provide an optical medium reproducing apparatus, an optical medium reproducing method, and an optical medium which are capable of reducing crosstalk by using only a reproduction signal of one track and are capable of realizing a higher density in a linear density direction by appropriately changing a PR class and/or a division pattern even in high linear density recording in which the shortest mark exceeds a cut-off spatial frequency of an optical system.

Solutions to Problems

The present disclosure is an optical medium reproducing apparatus, including:
a light source;
an objective lens that allows a light beam emitted from the light source to condense onto an optical medium;
a detection unit that divides a luminous flux of light beams reflected from the optical medium into a plurality of regions including a first region and a second region which are different in a position in a radial direction and/or a tangential direction, and combines a plurality of detection signals in correspondence with the amount of light that is incident to each of the plurality of regions with combination patterns which are selected to form signals of a plurality of channels;
a multi-input equalizer unit that includes a plurality of equalizer units to which the signals of the plurality of channels are respectively supplied, computes outputs of the plurality of equalizer units, and outputs the resultant value as an equalization signal; and
a binarization unit that performs binarization processing with respect to the equalization signal to obtain binary data,
wherein an addition signal channel including a constant multiplication of a detection signal of the first region and a detection signal of the second region is included in at least one of the combination patterns.

The present disclosure is an optical medium reproducing method, including:
dividing a luminous flux of light beams reflected from an optical medium into a plurality of regions including a first region and a second region which are different in a position in a radial direction and/or a tangential direction;
combining a plurality of detection signals in correspondence with the amount of light that is incident to each of the plurality of regions by a detection unit with combination patterns which are selected to form signals of a plurality of channels;

computing outputs of a plurality of equalizer units by a multi-input equalizer unit including the plurality of equalizer units to which the signals of the plurality of channels are respectively supplied, and outputting the resultant value as an equalization signal; and performing binarization processing with respect to the equalization signal by a binarization unit to obtain binary data, wherein a sum signal channel of the detection signal of the first region and the detection signal of the second region is included in at least one of the combination patterns.

The present disclosure is an optical medium in which a land and a groove are alternately formed, and information is recorded in both the land and the groove, wherein a linear density of the land is set to be higher than a linear density of the groove.

Effects of the Invention

According to the present disclosure, it is possible to reduce crosstalk by using only a read-out output of a current reproduction track. Accordingly, it is not necessary to use three read-out light beams, and it is not necessary to continuously reproduce three tracks with one beam and to perform synchronization with a memory. Accordingly, there is an advantage that a configuration of an optical pickup is not complicated, and phase matching is not necessary, and a memory does not increase. In addition, according to the present disclosure, since the division pattern is appropriately changed, a relatively high linear density can be realized.

BRIEF DESCRIPTION OF DRAWINGS

FIG. 13 is a graph illustrating a tap coefficient and frequency amplitude characteristics as an electrical filter corresponding to the tap coefficient.

FIGS. 15A and 15B are graphs illustrating the tap coefficient and frequency phase characteristics.

FIGS. 17A and 17B are graphs illustrating the tap coefficient and the frequency phase characteristics.

FIGS. 22A and 22B area graph illustrating a relationship between the linear density and the e-MLSE and a schematic diagram of a division pattern IVT4.

FIGS. 23A and 23B area graph illustrating a relationship between the linear density and the e-MLSE and a schematic diagram of a division pattern IVT4H.

FIG. 25 is a schematic diagram illustrating a plurality of examples of a region division pattern.

FIGS. 26A and 26B are schematic diagrams illustrating an example of the tap coefficient.

FIGS. 31A and 31B are graphs illustrating a relationship between the linear density, and the e-MLSE and i-MLSE in the case of selecting an optimal PR class.

FIGS. 43A and 43B are graphs illustrating a relationship between a mark phase and the e-MLSE.

FIGS. 44A and 44B are graphs illustrating a relationship between the mark phase and the e-MLSE.

FIGS. 45A and 45B are graphs illustrating a relationship between the mark phase and the e-MLSE.

FIGS. 46A and 46B are graphs illustrating a relationship between the mark phase and the e-MLSE.

FIGS. 47A and 47B are graphs illustrating a relationship between the mark phase and the e-MLSE.

FIGS. 48A and 48B are graphs illustrating a relationship between the mark phase and the e-MLSE.

FIGS. 49A and 49B are graphs illustrating a relationship between the mark phase and the e-MLSE.

FIGS. 50A and 50B are graphs illustrating a relationship between the mark phase and the e-MLSE.

FIGS. 51A and 51B are graphs illustrating a relationship between the mark phase and the e-MLSE.

FIGS. 52A and 52B are graphs illustrating a relationship between the mark phase and the e-MLSE.

FIGS. 53A and 53B are graphs illustrating a relationship between the mark phase and the e-MLSE.

MODE FOR CARRYING OUT THE INVENTION

The following embodiments are specific examples which are suitable for the present disclosure, and various kinds of limitation, which are technically preferable, are applied thereto. However, in the following description, a range of the present disclosure is not limited to the embodiments unless otherwise stated for limitation of the present disclosure.

Furthermore, description of the present disclosure will be made in the following order.
<1. First Embodiment>
<2. Second Embodiment>
<3. Third Embodiment>
<4. Modification Example>

Figure 1:
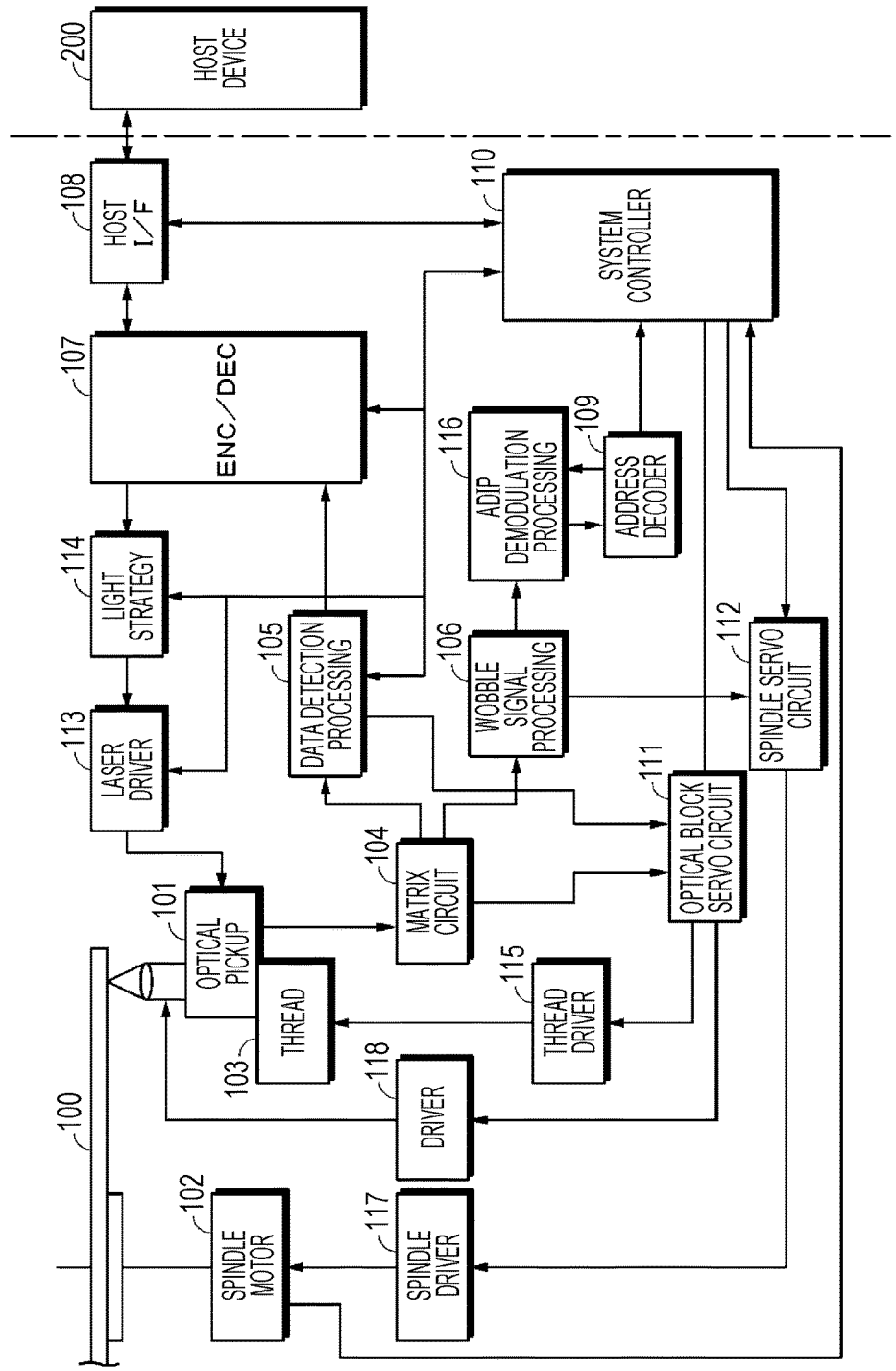
FIG. 1 is a block diagram illustrating a configuration of an optical disc drive according to an embodiment of the present disclosure.

1. First Embodiment (Optical Disc Drive)
As illustrated in FIG. 1, an optical disc drive to which the present disclosure is applied, includes an optical pickup 101 that performs recording and reproduction of information with respect to an optical disc 100 as an optical recording medium, and a spindle motor 102 that rotates the optical disc 100. A thread (feedmotor) 103 is provided to move the optical pickup 101 in a diameter direction of the optical disc 100.

As the optical disc 100, a high-density optical disc such as a Blu-ray (registered trademark) Disc (BD) can be used. The BD is a high-density optical disc having a recording capacity of approximately 25 Gbytes at a single-surface single layer and approximately 50 Gbytes at single-surface two layers. In a BD standard, a light source wavelength is set to 405 nm, and a numerical aperture (NA) of an objective lens is set to as large as 0.85 so as to make a beam spot diameter small. In a CD standard, the light source wavelength is set to 780 nm, NA is set to 0.45, and the spot diameter is set to 2.11 μm. In a DVD standard, the light source wavelength is set to 650 nm, NA is set to 0.6, and the spot diameter is set to 1.32 μm. In the BD standard, it is possible to narrow the spot diameter to 0.58 μm.

In addition, recently, with regard to the Blu-ray (registered trademark) Disc (BD), BDXL (registered trademark) is put into practical use. In BDXL, a channel bit length, that is, a mark length is shortened to realize a high density in a linear density direction, thereby realizing large capacity of 100 GB at three layers and 128 GB at four layers.

In addition to this, an optical disc, which employs a method (appropriately referred to as a land/groove recording method) of recording data in both a groove track and a land track, is preferable to increase additional recording capacity. Furthermore, a recess is referred to as a groove, and a track formed by the groove is referred to as a groove track. The groove is defined as a portion that is irradiated with laser light when manufacturing the optical disc, an area that is interposed between adjacent grooves is referred to as a land, and a track that is formed by the land is referred to as a land track. In addition, in the case of a multi-layer optical disc in which a plurality of information recording layers are stacked, it is possible to further increase recording capacity. So as to realize the large capacity, it is preferable to employ a configuration capable of reducing crosstalk between adjacent tracks in a shallow groove structure that is equal to or shallower than that of the BD so as not to have an adverse effect due to a recess structure on the other layers even in a narrow track pitch in which±primary diffracted light beams do not overlap each other due to a recess and even in a multi-layer optical disc structure similar to the present disclosure instead of a configuration of optically reducing crosstalk between adjacent tracks by setting a track pitch to be as wide as a certain extent at which the ±primary diffracted light beams due to a recess overlap each other, and by setting a depth of recess to approximately λ/6 similar to a DVD-RAM.

When the optical disc 100 capable of performing the high-density recording is loaded in the optical disc drive, the optical disc 100 is rotatably driven at a constant linear velocity (CLV) or a constant angular velocity (CAV) by the spindle motor 102 during recording/reproduction. So as to arrange phases of wobbled groove in a radial direction of the optical disc 100, CAV or zone CAV is preferable. During reproduction, reading-out of mark information, which is recorded in a track on the optical disc 100, is performed by the optical pickup (optical head) 101. During data recording on the optical disc 100, user data is recorded in a track on the optical disc 100 by the optical pickup 101 as a phase change mark or a pigment variation mark.

In the case of recordable disc, a recording mark due to a phase change mark is recorded in a track formed by wobbling grooves, but the phase change mark is recorded by an RLL(1,7) PP modulation mode (RLL: Run Length Limited, PP: Parity preserve/Prohibit rmtr (repeated minimum transition run length)) and the like in a linear density of 0.12 μm/bit, and 0.08 μm/channel bit in the case of a BD of 23.3 GB per one layer. Similarly, recording is performed in a density corresponding to a channel bit length in correspondence with a disc type. Specifically, in the case of a BD of 25 GB/layer, recording is performed in a density of 0.0745 μm/channel bit. In the case of BDXL (registered trademark) of 32 GB/layer, recording is performed in a density of 0.05826 μm/channel bit. In the case of BDXL (registered trademark) of 33.4 GB/layer, recording is performed in a density of 0.05587 μm/channel bit. When a channel clock period is set to "T", a mark length becomes 2T to 8T. In the case of reproduction-dedicated disc, the groove is not formed, but data, which is modulated by an RLL (1,7) PP modulation method, is recorded as an emboss pit array in a similar manner.

As reproduction-dedicated management information, for example, physical information of a disc and the like are recorded in an inner peripheral area of the optical disc 100 by an emboss pit or a wobbling groove. Reading-out of the information is also performed by the optical pickup 101. In addition, reading-out of ADIP information that is embedded as wobbling of the groove track on the optical disc 100 is also performed by the optical pickup 101.

A laser diode as a laser light source, an optical filter that spatially and optically separates reflected light into a plurality of signals which are different in a band in a linear density direction and/or a track density direction, a photodetector that detects the plurality of signals which are separated by the optical filter, an objective lens that becomes an output end of laser light, an optical system that irradiates a disc recording surface with the laser light through the objective lens and guides the reflected light to the photodetector, and the like are provided in the optical pickup 101. In the optical pickup 101, the objective lens is maintained by a biaxial mechanism in a manner capable of moving in a tracking direction and a focus direction. The entirety of the optical pickup 101 can move in a disc radial direction by a thread mechanism 103. A drive current is supplied to the laser diode of the optical pickup 101 from a laser driver 113, and the laser diode generates a laser.

The reflected light from the optical disc 100 is detected by the photodetector, and is supplied to a matrix circuit 104 as an electrical signal corresponding to a light reception amount. The matrix circuit 104 is provided with a current-voltage conversion circuit, a matrix computation/amplification circuit, and the like in correspondence with an output current from a plurality of light-receiving elements as the photodetector, and generates a signal necessary for matrix computation processing. Apart of the current-voltage conversion circuit and the matrix computation/amplification circuit may be provided in the photodetector element in consideration of signal transmission quality. For example, a reproduction information signal (RF signal) corresponding to reproduction data, a focus error signal for a servo control, a tracking error signal, and the like are generated. In addition, as a signal according to groove wobbling, that is, as a signal that detects the wobbling, a push-pull signal is generated.

The reproduction information signal that is output from the matrix circuit 104 is supplied to a data detection processing unit 105, the focus error signal and the tracking error signal are supplied to an optical block servo circuit 111, and the push-pull signal is supplied to a wobble signal processing circuit 106.

The data detection processing unit 105 performs binarization processing of the reproduction information signal. For example, in the data detection processing unit 105, A/D conversion processing of an RF signal, reproduction clock generation processing by PLL, partial response (PR) equalization processing, Viterbi decoding (maximum likelihood decoding), and the like are performed, and a binary data array is obtained by partial response maximum likelihood decoding processing (partial response maximum likelihood (PRML) detection method). The data detection processing unit 105 supplies the binary data array as information that is read out from the optical disc 100 to an encoding/decoding unit 107 on a next stage.

The encoding/decoding unit 107 performs demodulation of reproduction data during reproduction, and modulation processing of recording data during recording. That is, the encoding/decoding unit 107 performs data demodulation, de-interleaving, ECC decoding, address decoding, and the like during reproduction, and performs ECC encoding, interleaving, data modulation, and the like during recording.

During reproduction, the binary data array, which is decoded in the data detection processing unit 105, is supplied to the encoding/decoding unit 107. In the encoding/decoding unit 107, demodulation processing with respect to the binary data array is performed to obtain reproduction data from the optical disc 100. That is, for example, run length limited code modulation such as RLL(1, 7) PP modulation is performed to perform demodulation processing with respect to data recorded on the optical disc 100 and the ECC decoding processing for error correction, thereby obtaining reproduction data from the optical disc 100.

Data, which is decoded to the reproduction data by the encoding/decoding unit 107, is transmitted to a host interface 108, and is transmitted to a host device 200 on the basis of an instruction of a system controller 110. Examples of the host device 200 include a computer device, an audio-visual (AV) system device, and the like.

During recording/reproduction with respect to the optical disc 100, ADIP information processing is performed. That is, the push-pull signal, which is output from the matrix circuit 104 as a signal according to the groove wobbling, becomes wobble data that is digitalized in the wobble signal processing circuit 106. A clock that is synchronized with the push-pull signal is generated by the PLL processing. The wobble data is demodulated into a data stream that constitutes an ADIP address in an ADIP demodulation processing unit 116, and is supplied to an address decoder 109. The address decoder 109 performs decoding with respect to data that is supplied to obtain an address value, and supplies the address value to the system controller 110.

Recording data is transmitted from the host device 200 during recording, and the recording data is supplied to the encoding/decoding unit 107 through the host interface 108. The encoding/decoding unit 107 performs error correction code addition (ECC encoding), interleaving, addition of a sub-code, and the like as encoding processing of the recording data. With respect to the data that is subjected to a plurality of kinds of the processing, run length limited code modulation such as RLL(1-7) PP method is performed.

The recording data, which is processed in the encoding/decoding unit 107, is supplied to a write strategy unit 114. In the write strategy unit 114, laser drive pulse waveform adjustment with respect to characteristics of a recording layer, a spot shape of laser light, a recording linear velocity, and the like is performed as recording compensation processing. In addition, the laser drive pulse is output to the laser driver 113.

The laser driver 113 allows a current to flow to a laser diode in the optical pickup 101 on the basis of the laser drive pulse that is subjected to the recording compensation processing to perform laser emission. According to this, a mark according to the recording data is formed on the optical disc 100.

The optical block servo circuit 111 generates various servo drive signals of focus, tracking, and thread from the focus error signal and the tracking error signal which are supplied from the matrix circuit 104 to execute a servo operation. That is, a focus drive signal and a tracking drive signal are generated in correspondence with the focus error signal and the tracking error signal, and a focus coil and a tracking coil of a biaxial mechanism in the optical pickup 101 are driven by a driver 118. According to this, a tracking servo loop and a focus servo loop by the optical pickup 101, the matrix circuit 104, the optical block servo circuit 111, the driver 118, and the biaxial mechanism are formed.

In addition, the optical block servo circuit 111 turns off the tracking servo loop in response to a track jump command transmitted from the system controller 110 and outputs a jump drive signal to execute a track jump operation. In addition, the optical block servo circuit 111 generates a thread drive signal on the basis of a thread error signal obtained as a low frequency component of the tracking error signal, an access execution control from the system controller 110, and the like to drive the thread mechanism 103 by a thread driver 115.

A spindle servo circuit 112 performs a control of CLV-rotating or CAV-rotating the spindle motor 102. The spindle servo circuit 112 obtains a clock generated by PLL with respect to the wobble signal as current rotation velocity information of the spindle motor 102, and compares the rotation velocity information with predetermined reference velocity information to generate a spindle error signal. In addition, during data reproduction, a reproduction clock generated by PLL in the data detection processing unit 105 becomes the current rotation velocity information of the spindle motor 102, and thus the reproduction clock is compared with the predetermined reference velocity information to generate the spindle error signal. In addition, the spindle servo circuit 112 outputs a spindle drive signal generated in correspondence with the spindle error signal to execute the CLV rotation or the CAV rotation of the spindle motor 102 by a spindle driver 117.

The spindle servo circuit 112 generates the spindle drive signal in correspondence with a spindle kick/brake control signal transmitted from the system controller 110 to execute operations such as activation, stopping, acceleration, and deceleration of the spindle motor 102.

The various operations of the servo system and the recording/reproduction system are controlled by the system controller 110 that is formed by a microcomputer. The system controller 110 executes various kinds of processing in response to a command transmitted from the host device 200 through the host interface 108. For example, a writing command (write command) is given from the host device 200, the system controller 110 moves the optical pickup 101 to an address to be first written. In addition, the system controller 110 allows the encoding/decoding unit 107 to execute encoding processing as described above with respect to data (for example, video data, audio data, and the like) that is transmitted from the host device 200. In addition, the laser driver 113 drives laser emission in correspondence with the encoded data. According to this, recording is executed.

In addition, in a case where a read command, which makes a request for transmission of arbitrary data recorded on the optical disc 100, is supplied from the host device 200, the system controller 110 performs a seek operation control with respect to an address that is first designated. That is, a command is output to the optical block servo circuit 111, and an access operation of the optical pickup 101 is executed with respect to an address designated by the seek command as a target. Then, the system controller 110 performs an operation control necessary to transmit data in a data section that is instructed to the host device 200. That is, the system controller 110 performs data reading-out from the optical disc 100, and executes reproduction processing in the data detection processing unit 105 and the encoding/decoding unit 107 to transmit data that is required.

Furthermore, in the example of FIG. 1, description has been given of the optical disc drive that is connected to the host device 200 as an example, but the optical disc drive may not be connected to another device in some aspects. In this case, an operation unit or a display unit may be provided, or a configuration of an interface portion of data input/output may be different from that illustrated in FIG. 1. That is, recording or reproducing may be performed in accordance with an operation by a user, and terminal units for input/output of various pieces of data may be formed. Various configuration examples of the optical disc drive may be considered.

(Optical Pickup)

Next, description will be given of the optical pickup 101 that is used in the above-described optical disc drive with reference to FIG. 2. For example, the optical pickup 101 records information on the optical disc 100 by using laser light (beam) having a wavelength λ of 405 nm, and reproduces the information from the optical disc 100. The laser light is emitted from a semiconductor laser diode (LD) 1.

The optical disc 100 is irradiated with the laser light that is transmitted through a collimator lens 2, a polarizing beam splitter (PBS) 3, and an objective lens 4. For example, the polarizing beam splitter 3 includes a separation surface that allows approximately 100% of P-polarized light to be transmitted therethrough, and allows approximately 100% of S-polarized light to be reflected therefrom. Reflected light from a recording layer of the optical disc 100 returns along the same optical path, and is incident to the polarizing beam splitter 3. A λ/4 element (not illustrated) is interposed, and thus approximately 100% of the incident laser light is reflected from the polarizing beam splitter 3.

The laser light, which is reflected from the polarizing beam splitter 3, is spatially and optically divided by an optical filter 7 into a plurality of regions including signals which are different in a band in a linear density direction and/or a track density direction in accordance with division lines which extend in a radial direction (disc diameter direction) and/or a tangential direction (track direction) of the optical disc 100, and is condensed onto a light-receiving surface of a photodetector 6 through a lens 5. The photodetector 6 includes a light-receiving cell, which performs photoelectric conversion with respect to the incident light, on the light-receiving surface. The light-receiving cell is disposed to receive respective light beams which are divided to a plurality of regions by the optical filter 7. The photodetector 6 outputs electrical signals of a plurality of channels in correspondence with a light reception amount of respective regions of the light-receiving cell. A division pattern IVT4 of an optical filter in FIG. 2 is configured to spatially and optically divide a region into four regions including signals different in a band in a linear density direction and/or a track density direction. That is, beams are divided to an outer region A (=A1+A2) and a central region B in a radial direction, and an upper region C (C1+C2+C3) and a lower region D (D1+D2+D3) in a tangential direction. The light-receiving cell may be disposed to receive the respective light beams which are divided to the four regions. In addition, it is possible to employ a configuration in which four-channel signals are generated by the matrix circuit 104 on the basis of five signals which are received in the outer regions A1 and A2 on the radial direction, and the four-channel signals are input to the data detection processing 105. Another effect in the case of employing this configuration will be described later in detail. In addition, a region division method will be described later.

Figure 2:
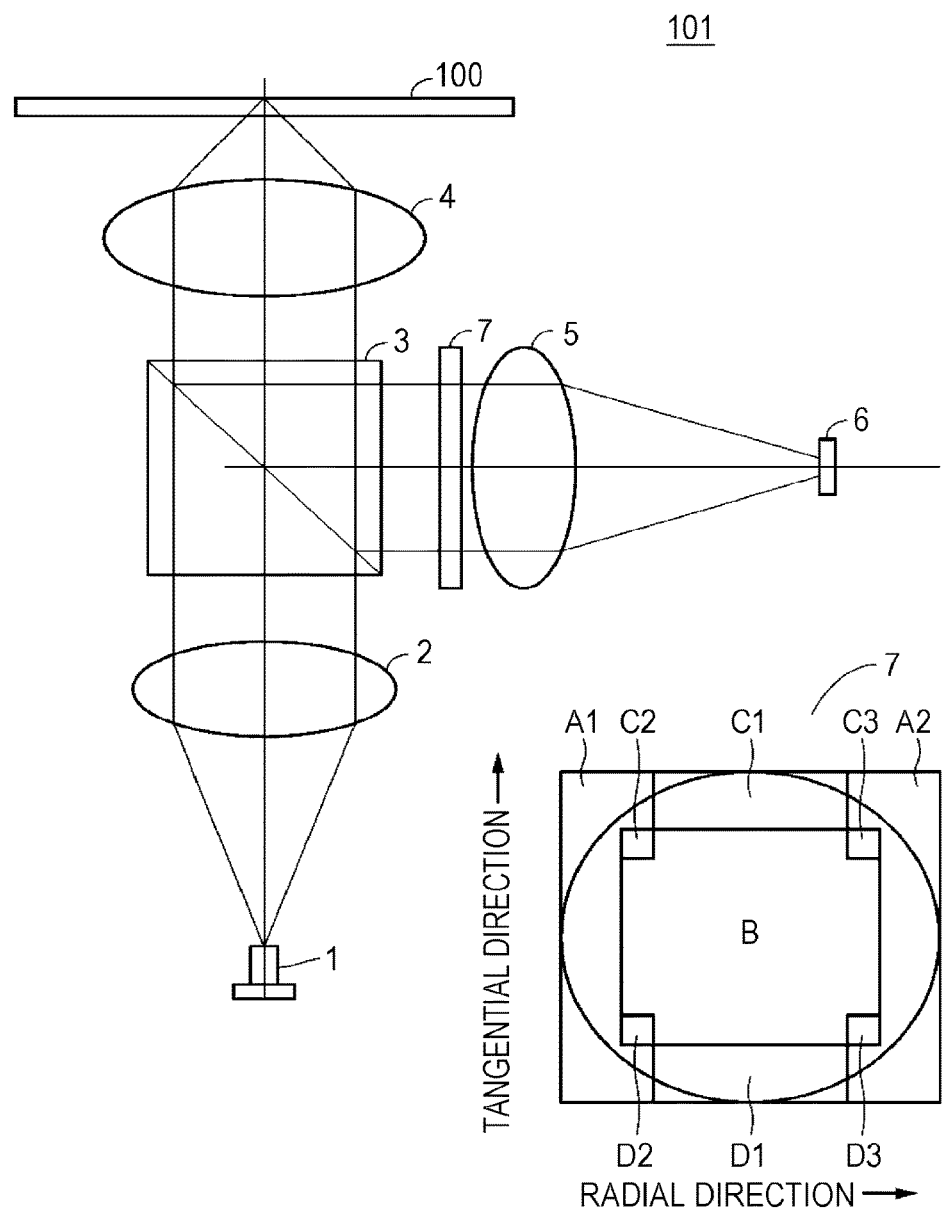
FIG. 2 is a schematic diagram illustrating a configuration of an optical pickup according to the embodiment of the present disclosure.

Furthermore, in the configuration of the optical pickup 101 illustrated in FIG. 2, only the minimum constituent elements necessary for explanation of the present disclosure are illustrated, and a focus error signal that is output to the optical block servo circuit 111 through the matrix circuit 104, a tracking error signal, a signal that is output to the wobble signal processing circuit 106 through the matrix circuit 104 to generate the push-pull signal, and the like are omitted. In addition, various configurations other than the configuration illustrated in FIG. 2 can be employed.

In the present disclosure, a cross-section of a luminous flux of returning beams from the optical disc 100 is divided into a plurality of regions, and reproduction information signals of a plurality of channels, which correspond to the respective regions, are obtained. As a method of obtaining a reproduction information signal for each region, it is also possible to use a method in which the photodetector 6 is divided to provide an optical filter function to a photodetector in addition to the method of performing division by the optical filter 7. When performing division by the optical filter 7, for example, it is possible to use a method in which an optical path conversion element for separation into a plurality of regions is disposed on an optical path that passes through the objective lens 4 and reaches the photodetector 6, and a plurality of beams separated by the optical path conversion element are supplied to another photodetector. As the optical path conversion elements, a diffraction element such as a holographic optical element, a refraction element such as a micro-lens array and a micro-prism, and the like can be used.

(Data Detection Processing Unit)

Figure 3:
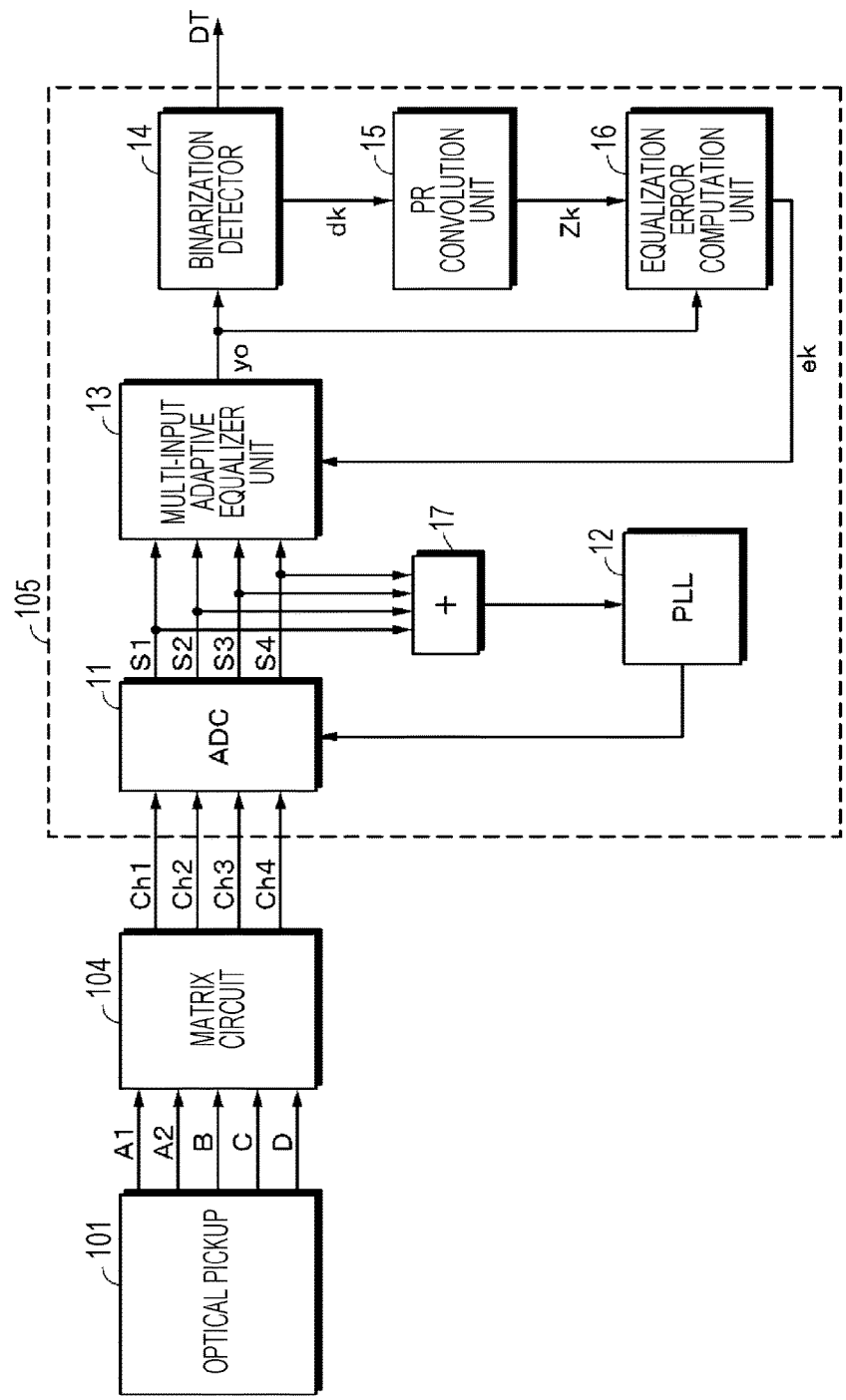
FIG. 3 is a block diagram of an example of a data detection processing unit according to the embodiment.

As described above, detection signals, which are reproduced from the optical disc 100 by the optical pickup 101 and correspond to respective regions, are supplied to the matrix circuit 104, and become reproduction information signals of a plurality of channels corresponding to the respective regions. As illustrated in FIG. 3, the data detection processing unit 105 includes an A/D converter 11 to which the reproduction information signals supplied from the matrix circuit 104 are supplied. Furthermore, for example, FIG. 3 and FIG. 4 correspond to an example in which a cross-section of a luminous flux of returning beams from the optical disc 100 is divided into five regions, and four-channel reproduction information signals Ch1 to Ch4 are obtained from the matrix circuit 104.

A clock with respect to the A/D converter 11 is formed by PLL 12. Each of the reproduction information signals which are supplied from the matrix circuit 104 is converted into digital data by the A/D converter 11. Signals, which are digitalized from the four-channel reproduction information signals Ch1 to Ch4 generated by the matrix circuit 104, are described as reproduction information signals S1 to S4. A signal, which is obtained by adding the reproduction information signals S1 to S4 by an adder circuit 17, is supplied to the PLL 12.

In addition, the data detection processing unit 105 includes a multi-input adaptive equalizer unit 13, a binarization detector 14, a PR convolution unit 15, and an equalization error computation unit 16. The multi-input adaptive equalizer unit 13 performs PR adaptive equalization processing on the basis of the reproduction information signals S1 to S4. That is, an equivalent signal y0, which is obtained through addition of the reproduction information signals S1 to S4 which are output through the adaptive equalizer unit, is equalized to approximate to a target PR waveform.

Furthermore, as a signal that is input to the PLL 12, an output of the multi-input adaptive equalizer unit may be used. In this case, an initial coefficient of the multi-input adaptive equalizer is set to a value that is determined in advance. In addition, even in the case of using a signal transmitted from the adder circuit 17, it is possible to employ a configuration in which S1 to S4 are added after changing frequency characteristics of phases and amplitudes of S1 to S4 by an FIR filter and the like instead of simply adding S1 to S4. Even in this case, a tap coefficient of the FIR filter is set to a value that is determined in advance.

For example, the binarization detector 14 becomes a Viterbi decoder, and binarized data DT is obtained by performing maximum likelihood decoding processing with respect to the equalization signal y0 that is subjected to the PR equalization. The binarized data DT is supplied to the encoding/decoding unit 107 illustrated in FIG. 1, and reproduction data demodulation processing is performed. In the Viterbi demodulation, a Viterbi detector, which includes a plurality of states configured in a unit of continuous bits having a predetermined length, and a branch that is shown by transition therebetween, is used, and the Viterbi detector is configured to efficiently detect a desired bit series among all possible bit series.

An actual circuit is provided with two registers including a register that is called a path metric register with respect to each state, and stores a path metric of a partial response series and a signal until reaching the state, and a register that is called a path memory register and stores a flow of the bit series until reaching the state. In addition, with respect to each branch, a computation unit, which is called a branch metric unit and calculates the path metric of the partial response series and the signal at a corresponding bit, is provided.

In the Viterbi decoder, various bit series can be correlated in a one-to-one relationship by one path that passes through the state. In addition, the path metric between the partial response series pas sing through the path, and an actual signal (reproduction signal) is obtained by sequentially adding a branch metric in transition between states which constitute the path, that is, at the branch.

In addition, selection of a path in which the path metric becomes the minimum is realized by sequentially selecting a path in which the path metric is small while performing magnitude comparison of the path metric of two or less branches which are reached in each state. The selection information is transmitted to the path memory register, and thus information, in which a path reaching each state is expressed as a bit series, is stored. A value of the path memory register finally converges to a bit series, in which the path metric becomes the minimum, while being sequentially updated, and thus a result thereof is output.

In the PR convolution unit 15, convolution processing of a binarization result is performed as illustrated in the following Formula to generate a target signal Zk. The target signal Zk is obtained through convolution of a binarization detection result, and is an ideal signal without noise. For example, in the case of PR (1, 2, 2, 2, 1), a value P for each channel clock becomes (1, 2, 2, 2, 1). A constraint length is 5. In addition, in the case of PR (1, 2, 3, 3, 3, 2, 1), the value P for each channel clock becomes (1, 2, 3, 3, 3, 2, 1). The constraint length is 7. In addition, in the case of PR (1, 2, 3, 4, 4, 4, 3, 2, 1), the value P for each channel clock becomes (1, 2, 3, 4, 4, 4, 3, 2, 1). The constraint length is 9. In a case where a recording density is set to be as high as a certain extent at which capacity exceeds 35 GB when a wavelength λ of laser light is set to 405 nm, NA of an objective lens is set to 0.85, and a track pitch is constantly set to 0.32 μm, if a constraint length of partial response is not lengthened from 5 to 7, and thus detection capability is not raised, detection may be difficult. In addition, in a case where the recording density is set to be as high as to a certain extent at which the capacity exceeds approximately 45 GB, it is necessary to raise detection capability by lengthening the constraint length from 7 to 9. In addition, in the following Formula, "d" represents binarized data.

[Mathematical Formula 1]

$$Z_n = \sum_m P_m d_{n-m} \quad (1)$$
$$P = (1, 2, 3, 3, 3, 2, 1)$$
$$P = (1, 2, 2, 2, 1)$$
$$P = (1, 2, 3, 4, 4, 4, 3, 2, 1)$$

Figure 6:
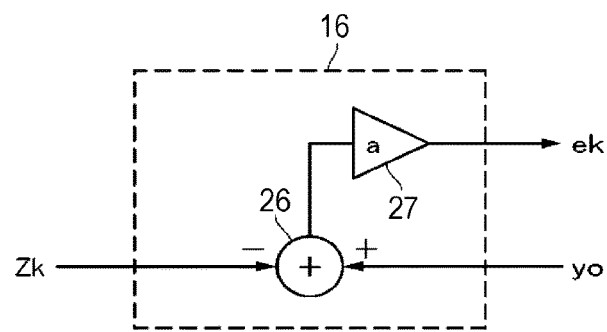
FIG. 6 is a block diagram of an example of an equalization error computation unit.

The equalization error computation unit 16 obtains an equalization error ek from the equalization signal y0 transmitted from the multi-input adaptive equalizer unit 13, and the target signal Zk, and supplies the equalization error eK to the multi-input adaptive equalizer unit 13 for a tap coefficient control. As illustrated in FIG. 6, the equalization error computation unit 16 includes a subtractor 25 and a coefficient multiplier 26. The subtractor 25 subtracts the target signal Zk from the equalization signal y0. The subtraction result is multiplied by a predetermined coefficient a in the coefficient multiplier 26 to generate the equalization error ek.

Figure 4:
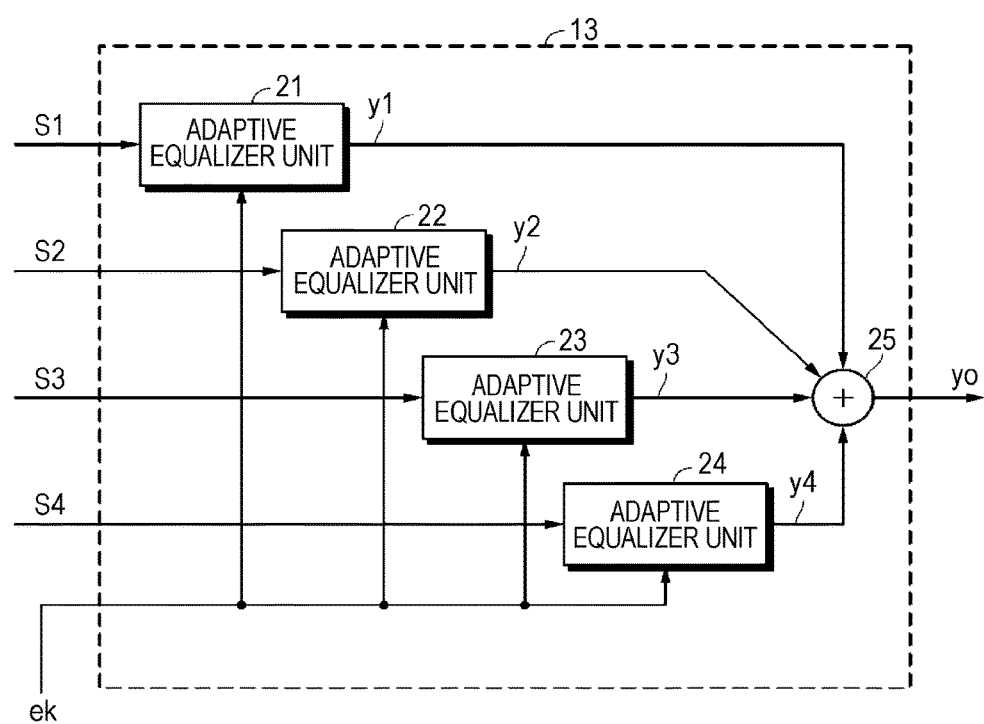
FIG. 4 is a block diagram of an example of a multi-input adaptive equalizer in the data detection processing unit.

As illustrated in FIG. 4, the multi-input adaptive equalizer unit 13 includes adaptive equalizer units 21, 22, 23, and 24, and an adder 25. The above-described reproduction information signals S1 to S4 are respectively input to the adaptive equalizer units 21 to 24. A configuration of the multi-input adaptive equalizer unit 13 in a case where the reproduction information signal output from the matrix circuit is set to four channels is illustrated in the drawing. The adaptive equalizer unit is provided in correspondence with the number of channels of a signal that is input.

Each of the adaptive equalizer units 21, 22, 23, and 24 has a finite impulse response (FIR) filter tap number, computation accuracy (bit resolution), and a parameter of an update gain of adaptive computation, and optical values are respectively set thereto. Each of the adaptive equalizer units 21, 22, 23, and 24 is supplied with an equalization error ek as a coefficient control value for an adaptive control.

Outputs y1, y2, y3, and y4 of the adaptive equalizer units 21, 22, 23, and 24 are added to each other in the adder 25, and the resultant value is output as an equalization signal y0 of the multi-input adaptive equalizer unit 13. An output target of the multi-input adaptive equalizer unit 13 is set to an ideal PR waveform that is obtained through convolution of a binary detection result to the partial response (PR).

Figure 5:
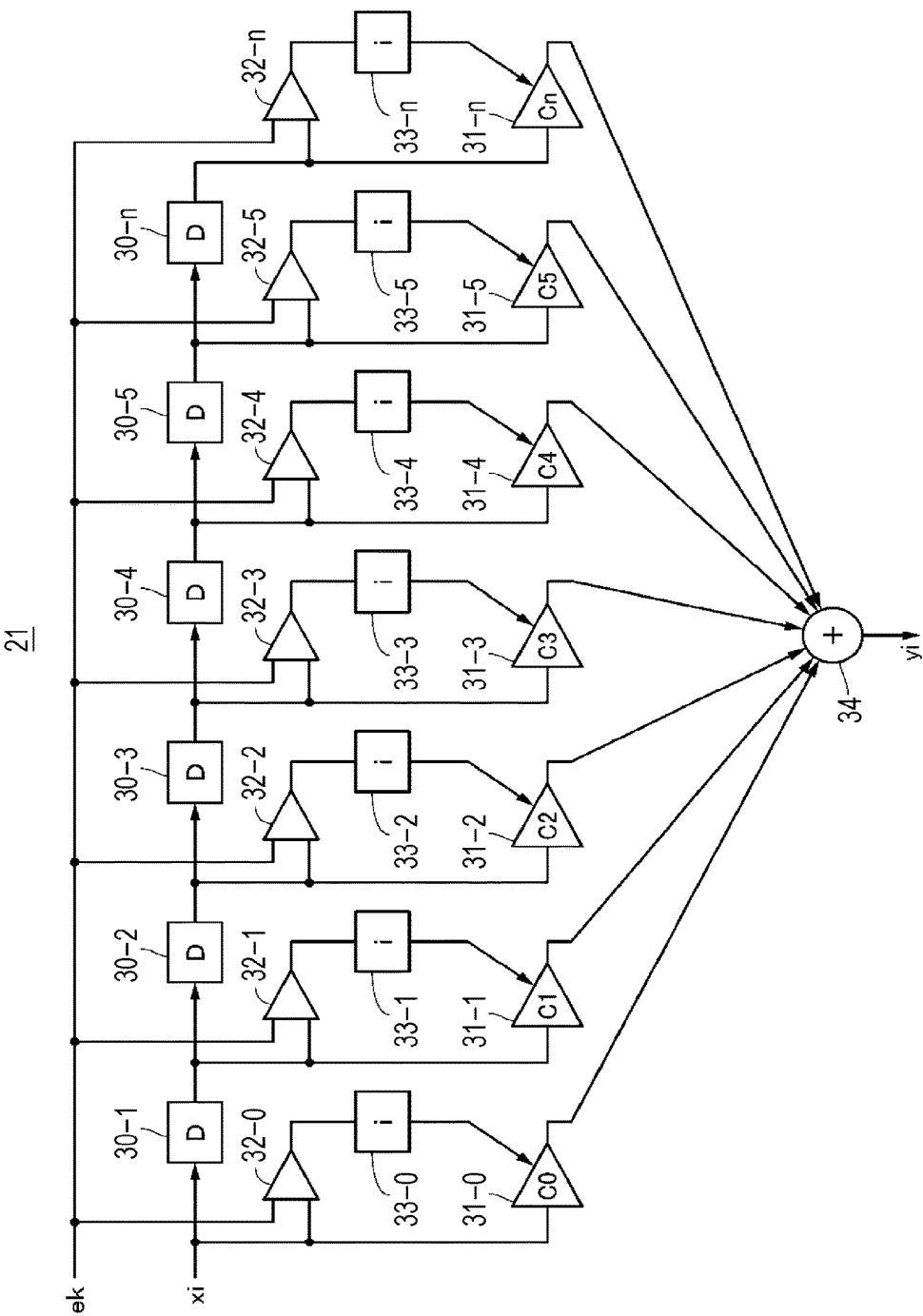
FIG. 5 is a block diagram of an example of an adaptive equalizer unit.

For example, the adaptive equalizer unit 21 is configured by an FIR filter as illustrated in FIG. 5. The adaptive equalizer unit 21 is set to a filter including an "n+1"-stage tap including delay elements 30-1 to 30-n, coefficient multipliers 31-0 to 31-n, and an adder 34. Each of the coefficient multipliers 31-0 to 31-n multiplies an input x at each point of time by each of tap coefficients C0 to Cn. Outputs of the coefficient multipliers 31-0 to 31-n are added to each other in the adder 34 and the resultant value is fetched as an output y0. With regard to the tap coefficients, an initial value is set in advance.

A control of the tap coefficients C0 to Cn is performed to execute adaptive equalization processing. Accordingly, computation units 32-0 to 32-n, to which the equalization error ek and respective tap inputs are input and which perform computation, are provided. In addition, integrators 33-0 to 33-n, which respectively integrate outputs of the computation units 32-0 to 32-n, are provided. In each of the computation units 32-0 to 32-n, for example, computation of −1×ek×x is performed. Outputs of the computation units 32-0 to 32-n are respectively integrated in the integrators 33-0 to 33-n, and the tap coefficients C0 to Cn of the coefficient multipliers 31-0 to 31-n are changed and controlled by the integration result. In addition, execution of the integration in the integrators 33-0 to 33-n is performed to adjust responsiveness of an adaptive coefficient control.

In the data detection processing unit 105 having the above-described configuration, after reduction of an unnecessary signal such as crosstalk is performed, decoding of binary data is performed.

The adaptive equalizer units 22, 23, and 24 also have a similar configuration to that of the adaptive equalizer unit 21. A common equalization error ek is supplied to the adaptive equalizer units 21, 22, 23, and 24 to perform adaptive equalization. That is, in the adaptive equalizer units 21, 22, 23, and 24, optimization, that is, adaptive PR equalization of an error and a phase deformation of an input signal frequency component of the reproduction information signals Sa, Sb, and Sc is performed. That is, the tap coefficients C0 to Cn are adjusted in accordance with a computation result of −1×ek×x in the computation units 32-0 to 32-n. The adjustment of the tap coefficients C0 to Cn is performed to eliminate an equalization error.

In this manner, in the adaptive equalizer units 21, 22, 23, and 24, the tap coefficients C0 to Cn is adaptively controlled to obtain target frequency characteristics by using the equalization error ek. The equalization signal y0, which is obtained by adding the outputs y1, y2, y3, and y4 of the adaptive equalizer units 21, 22, 23, and 24 to each other in the adder 24, of the multi-input adaptive equalizer unit 13 becomes a signal in which crosstalk, inter-code interference, and the like are reduced.

(Electro-Optical Filter)

A signal, which is reproduced from the optical disc, is greatly diverged from an ideal signal. The divergence is caused by an increase in inter-code interference due to high density in a linear direction, and an increase in signal leakage from an adjacent track due to high density in a track direction in comparison to an ideal signal. In the related art, this problem is solved by an electrical filter. For example, in BDXL (registered trademark), 33.4 GB/L is realized.

Figure 7:
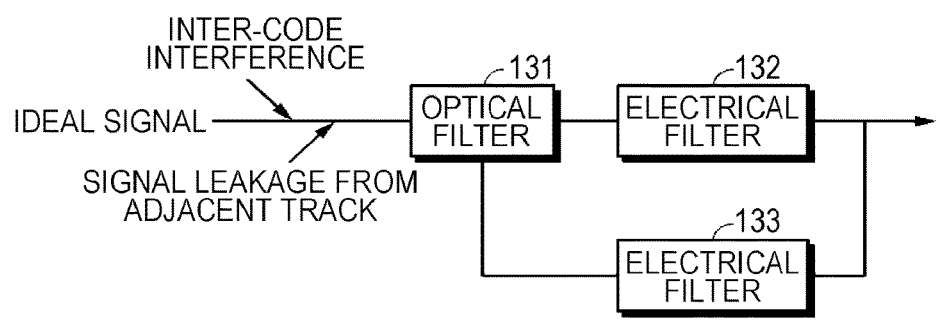
FIG. 7 is a block diagram of an example of a configuration for reproduction.

A configuration of reproducing a high-density recorded signal according to the present disclosure is illustrated in FIG. 7. That is, a reproduction signal is supplied to an optical filter 131, and the optical filter 131 spatially and optically separates the reproduction signal into a plurality of signals which are different in a band in a linear density direction and/or a track density direction. The plurality of signals which are separated, for example, two signals are respectively supplied to optimal electrical filters 132 and 133, and respective outputs of the electrical filters 132 and 133 are added up to obtain an output signal.

In the present disclosure, a luminous flux of light beams reflected from the optical disc 100 is received, and is spatially and optically divided by the optical filter 7 into a plurality of regions which are different in a band in a linear density direction and/or a track density direction in accordance with division lines which extend in a radial direction and a tangential direction. Detection signals of a plurality of channels are formed by using a plurality of detection signals in correspondence with the amount of light incident to each of the plurality of regions, and are respectively supplied to electrical filters. The above-described adaptive equalizer unit corresponds to the electrical filter. The matrix circuit 104 is configured to have a partial function of the optical filter by performing computation after receiving signal light beams, which are subjected to the region division, by respective light-receiving elements.

(Region Division Pattern)

First, description will be given of an example of a region division pattern in this specification with reference to FIGS. 8A to 8D. Furthermore, a circle in the drawings represents the outer periphery of a cross-section of a luminous flux of beams. For example, a square represents an area of an optical path conversion element constituted by a diffraction element such as a holographic optical element, a refraction element such as a micro-lens array and a micro-prism, and the like for separation into a plurality of regions, that is, an area of an optical filter, or an area of light-receiving cells of a detection photodetector. Furthermore, in region-division drawings, an upper and lower direction corresponds to a tangential direction of a returning luminous flux, and a right and left direction corresponds to a radial direction. In addition, the region division patterns illustrated in FIGS. 8A to 8D are illustrative only, and patterns other than the patterns illustrated in FIGS. 8A to 8D can be employed. For example, a division line may be a curved line such as a circular arc without limitation to a straight line.

(Pattern IVT4)

Figure 8:
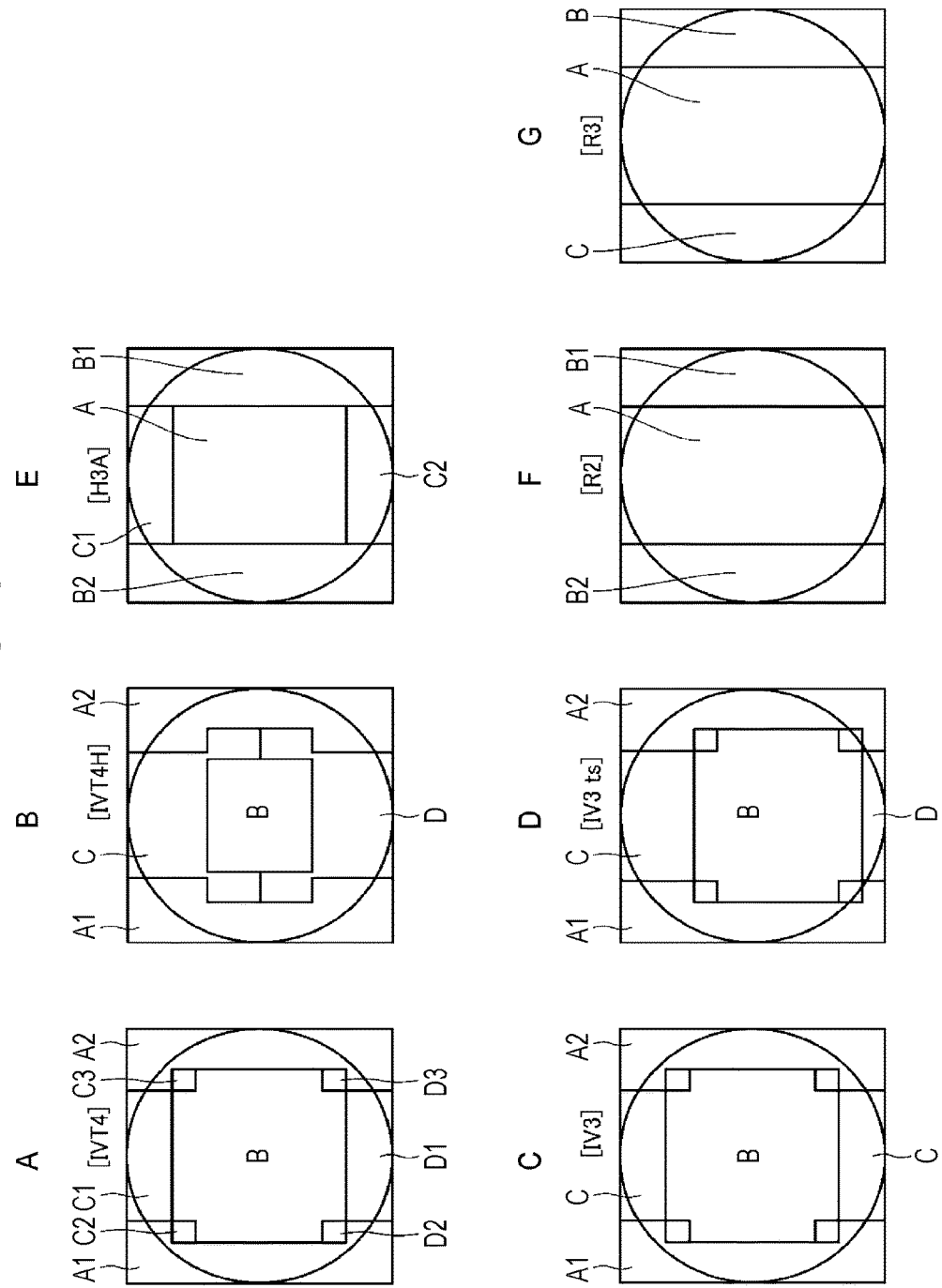
FIGS. 8A to 8G are schematic diagrams illustrating a plurality of examples of a region division pattern.

A pattern IVT4 illustrated in FIG. 8A is an example having four regions that is also illustrated in FIG. 2. That is, beams are divided to an outer region A (=A1+A2) and a central region B in the radial direction, and an upper region C (C1+C2+C3) and a lower region D (D1+D2+D3) in the tangential direction. A detection signal, which corresponds to each of the regions, is obtained. Here, a region division position in the radial direction is set to a position that is located at ±0.5 and ±0.7 when a pupil radius is assumed as 1.0. A region division position in the tangential direction is set to a position that is located at ±0.45 and ±0.65 when the pupil radius is assumed as 1.0.

Four-channel signals corresponding to the division pattern of IVT4 may be generated on the basis of outputs from four light-receiving cells which respectively correspond to the regions A, B, C, and D, or the four-channel signals may be generated by using a matrix circuit on the basis of outputs from five light-receiving cells which correspond to five regions including the regions A1, A2, B, C, and D. In a configuration of generating the four channels from five signals by using the matrix circuit in the latter case, the following various division patterns can be realized by setting the same division to a basic type.

IVT4: Ch1=A1+A2, Ch2=B, Ch3=C, Ch4=D
IVR4: Ch1=C+D, Ch2=B, Ch3=A1, Ch4=A2
IVi4: Ch1=C, Ch2=B+D, Ch3=A1, Ch4=A2

(Pattern IVT4H)

Figure 9:
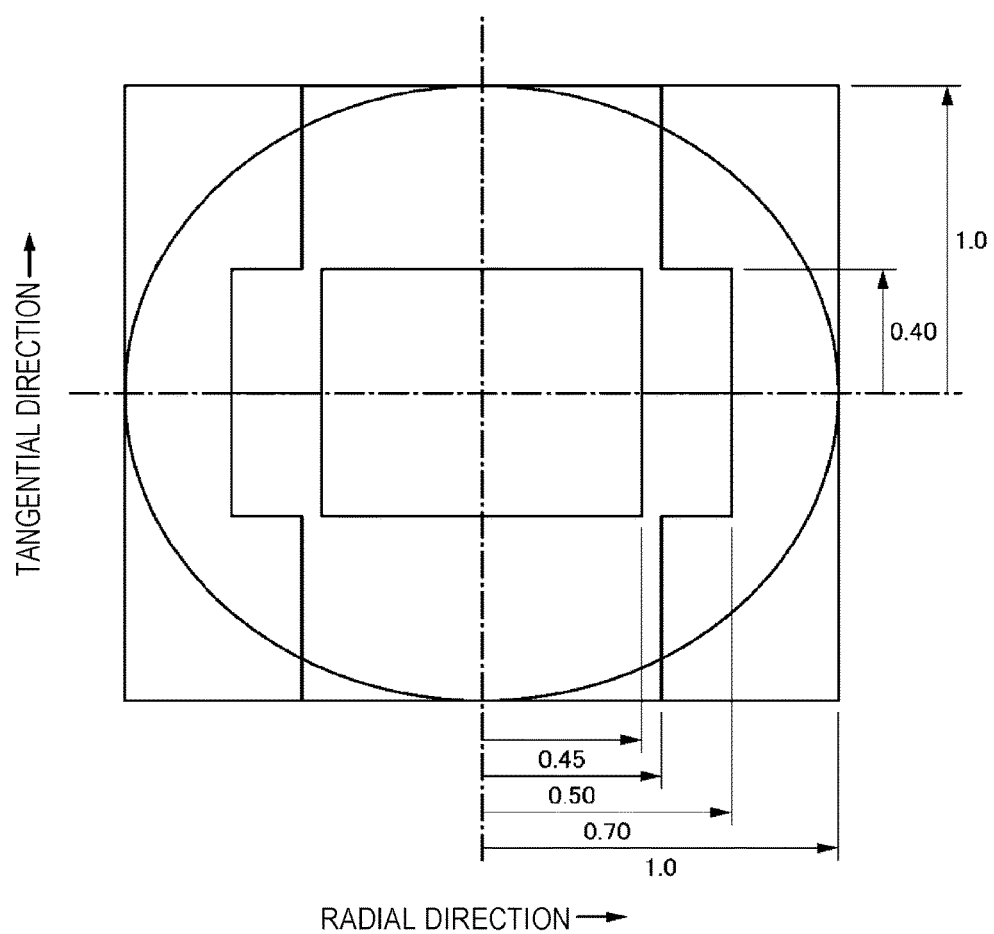
FIG. 9 is a schematic diagram illustrating a pattern IVT4H.

A pattern illustrated in FIG. 8B is obtained by changing shapes of respective regions and arrangements thereof so that characteristics at a relatively high linear density are improved while following the optical filter configuration of IVT4. More detailed pattern dimensions are illustrated in FIG. 9.

(Pattern IV3)

A pattern illustrated in FIG. 8C is obtained by collecting the outer channels (C and D) of IVT4 into one channel C.

(Pattern IV3 Ts0.2)

A pattern IV3 ts0.2 illustrated in FIG. 8D is obtained by shifting IV3 in the tangential direction, for example, by 20% of a luminous flux radius.

(Pattern H3A)

A pattern H3A illustrated in FIG. 8E is obtained as follows. Beams are divided into two regions including an inner region and an outer region B (B1+B2) in the radial direction by two division lines extending in the tangential direction. In addition, the inner region is classified into an upper side and a lower side by a division line that extends in the radial direction. According to this, regions C1 and C2 are formed on an upper side and a lower side in the tangential direction, and the remaining central region is set as A. That is, the pattern H3A is a pattern for division into three regions including the region A, the region (B1+B2), the region C (=C1+C2). According to this, three-channel signals corresponding to the three regions are obtained.

(Patterns R2 and R3)

Patterns R2 and R3 (FIGS. 8F and 8G) are comparison patterns to clarify an effect due to the configuration of the present disclosure. The patterns R2 and R3 correspond to an example in which beams are divided into three regions including a region A, and regions B (=B1+B2) or regions B and C in the radial direction by two division lines extending in the tangential direction. In the case of the pattern R2, electrical signals corresponding to light-receiving signals of the regions B1 and B2 are added to each other, and become a one-channel signal. That is, two-channel (R2) signals of an inner channel (region A) and an outer channel (region: B1+B2), or three-channel signals of the inner channel (region A) and outer channels (regions B and C) are obtained. Here, a region division position in the radial direction is set to a position that is located at ±0.55 when the pupil radius is assumed as 1.0. In addition to this, a result obtained by performing characteristic comparison in the case of combining technologies of Patent Document 2 and Patent Document 3 and the PRML detection method on the basis of division of the pattern R2/R3 and the pattern H3A will also be described later.

(Simulation Result with Respect to Each Pattern)

Figure 10:
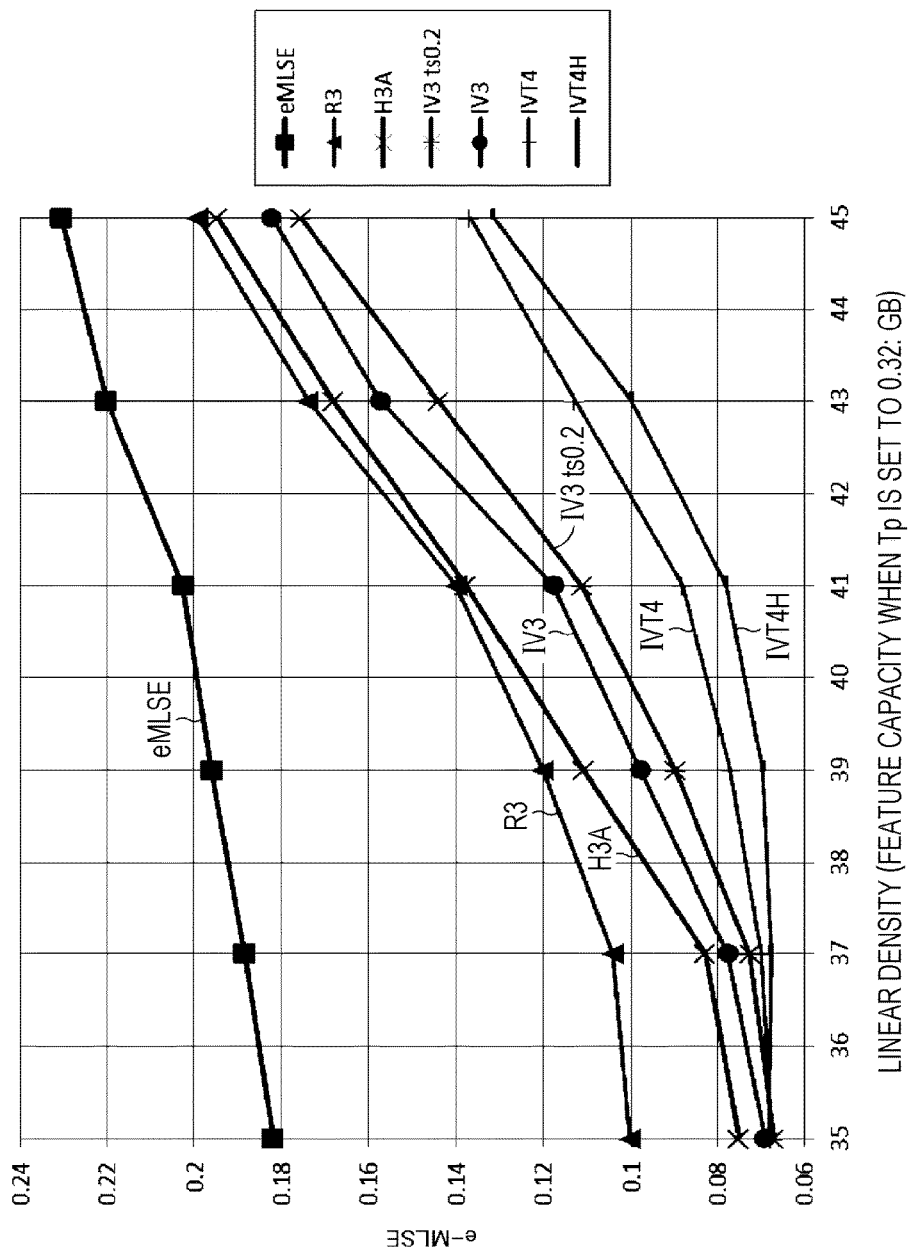
FIG. 10 is a graph illustrating a relationship between a linear density and e-MLSE.

FIG. 10 illustrates simulation results with respect to six patterns illustrated in FIGS. 8A to 8G. As a signal index value, e-MLSE is used, and the same shall apply in the following simulations. In a case where a recording density is set to be higher in comparison to BDXL (registered trademark), data patterns, which are likely to cause an error, become different from each other. As a result, an error of i-MLSE, which is a signal index value in the related art, is problematic. Here, in the present disclosure, a signal evaluation value, which is necessary for an accuracy improvement of a signal index value in a relatively high linear density, to which a new data pattern is added, and which is different from the i-MLSE, is used for explanation of an effect. Hereinafter, a new index value of which accuracy is improved is referred to as e-MLSE.

A data pattern, which is added in the e-MLSE, includes the following three kinds of patterns.

A bit written by "1" in a pattern array indicates a site at which bit inversion occurs in an erroneous pattern with respect to a detection pattern.

Addition pattern (1): 10111101
Addition pattern (2): 1011110111101
Addition pattern (3): 10111100111101

For reference, the e-MLSE and the i-MLSE approximately match each other in the same linear density as in BDXL (registered trademark) of the related art in which accuracy of the i-MLSE is sufficient, and a difference in an error improvement is shown in a higher linear density. A theoretical correlation of an index value with respect to an error rate that is important in practical use is the same in each of the cases. Accordingly, a difference in a computation aspect and a difference in a range of application linear density are present, but evaluation values of signal quality in the cases may be recognized by the same sense. Furthermore, in the present disclosure, an index other than the e-MLSE may be used. A difference between the e-MLSE and the i-MLSE due to a difference in a data pattern that is likely to cause an error in a case where a linear density becomes high will be supplemented later.

Hereinafter, description will be made on the basis of simulation results with respect to respective patterns. Simulation conditions are as follows.

Tp=0.225 μm (in both a land and a groove), NA=0.85
PR (1233321) evaluation index: e-MLSE groove depth (1/15)λ
Mark width=Tp×0.7 Disc Noise and Amp Noise are present
Tap 1T-interval 31 taps
Perturbation origin (state in which the entirety of defocus, disc skew, and the like are set to the origin)

In addition, it is assumed that a linear density is shown as LD (feature capacity at Tp=0.32 μm) by using a feature when a track pitch Tp is 0.32 μm in a disc having a diameter of 120 mm.

In the simulation results in FIG. 10, a graph indicated by e-MLSE is a result in a case where region division is not performed. As can be seen from FIG. 10, in R3 that does not use the configuration of the present disclosure, the e-MLSE does not sufficiently fall down at LD35 GB. For reference, at the perturbation origin, R2 and R3 have approximately the same characteristic. In H3A and IV3, it is possible to reduce the e-MLSE at LD35 GB, but channels different in a central position in the tangential direction are not provided, and thus deterioration due to high linear density is great. In addition, in H3A, the e-MLSE is slightly higher even at LD35 GB in comparison to IV3 in which an optical filter shape is relatively optimal, and the difference increases as the linear density increases.

The pattern IV3 ts0.2 that is shifted from the pattern IV3 in the tangential direction can show a difference in a central position between an outer channel and a central channel in the tangential direction with focus given to the center, and thus it is possible to slightly suppress deterioration due to high linear density.

In IVT4 provided with channels different in a central position in the tangential direction, it can be seen that the e-MLSE at LD35 GB can be sufficiently reduced, and a high linear density effect corresponding to LD3 GB is obtained in a linear density direction in comparison to IV3 in which division positions in the radial direction and the tangential direction are the same as each other.

In IVT4H in which an optical filter shape is optimized by giving a priority to characteristics in a high linear density, a high linear density effect corresponding to LD1 GB is obtained in comparison to IVT4.

Here, comparison will also be made to characteristics in the case of combining the technologies of Patent Document 2 and Patent Document 3, and the PRML detection method in addition to the configurations A to E of the present disclosure and the configurations F and G for comparison.

Figure 11:
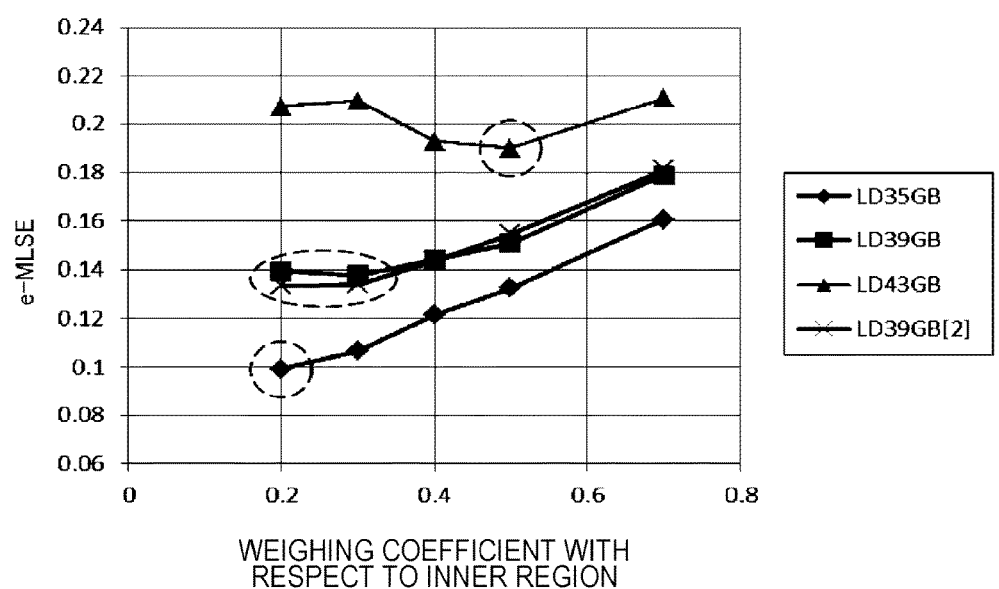
FIG. 11 is a graph illustrating a relationship between the linear density and the e-MLSE.

Patent Document 2 and Patent Document 3 disclose the following technology. Specifically, with respect to a signal of which a region is divided into three regions in the radial direction similar to the configurations F and G for comparison, signals of an inner region are multiplied (weighed) with a constant and are added to each other so as to cancel crosstalk. However, Patent Document 2 and Patent Document 3 do not describe a signal characteristic improvement in a high linear density recording, in which the shortest mark exceeds a cut-off spatial frequency of an optical system, in the present disclosure. Here, FIG. 11 illustrates results obtained by performing simulations of signals, which are subjected to constant multiplication and addition computation, with respect to LD35 GB, LD39 GB, LD43 GB in a system of an FIR filter that is constituted by 1T-interval 31 taps and the PR (1, 2, 3, 3, 3, 2, 1) similar to the configuration of the present disclosure on the assumption of the case of using the PRML detection method in combination. It can be seen that when a weighing coefficient is set to 0.2, the e-MLSE is improved to the same extent as in the pattern R3 at LD35 GB, but an improvement effect of the e-MLSE significantly decreases at LD39 GB, and the improvement effect is hardly obtained at LD43 GB.

In addition, Patent Document 2 implies a configuration of "weighing is performed even in a beam propagation direction so as to reproduce a reproduction signal of a small recording mark in an emphasizing manner" as an idea. Therefore, with regard to LD39 GB in which the e-MLSE improvement effect is reduced, a central region is further divided at a position corresponding to H3A, and weighing of two times is performed on an outer side and an inner side in the tangential direction. This result corresponds to LD39 GB[2], but the high linear density effect, which is implied, is hardly shown.

Figure 12:
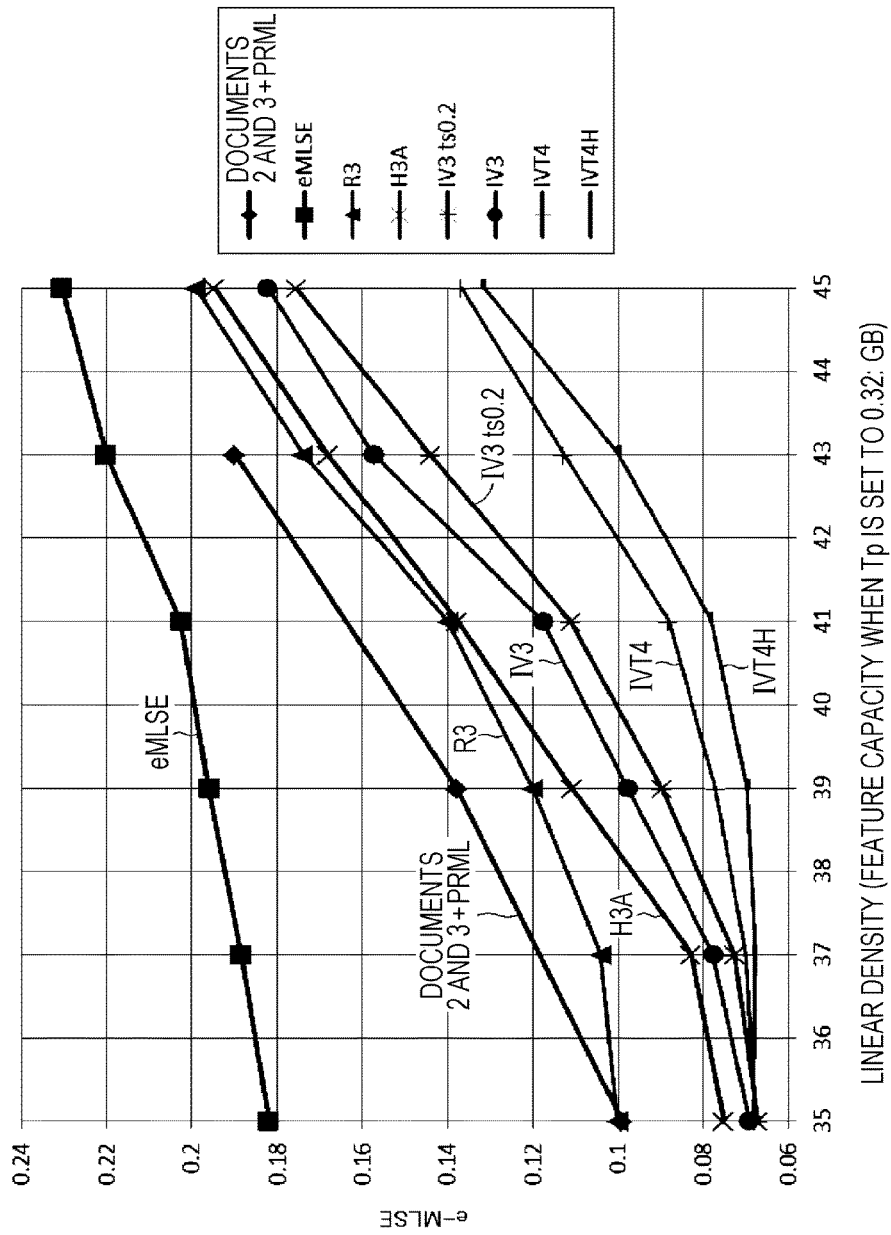
FIG. 12 is a graph illustrating a relationship between the linear density and the e-MLSE.

FIG. 12 is obtained by plotting results, which are obtained by an application example in which the technologies of Patent Document 2 and Patent Document 3 and the PRML detection method are combined, and a weighing coefficient is changed in accordance with a linear density, to the graph in FIG. 10 in an overlapping manner. It is clear that bottom characteristic superiority of the configuration of the present disclosure at LD35 GB, and another superiority of IVT4, and IVT4H in a high linear density are shown.

Hereinafter, description will be given of a mechanism in which a difference occurs in characteristics on the basis of a difference in a configuration of electro-optical filter characteristics with respect to respective patterns.

(Electrical Filter Characteristics in Configuration of Patent Document 2 and Patent Document 3+PRML, and Pattern R2)

As Comparative Example of the present disclosure, FIG. 13 illustrates a tap coefficient in a simulation result in the case of LD35 GB and frequency amplitude characteristics as an electrical filter corresponding to the tap coefficient in the FIR filter in a configuration of the application example of the Patent Documents and the FIR filter in the pattern R2. Characteristics L1 in the case of the pattern R2 represent frequency amplitude characteristics of a channel corresponding to the outer region B, and characteristics L2 represent frequency amplitude characteristics of a channel corresponding to the inner region A.

In the frequency amplitude characteristics, the horizontal axis represents n/(256T) (n: a value on the horizontal axis). For example, in the case of (n=64), (64/256T)=(¼ T). For example, in the case of using the RLL(1, 7) PP modulation method, when a channel clock period is set to "T", a mark length becomes 2T to 8T. (¼ T) represents a frequency in a case where a mark of 2T is repeated. At LD35 GB, the mark of 2T exceeds a spatial and optical cut-off frequency, becomes a frequency region in which reproduction is difficult, and has characteristics capable of reproducing a mark of 3T.

As can be seen from a result in which the e-MLSE at LD35 GB in FIG. 12 is the same as in each case, both a shape of a tap coefficient and frequency amplitude characteristics have not great difference. In addition, at LD35 GB (perturbation origin), even in the configuration of the application example of the Patent Documents, approximately the same characteristics are obtained with a configuration of connecting electrical filters which are independent for respective channels of the pattern R2, and in the case of a pattern such as R2 and R3, another effect obtained by providing independent electrical filters is limited.

(Characteristics of Adaptive Electro-Optical Filter in Pattern H3A)

In the pattern H3A, region division is performed in the tangential direction in addition to the radial direction, and the division is spatially and optically performed into three regions corresponding to signals which are different in a band in a linear density direction and a track density direction. Three-channel signals formed from signals of respective regions are allowed to pass through electrical filters which are different in a frequency and phase characteristics and are added to each other. According to this, reproduction performance is further enhanced in comparison to a configuration in which division is performed only in the radial direction.

Figure 14:
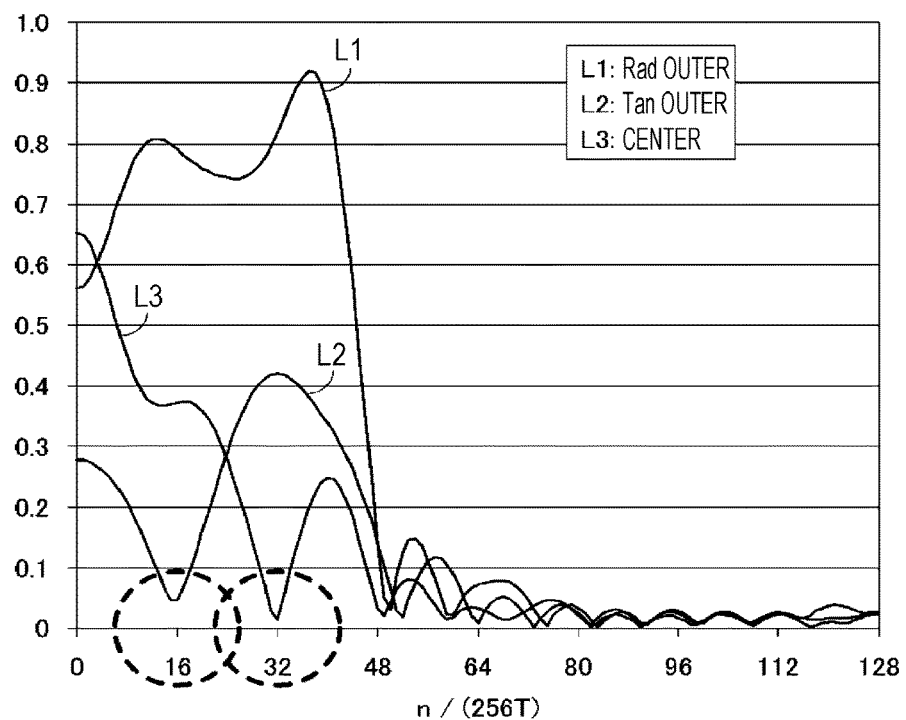
FIG. 14 is a graph illustrating frequency amplitude characteristics.

Adaptive electro-optical filter characteristics of the pattern H3A (refer to FIGS. 8A to 8G) in the case of LD35 GB are illustrated in FIG. 14. In frequency amplitude characteristics, the horizontal axis represents n(256T) (n: a value on the horizontal axis). For example, in the case of (n=64), (64/256T)=(¼ T). For example, in the case of using the RLL(1,7) PP modulation method, when a channel clock period is set to "T", a mark length becomes 2T to 8T. (¼ T) represents a frequency in a case where a mark of 2T is repeated. Characteristics L1 are frequency amplitude characteristics of a channel corresponding to the outer region B in the radial direction, characteristics L2 are frequency amplitude characteristics of a channel corresponding to the outer region C in the tangential direction, and characteristics L3 are frequency amplitude characteristics of a channel corresponding to the central region A. Furthermore, the characteristics are characteristic examples at the perturbation origin.

FIG. 15A illustrates a tap coefficient of each channel of the pattern H3A. For example, the tap number of the FIR filter is set to 31 taps. FIG. 15B illustrates frequency phase characteristics of each channel. The frequency phase characteristics represent a phase difference between two channels among three channels. Characteristics L11 represent a phase difference between reproduction information signals of channel respectively corresponding to the outer region C in the tangential direction and the outer region B in the radial direction. Characteristics L12 represent a phase difference between reproduction information signals of channels respectively corresponding to the central region A and the outer region B in the radial direction. Characteristics L13 represent a phase difference between reproduction information signals of channels respectively corresponding to the outer region C in the tangential direction and the central region A.

As described above, the filter characteristics of H3A have the following characteristic.

Filters, which are greatly different in an amplitude, a phase, and frequency characteristics, are constructed in respective regions of three channels, and thus it is possible to realize satisfactory signal reproduction.

At a frequency band (the vicinity, which is surrounded by a broken line, of a value of 43 on the horizontal axis) corresponding to a 3T signal, phases of the central region, and the outer region C in the tangential direction and the outer region B in the radial direction are set to deviate from each other by 180 deg.

The central region are set to characteristics of blocking a frequency band (the vicinity, which is surrounded by a broken line, of a value of 32 on the horizontal axis) corresponding to a 4T signal to suppress a false signal due to crosstalk.

An outer side in the tangential direction has to contribute to short mark reproduction, and thus a frequency band (the vicinity, which is surrounded by a broken line, of a value of 16 on the horizontal axis) corresponding to an 8T signal is blocked, and at a frequency band lower than the 8T signal, phases of the central region A and the outer region B in the radial direction, and the outer region C in the tangential direction are set to deviate from each other by 180 deg.

In this manner, a high-pass filter, a low-pass filter, a band-pass filter, and a band-stop (or notch) filter, and the like are constructed for each region, and thus filter characteristics, which are not realized by only an optical manner or by only an electrical manner, are realized.

Furthermore, in the description of this specification, the tap coefficient of the adaptive equalizer unit (FIR filter) is appropriately controlled. However, in a case where the best tap coefficient is obtained from simulation results, it is possible to use an equalizer unit in which the tap coefficient is fixed, or it is possible to use an analog filter and a digital filter having the same characteristics other than the FIR filter. An adaptive type is excellent from the viewpoint of performance, but an adaptive control of the tap coefficient may not be performed, and thus processing and hardware can be simplified. In addition, the fixed-type equalizer unit may be used at a part of a plurality of channels, and the adaptive equalizer unit may be used at the other channels.

(Electrical Filter Optimal for Pattern IVT4)

As can be seen from FIG. 12, IVT4 has very satisfactory e-MLSE characteristics at LD35 GB, and even in the case of being set to a high linear density, IVT4 can maintain a state in which the e-MLSE is satisfactory in comparison to the patterns R3, H3A, and IV3 which are not provided with channels different in a central position in the tangential direction.

Figure 16:
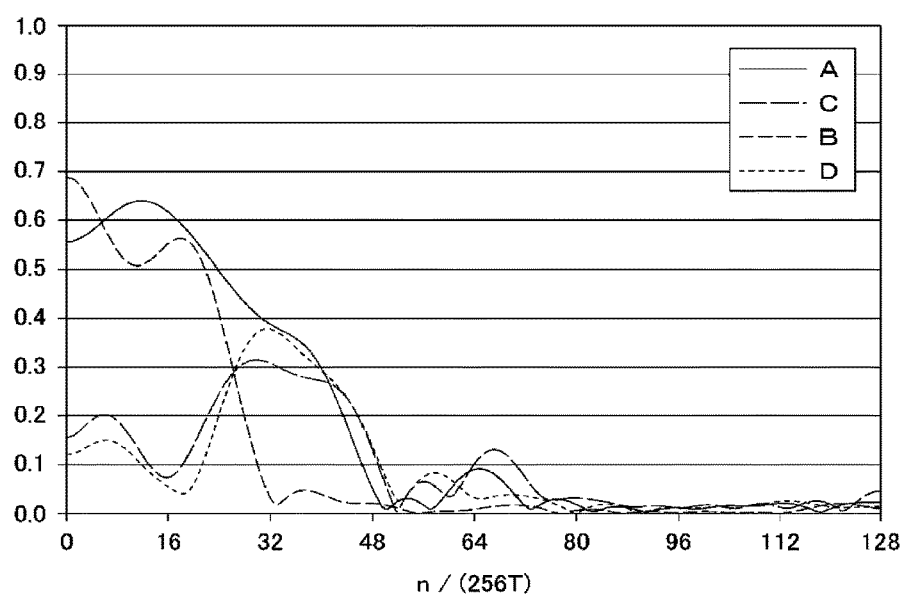
FIG. 16 is a graph illustrating the frequency amplitude characteristics.

Description will be given of an electrical filter that is optimal for IVT4. First, tap coefficients (a tap number of the FIR filter is set to 31 taps) of respective channels corresponding to the regions A to D in the case of LD35 GB are illustrated in FIG. 17A, frequency amplitude characteristics are illustrated in FIG. 16, and frequency phase characteristics are illustrated in FIG. 17B. The frequency phase characteristics represent a phase difference between a channel corresponding to the outer region C in the tangential direction, and a channel corresponding to the outer region D in the tangential direction.

Filter characteristics of IVT4 in FIG. 16 and FIGS. 17A and 17B have the following characteristic.

Similar to the pattern H3A, the central region is set to a low-pass characteristic, and the outer region in the tangential direction is set to a high-pass characteristic (with regard to "high-pass" stated here, in a frequency band contributing signal regeneration, a band-pass characteristic, which allows a band corresponding to a relatively short mark to pass, is relatively described as "high-pass").

In addition, in the pattern IVT4, the outer region in the tangential direction is independently constituted by two channels, and the two regions constitute a filter having a phase difference of approximately 120 deg to 90 deg (as can be seen from the tap coefficient, approximately 2 clocks) at frequency bands (the vicinities of values of 43 and 32 on the horizontal axis) corresponding to 3T and 4T. According to this, with regard to a simple reproduction amplitude by a total of signals, detection with relatively high sensitivity is possible with respect to a short mark. With regard to the short mark reproduction, satisfactory reproduction signal characteristics are realized by also utilizing a phase difference between regions, and the utilization of the phase difference also contributes satisfactory characteristics in a relatively high linear density.

In bands corresponding to 4T (the vicinity of a value of 32 on the horizontal axis) and 3T (the vicinity of a value of 43 on the horizontal axis), the region B, which hardly includes signal components of the bands, suppress crosstalk components and other noise components in the regions with the low-pass filter characteristic, reduces the crosstalk components due to a phase difference between C and D, and cancels the remaining crosstalk components by a balance in frequency amplitude characteristics with A. As a result, it not necessary to raise the frequency amplitude characteristics of C, D, and A more than necessary, and this also leads to realization of satisfactory reproduction signal characteristics.

Figure 18:
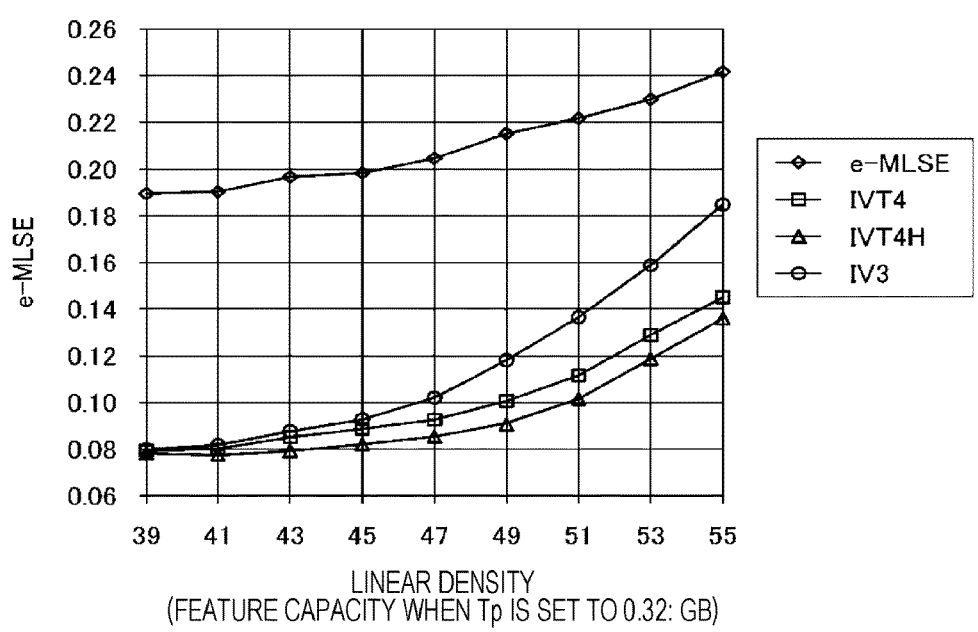
FIG. 18 is a graph illustrating a relationship between the linear density and the e-MLSE.

In a high linear density, it is effective to lengthen a constraint length of PRML. For example, as an example in which the constraint length is set to 9, simulation results in the case of being set to PR (1, 2, 3, 4, 4, 4, 3, 2, 1) are illustrated in FIG. 18.

Simulation conditions are as follows.

Tp=0.225 μm (in both a land and a groove), NA=0.85
PR (123444321) evaluation index: e-MLSE groove depth (1/15)λ
Mark width=Tp×0.7 Disc Noise and Amp Noise are present
Tap 1T-interval 31 taps
Perturbation origin (state in which the entirety of defocus, disc skew, and the like are set to the origin)

In addition, it is assumed that a linear density is shown as LD (feature capacity at Tp=0.32 μm) by using a feature capacity when a track pitch Tp is 0.32 μm in a disc having a diameter of 120 mm in a similar manner as the case of using PR (1, 2, 3, 3, 3, 2, 1).

In the simulation results in FIG. 18, a graph indicated by e-MLSE is a result in a case where region division is not performed. As can be seen from FIG. 18, in IV3, which is not provided with channels different in a central position in the tangential direction similar to the case of PR (1, 2, 3, 3, 3, 2, 1), deterioration due to a high linear density is great. In IVT4 provided with channels different in a central position in the tangential direction, it can be seen that a high linear density effect corresponding to LD3 GB is also provided in a linear density direction in comparison to IV3 in which division positions in the radial direction and the tangential direction are the same as each other.

It is confirmed that in IVT4H in which an optical filter shape is optimized by giving a priority to characteristics in a high linear density, a high linear density effect corresponding to LD1 GB is obtained in comparison to IVT4.

As described above, for realization of a high density of the optical disc, in a case where a high density in the linear density direction is realized by shortening a channel bit length, that is, a mark length, and a high density in the track density direction is realized by narrowing a track pitch, recording marks are two-dimensionally arranged on a signal recording surface.

Figure 19:
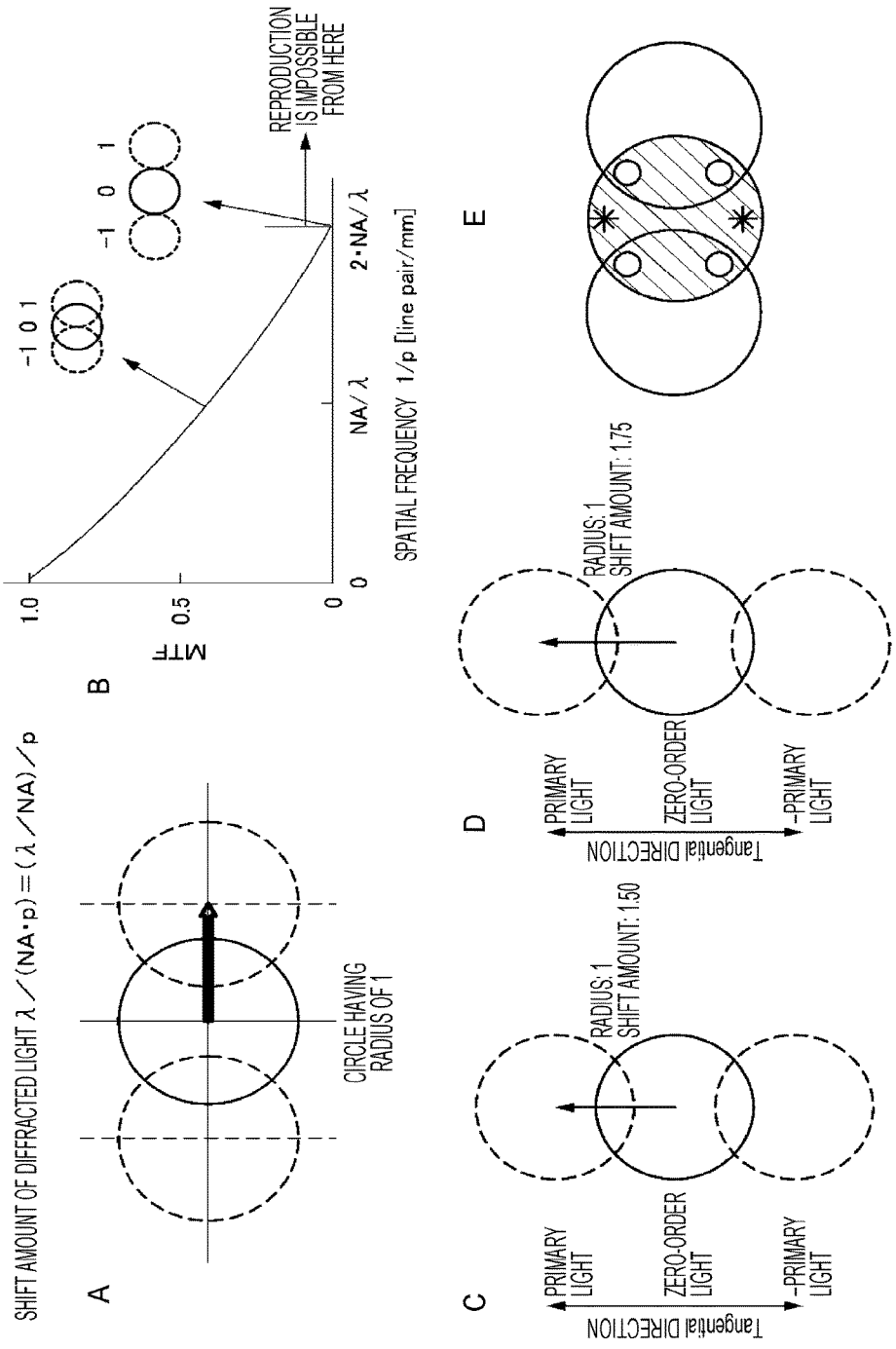
FIGS. 19A to 19E are schematic diagrams illustrating a reproduction signal of an optical disc.

A reproduction signal in the optical disc detects a variation of light and darkness which occurs when diffracted light beams, which are generated due to a periodic structure of a recording mark, a groove, and the like, overlap each other and interfere each other. In ±primary diffracted light beams due to a periodic structure of a period p, in a case where a pupil radius is set to 1 as illustrated in FIG. 19A, a shift amount of the center is represented by $\lambda/(NA \times p)$. The greater the overlapping is, the greater the amplitude of a reproduction signal is, and the smaller the overlapping is, the smaller the amplitude of the reproduction signal is. When the overlapping disappears, that is, the shift amount $\lambda/(NA \times p)$ becomes 2, the amplitude becomes zero. As a result, spatial frequency characteristics of modulation transfer function (MTF) become as illustrated in FIG. 19B. A cut-off spatial frequency becomes $1/p=2NA/\lambda$ because $\lambda/(NA \times p)$ is 2. In a case where a periodic structure smaller than the cut-off spatial frequency continues, an amplitude becomes zero.

When being applied to a system in which a wavelength is 405 nm and NA is 0.85 as described above, $1/p=2NA/\lambda$ is obtained, and $p=\lambda/(2NA)=238$ nm becomes the minimum reproducible periodic structure. This represents that in a system (LD35.2 GB) of 53 nm/channel bit in RLL(1,7) PP which is exemplified as a low linear density, the shortest 2T mark/space becomes 53 nm×2×2=212 nm, this exceeds the cut-off spatial frequency, and amplitude of continuation of the 2T mark/space becomes zero. With regard to a periodic structure corresponding to 3T mark/space of 53 nm×3×2=318 nm, the shift amount $\lambda/(NA \times p)$ becomes 1.50, and thus a region, in which a zero-order light beam and ±primary light beams overlap each other, in FIG. 19C contributes to signal reproduction. In a case where the high linear density is slightly enhanced, and thus a system (LD41 GB) of 45.47 nm/channel bit is obtained, the shortest 2T mark/space becomes 45.47 nm×2×2=182 nm, and this exceeds the cut-off spatial frequency. In addition, with regard to a periodic structure corresponding to 3T mark/space 45.47 nm×3×2=273 nm, the shift amount $\lambda/(NA \times p)$ becomes 1.75. Accordingly, a region, in which the zero-order light beam and the ±primary light beams overlap each other, in FIG. 19D contributes to signal reproduction. Even in a density in which the amplitude of 2T mark/space becomes zero by the PRML, signal processing is not broken down, but short mark reproduction quality is an important factor.

As described above, in the electro-optical filter characteristics of the patterns H3A and IVT4, the outer region in the tangential direction is set to a high-pass filter that passes a high band of a frequency band corresponding to a short mark such as 3T and 4T, and the central region is set to a low-pass filter that passes frequently passes a frequency band corresponding to a long mark of 5T or greater. As can be seen from FIG. 19C and FIG. 19D, the above-described filter configuration represents that enhancement of reproduction signal quality of a own track is realized by effectively separating a region that is to further contribute to reproduction of a band corresponding to a spatially and optically short mark and a region that is to further contribute to reproduction of a band corresponding to a long mark, by emphasizing a frequency component in which a ratio of a reproduction signal component of the own track in each region is expected to be high, and by suppressing or blocking a frequency component in which a ratio of a reproduction signal component of an adjacent track is expected to be high, or canceling the frequency component through balancing with other signals. In addition, in the case of IVT4, signals from two outer regions in the tangential direction are allowed to have a phase difference, and thus with regard to a simple reproduction amplitude by a total of signals, detection with relatively high sensitivity is possible with respect to a short mark. However, as can be seen from comparison between FIG. 19C and FIG. 19D, as a linear density becomes high, a region, which can contribute to reproduction of not only 2T mark/space but also 3T mark/space, also decreases, and thus it may enters a situation that is greatly disadvantageous in the simple reproduction by a total of signals. In the case of IVT4, characteristic deterioration is suppressed due to high sensitivity through phase difference detection.

As described above, for separation into a plurality of signals which are spatially and optically different in a band in the linear density direction and/or the track density direction, region division is performed in the tangential direction and the radial direction, and electrical filters such as a high-pass filter, a low-pass filter, a band-pass filter, and a band-stop (or notch) filter, which have respective characteristics optical for respective signals, are applied to signals from respective regions, and then the signals are added up. According to this, it is possible to obtain a satisfactory reproduction signal in which inter-code interference and signal leakage from an adjacent track are reduced.

When constructing a filter such as IVT4 and IVT4H which effectively separates signals which are spatially and optically different in a band instead of simple region division in the tangential direction and the radial direction, it is possible to obtain satisfactory e-MLSE at a position of the perturbation center, and it is possible to enlarge various margins including a radial comatic aberration margin. In FIG. 19E, with regard to *-attached diffractive light beams in accordance with a track structure which corresponds to short mark reproduction, it is effective to separate not only signals of a zero-order light beam region, but also signals of an interference region (attached with O) with ±primary diffracted light beams due to the track structure.

As illustrated in the characteristics in FIG. 14 and FIG. 16, the outer regions (A1 and A2) in the radial direction are set to a high gain over a wide band, and thus the regions are sensitive to a noise. In addition, when an outer channel in the tangential direction is provided, it is advantageous for a high linear density.

(Effect of Amplifier Noise)

Figure 20:
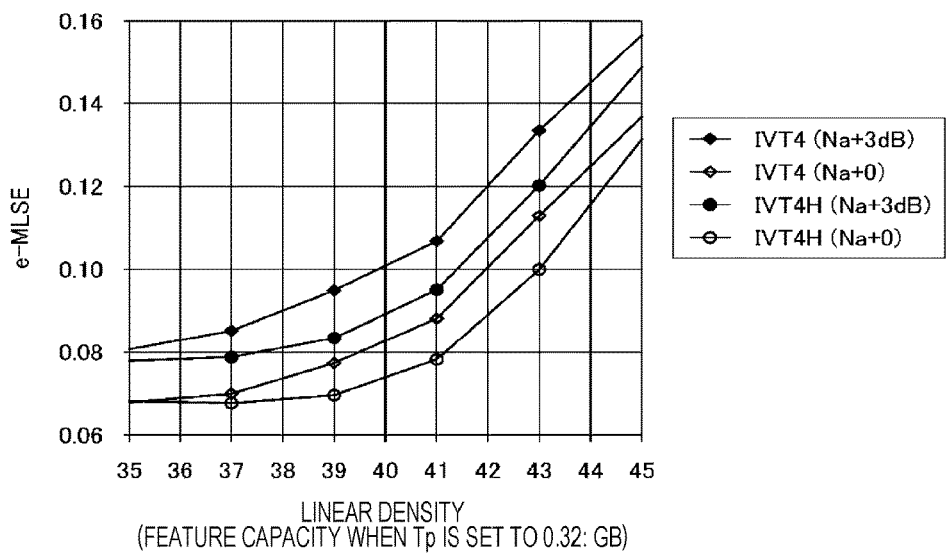
FIG. 20 is a graph illustrating a relationship between the linear density and the e-MLSE.

FIG. 20 illustrates simulation results illustrating an effect of a random noise that is represented by an amplifier noise. In FIG. 20, PRML of PR(1233321) is used. Simulation results with respect to IVT4 and IVT4H are illustrated in the drawing. A relationship between IVT4 (Na+0) and IVT4 (NA+3 dB) represents a case where the random noise represented by the amplifier noise increases by 3 dB. This is also true of IVT4H (Na+0) and IVT4H (Na+3 dB).

As can be seen from FIG. 20, a configuration in which an area (amount of light) of an outer channel in the radial direction is large, and a configuration in which an area (amount of light) of an outer channel in the tangential direction is large are also effective for an increase in the random noise represented by the amplifier noise (alternatively, the same shall apply to a relative increase in the random noise represented by the amplifier noise due to a decrease in the amount of signal light).

Figure 21:
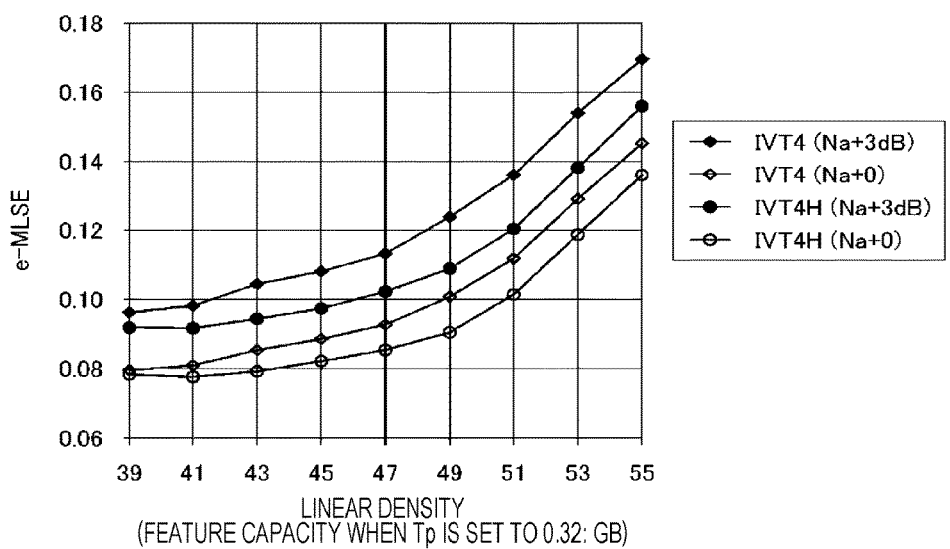
FIG. 21 is a graph illustrating a relationship between the linear density and the e-MLSE.

FIG. 21 illustrates simulation results illustrating an effect of the random noise that is represented by the amplifier noise. In FIG. 21, PRML of PR (123444321) is used. Simulation results with respect to IVT4 and IVT4H are illustrated in the drawing. Similar contents to described above are illustrated in the drawing.

FIG. 22A illustrates simulation results illustrating an effect of the random noise that is represented by the amplifier noise. In FIG. 22A, PRML of PR (123444321) is used in FIG. 22A. Simulation results with respect to IVT4 (illustrated in FIG. 22B) are illustrated in the drawing. Here, an effect is illustrated when assuming that a random noise other than the amplifier noise is sufficiently small, and the amplifier noise is dominant as the random noise for more simplification.

In FIG. 22A, (R 2 amp) represents a case where outer channels A1 and A2 in the radial direction are respectively received by individual detectors, and are added to each other through an IV amplifier. Two IV amplifiers are used, and thus the amplifier noise increases. (T 2 amp) represents a case where one channel C or D in the tangential direction uses two amplifiers, and (C 2 amp) represents a case where the central channel uses two amplifiers. (Na+3 dB) represents the entirety of four channels use two amplifiers.

FIG. 23 illustrates simulation results illustrating an effect of the amplifier noise. In FIG. 23A, PRML of PR(123444321) is used.

Simulation results with respect to IVT4H (illustrated in FIG. 23B) are illustrated in the drawing. In FIG. 23A, the meaning of (R 2 amp), (T 2 amp), (C 2 amp), and (Na+3 dB) is similar to in FIG. 22A.

As can be seen from the above-described cases, an e-MLSE value deteriorates by 1% to 2% (0.01 to 0.02) due to an increase in the amplifier noise or a decrease in the amount of signals, and thus it is important to design disc reflectivity capable of reducing the amplifier noise, and capable of securing sufficient reproduction power and a sufficient amount of signals in a range not deteriorating a recording signal.

(Optimal PR Class)

In the above description, simulation results, which are obtained by fixing a linear density range of LD35 GB to LD45 GB to PR(1, 2, 3, 3, 3, 2, 1) having a constraint length of 7, and a linear density range of LD39 GB to LD55 GB is fixed to PR(1, 2, 3, 4, 4, 4, 3, 2, 1) having a constraint length of 9, are illustrated for simplification.

However, actually, an optimal PR class becomes different depending on a shape of an optical filter, particularly, whether or not channels corresponding to a plurality of regions different in a central position in the tangential direction are provided, or depending on a signal recording density, particularly, a configuration in which a density in a linear density direction is set to a certain extent.

Figure 24:
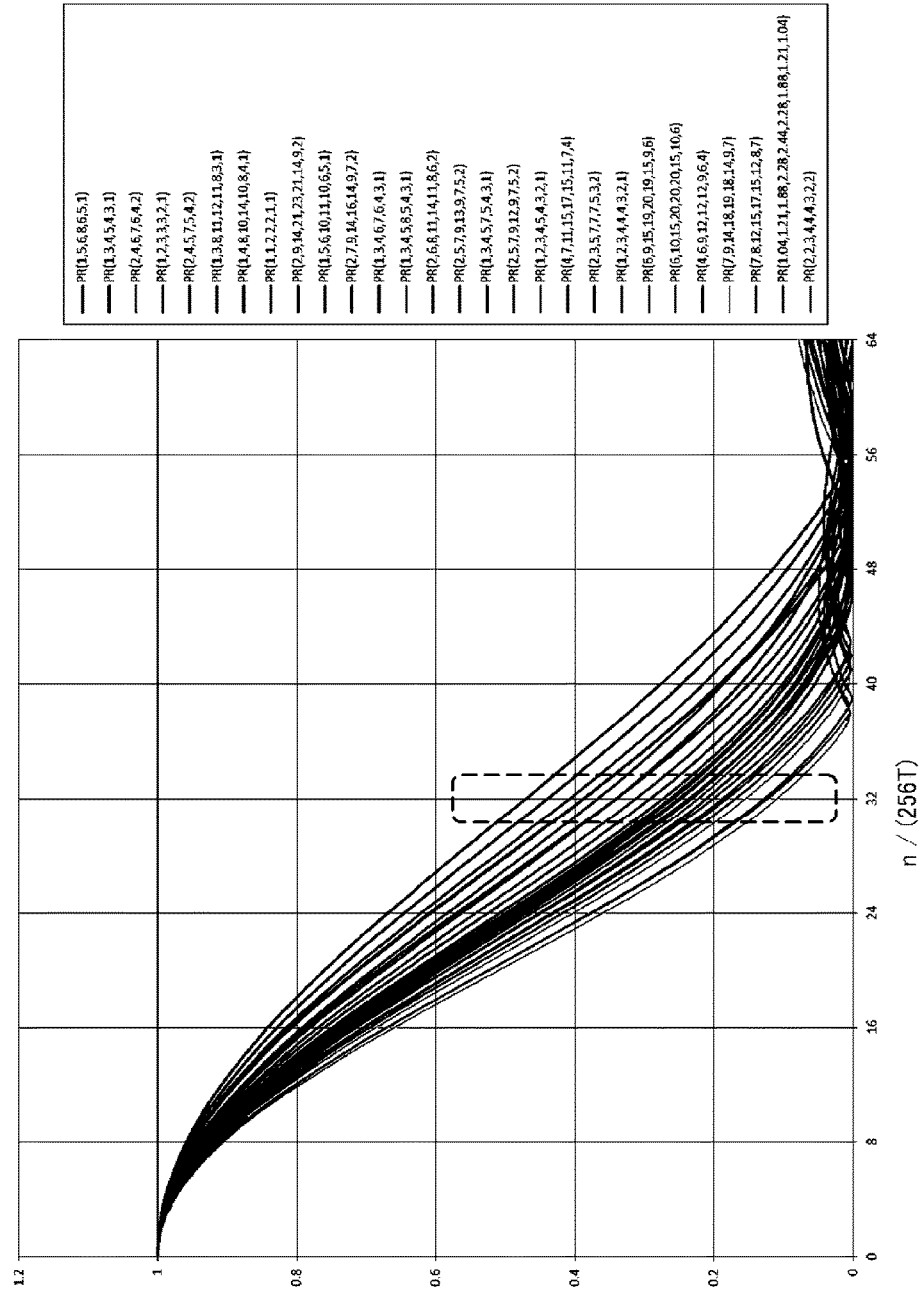
FIG. 24 is a graph illustrating frequency characteristics of an adaptive equalization target.

As the PR class, various classes can be considered. With regard to various PR classes which are considered to be effective for the optical filter and the signal recording density which are assumed in the present disclosure, adaptive equivalent target frequency characteristics are illustrated on the horizontal axis (n/256T) similar to an electrical filter in FIG. 24. As an index value that specifies characteristics of respective PR classes, it is effective to use a value (PR-TL (4T)) of an equivalent target (target level) on the horizontal axis in a frequency corresponding to "32" on the horizontal axis, that is, 4T mark/space. In a high linear density, spatial and optical cut-off frequency shifts to the left in the horizontal-axis direction, and thus the PR-TL (4T) corresponding to an optimal PR class decreases.

Actually, results, which are obtained by performing signal reproduction with regard to a disc which is prepared to have a single-surface three-layer structure, and on which recording is performed in a plurality of signal recording densities by using a configuration provided with an optical filter including channels corresponding to a plurality of regions different in a central position in the tangential direction, and a configuration provided with an optical filter not including the channels, are illustrated below.

Experimental conditions are as follows.
Disc
Recording surface: single-surface three-layer structure
Tp=0.225 μm (in both a land and a groove)
Groove depth: approximately (1/16)λ
Multi-track recording is performed with respect to both the land and the groove at the following signal recording density.
Signal Recording Density
LD35.18 GB (53 nm/channel bit) 50.0 GB/layer, equivalent to 300 GB in both-surface six layers
LD41.1 GB (45.4 nm/channel bit) 58.5 GB/layer, equivalent to 351 GB in both-surface six layers
LD47.0 GB (39.7 nm/channel bit) 66.8 GB/layer, equivalent to 401 GB in both-surface six layers
Reproduction Optical System
NA=0.85 wavelength: 405 nm
Optical Filter
Two Kinds Described in FIG. 25
VHT4: signals of a total of four channels are obtained. The four channel include three channels corresponding to the three regions B, D, and E which are different in a central position in the tangential direction, and one channel corresponding to an outer region A (A1+A2) in the radial direction. VHT4 is an optical filter having characteristics which are very close to those in the above-described IVT4. VHT4 is set as Representative Example of a type (T type) including a plurality of regions different in a central position in the tangential direction.
JR4: channels corresponding to a plurality of regions different in a central position in the tangential direction are not provided. Signals of a total of four channels are obtained. The four channels include three channels corresponding to three regions C, E, and D which are different in a central position in the radial direction, and one channel corresponding to an outer region (A+B) in the tangential direction. JR4 is set as Representative Example of a type (R type) including a plurality of regions different in a central position in the radial direction.
Adaptive Equalizer
Tap: 2T-interval 25 taps (49T width)
With tap initial value (an example is illustrated in FIGS. 26A and 26B)
PR Class
Classes which include PR (1, 2, 3, 3, 3, 2, 1) and PR (1, 2, 3, 4, 4, 4, 3, 2, 1) described in Table 1 and are in a range of PR-TL(4T)=0.128 to 0.471
Evaluation Index
e-MLSE

TABLE 1

| | | PR-TL (4T) |
|---|---|---|
| ISI7 | PR (1, 5, 6, 8, 6, 5, 1) | 0.471 |
| ISI7 | PR (1, 3, 4, 5, 4, 3, 1) | 0.440 |
| ISI7 | PR (2, 4, 6, 7, 6, 4, 2) | 0.408 |
| ISI7 | PR (1, 2, 3, 3, 3, 2, 1) | 0.389 |

TABLE 1-continued

| | | PR-TL (4T) |
|---|---|---|
| ISI7 | PR (1, 1, 2, 2, 2, 1, 1) | 0.341 |
| ISI9 | PR (1, 5, 8, 10, 11, 10, 6, 5, 1) | 0.292 |
| ISI9 | PR (2, 7, 9, 14, 16, 14, 9, 7, 2) | 0.274 |
| ISI9 | PR (1, 3, 4, 6, 7, 6, 4, 3, 1) | 0.264 |
| ISI9 | PR (2, 6, 8, 11, 14, 11, 8, 6, 2) | 0.251 |
| ISI9 | PR (1, 2, 3, 4, 5, 4, 3, 2, 1) | 0.233 |
| ISI9 | PR (4, 7, 11, 15, 17, 15, 11, 7, 4) | 0.223 |
| ISI9 | PR (2, 3, 5, 7, 7, 7, 5, 3, 2) | 0.211 |
| ISI9 | PR (1, 2, 3, 4, 4, 4, 3, 2, 1) | 0.201 |
| ISI9 | PR (6, 9, 15, 19, 20, 19, 15, 9, 8) | 0.188 |
| ISI9 | PR (6, 10, 15, 20, 20, 20, 15, 10, 6) | 0.181 |
| ISI9 | PR (4, 6, 9, 12, 12, 12, 9, 6, 4) | 0.169 |
| ISI9 | PR (7, 8, 14, 18, 19, 18, 14, 9, 7) | 0.154 |
| ISI9 | PR (7, 8, 12, 15, 17, 15, 12, 8, 7) | 0.128 |

Figure 27:
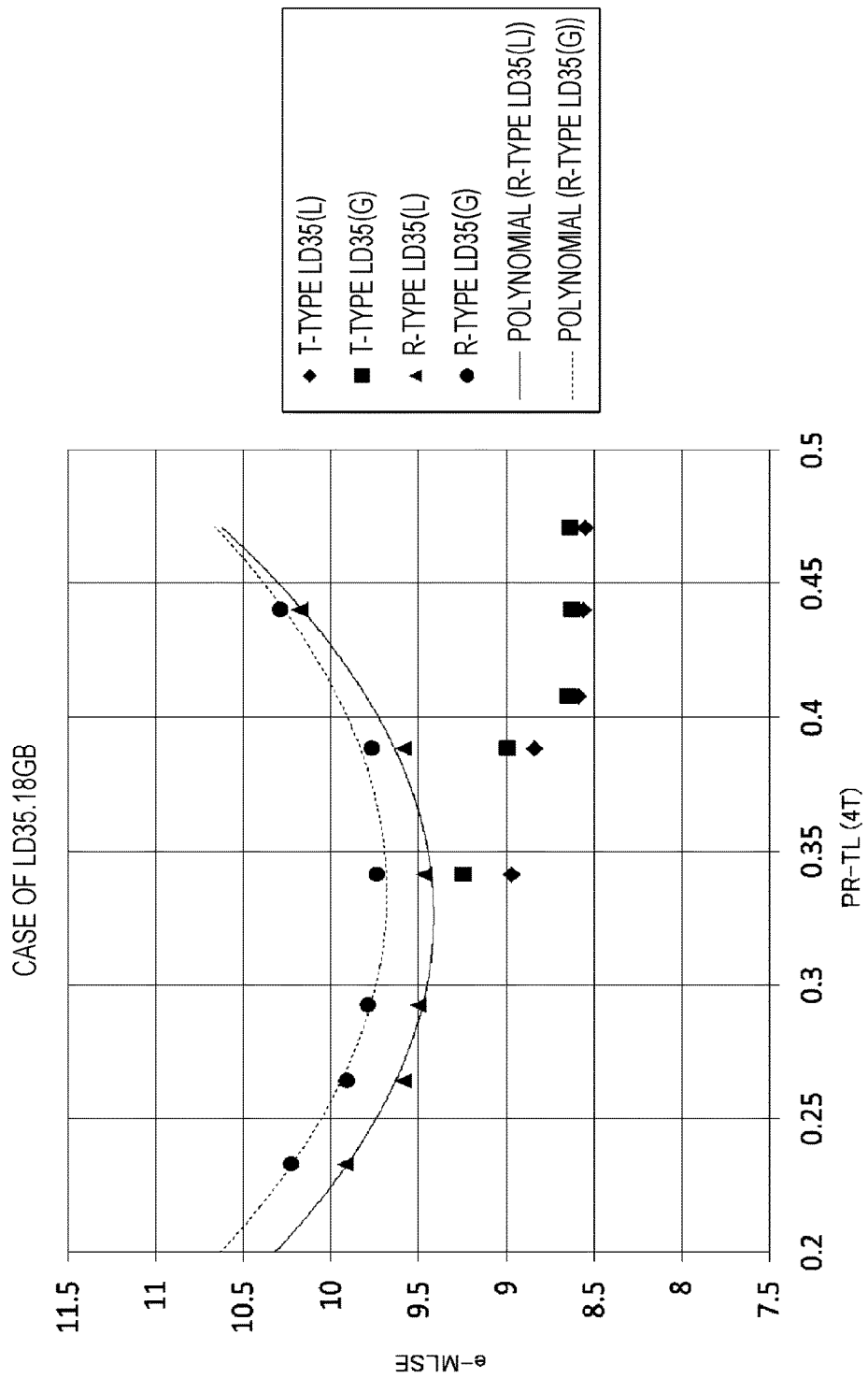
FIG. 27 is a graph illustrating a relationship between PR-TL(4T) and the e-MLSE.

FIG. 27 illustrates experiment results in the case of LD35.18 GB (53 nm/channel bit), 50.0 GB/layer that is equivalent to 300 GB in both-surface six layers.

Figure 28:
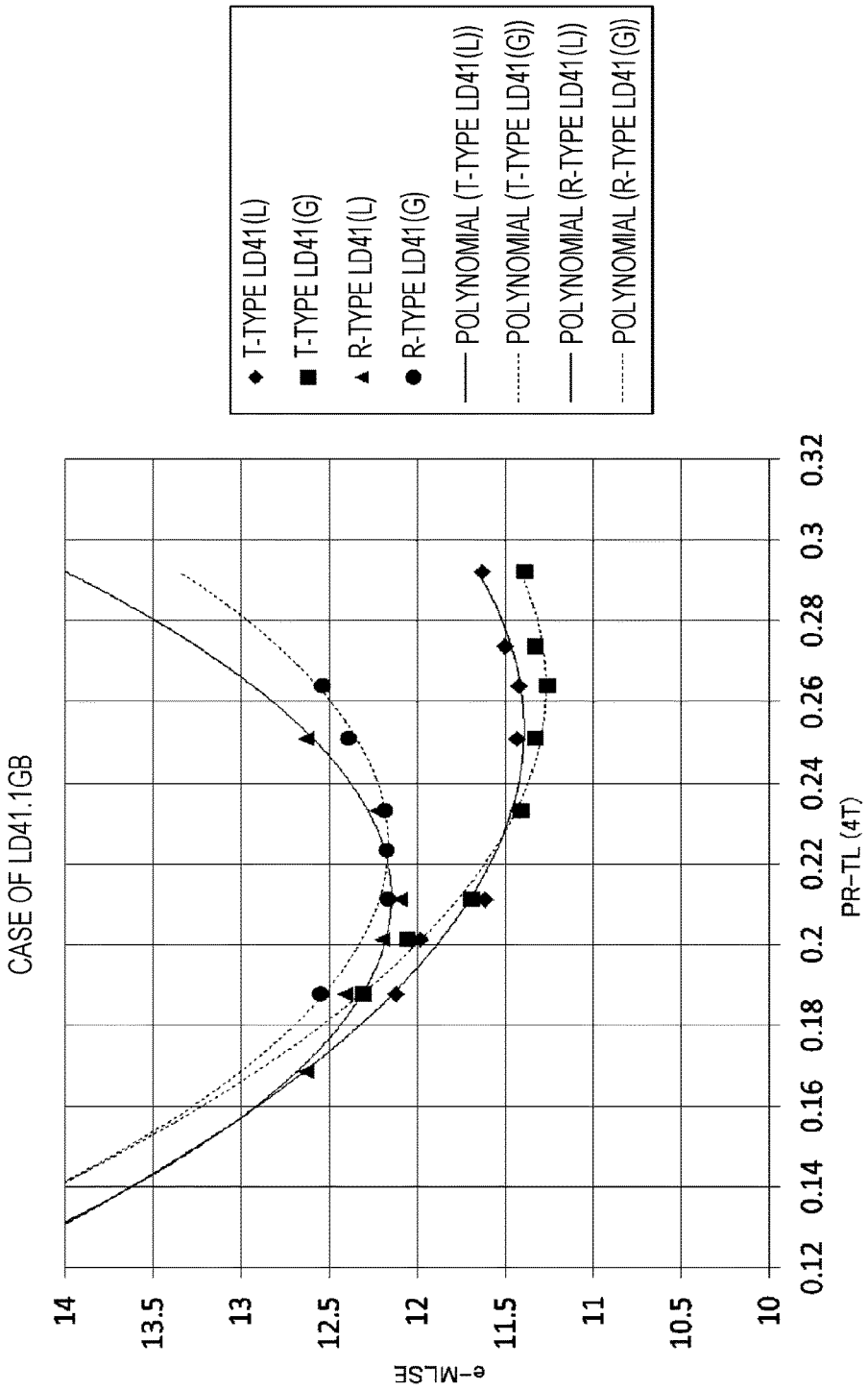
FIG. 28 is a graph illustrating a relationship between the PR-TL(4T) and the e-MLSE.

FIG. 28 illustrates experiment results in the case of LD41.1 GB (45.4 nm/channel bit), 58.5 GB/layer that is equivalent to 351 GB in both-surface six layers.

Figure 29:
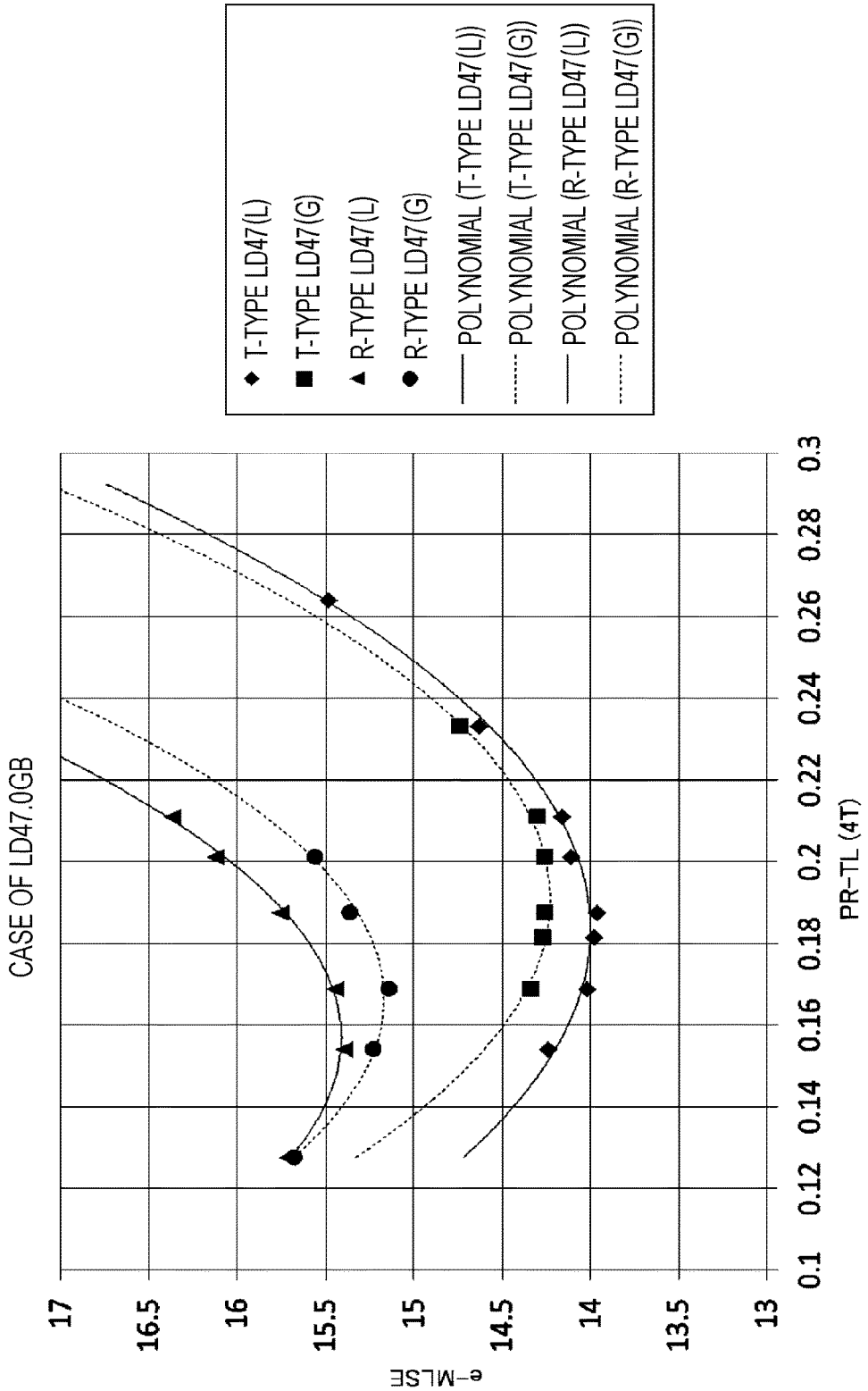
FIG. 29 is a graph illustrating a relationship between the PR-TL(4T) and the e-MLSE.

FIG. 29 illustrates experiment results in the case of LD47.0 GB (39.7 nm/channel bit), 66.8 GB/layer that is equivalent to 401 GB in both-surface six layers.

The horizontal axis represents an equivalent target value PR-TL (4T) at a frequency corresponding to 4T mark/space of the PR class that is used in reproduction, and the vertical axis represents an average value of e-MLSE (described as a percentage) in a sufficiently wide section.

Indication by T-type corresponds to a case where VHT4 is used, indication by R-type corresponds to a case where JR4 is used, (G) represents groove reproduction in an area in which recording is performed on both a land and a groove, and (L) represents land reproduction.

As can be seen from FIG. 27 and Table 1, at LD35.18 GB, in the case of the R-type JR4, an optimal value is obtained when PR-TL(4T) close to PR (1, 1, 2, 2, 2, 1, 1) is 0.325 to 0.33 in combination with the land and the groove. In a case T-type VHT4, e-MLSE characteristics become approximately flat when PR-TL (4T) is 0.41 or greater in combination with the land and the groove. As described above, it can be seen that the optical PR class is different between the R-type and the T-type. In addition, when PR (1, 2, 3, 3, 3, 2, 1) used in the simulation is set to a reference, the optical PR-TL(4T) of the R-type is located on a small side, an optimal PR-TL (4T) of the T-type is located on a large side, and the class is a PR class suitable for comparison in fixed PR.

As can be seen from FIG. 28 and Table 1, at LD41.1 GB, the land of the R-type JR4 has an optimal e-MLSE in the vicinity of PR(2, 3, 5, 7, 7, 7, 5, 3, 2), the groove of the R-type JR4 has an optimal e-MLSE in the vicinity of PR (4, 7, 11, 15, 17, 15, 11, 7, 4), the land of the T-type VHT4 has an optimal e-MLSE in the vicinity of PR(2, 6, 8, 11, 14, 11, 8, 6, 2), and the groove of the T-type VHT4 has an optimal e-MLSE in the vicinity of PR (1, 3, 4, 6, 7, 6, 4, 3, 1). As described above, the optimal PR class is different between the R-type and the T-type, and the optimal PR class is different between the land and the groove.

As can be seen from FIG. 29 and Table 1, at LD47.0 GB, the land of the R-type JR4 has an optimal e-MLSE in the vicinity of PR (7, 9, 14, 18, 19, 18, 14, 9, 7), the groove of the R-type JR4 has an optimal e-MLSE in the vicinity of the PR (4, 6, 9, 12, 12, 12, 9, 6, 4), and both of the land and the groove of the T-type VHT4 have an optimal e-MLSE in the vicinity of PR (6, 9, 15, 19, 20, 19, 15, 9, 6). Here, even in a case where the optimal PR class used in experiment is the same in each case, it can be seen that the PR class is different between the land and the groove from the aspect of the PR-TL(4T) value.

Here, when PR (1, 2, 3, 4, 4, 4, 3, 2, 1) used in simulation under high linear density conditions is set as a reference, it can be seen that the optimal PR-TL (4T) at LD41.1 GB is located on a large side in both the R-type and the T-type, the optimal PR-TL (4T) at LD47.0 GB is located on a small side in both the R-type and the T-type, and the class is a suitable PR class for comparison in fixed PR.

Figure 30:
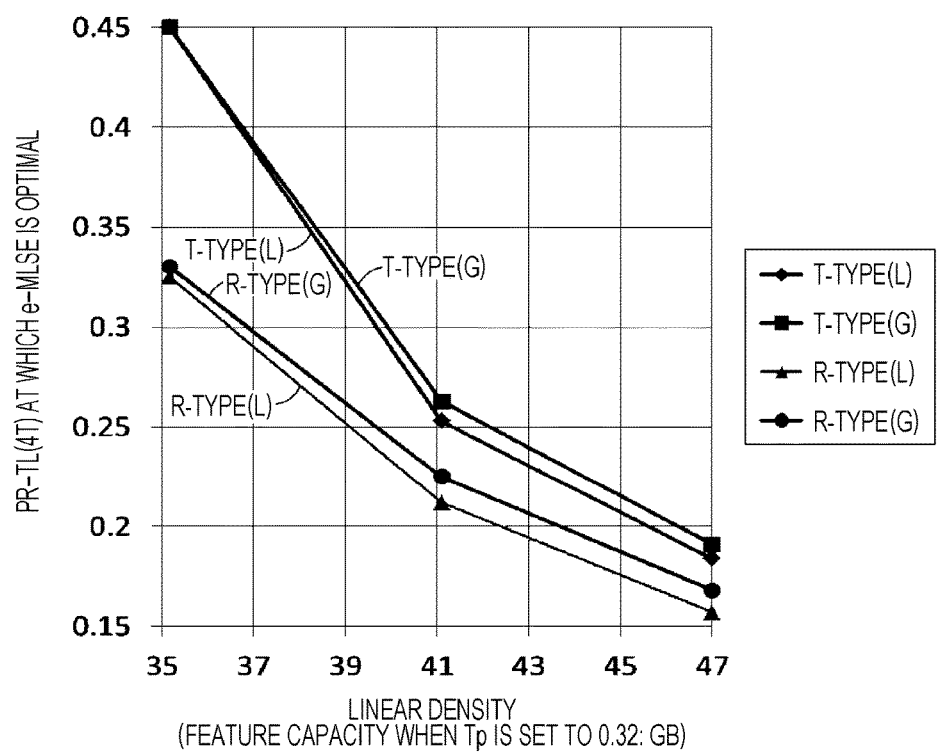
FIG. 30 is a graph illustrating a relationship between optimal PR-TL(4T) and the linear density.

FIG. 30 is obtained by plotting a relationship between the optimal PR-TL(4T) and a linear density with respect to condition of each of the land and the groove of the R-Type and the T-type. PR-TL(4T) in which e-MLSE becomes optimal and the linear density has a high correlation. Accordingly, when obtaining a linear density relationship in which an optimal PR-TL (4T) becomes the same between the R-type and the T-type from a graph, it can be seen that the linear density corresponds to approximately LD3 GB, and the same effect as the high linear density effect of the T-type, which is confirmed in the simulation with fixed PR, can be confirmed in the experiment.

When selecting an optimal PR class from a plurality of PR classes, it is effective to use a value of a corresponding PR-TL(4T) as a reference. After confirming reproduction characteristics with respect to the plurality of PR classes corresponding to another PR-TL (4T) as a candidate, a PR class, which is the closest to a margin center with respect to the PR-TL (4T), may be selected.

FIGS. 31A and 31B illustrate a relationship between e-MLSE and i-MLSE, and a linear density in the case of selecting an optimal PR class. In the case of performing reproduction after selecting the optimal PR class, it can be seen that a relationship between the linear density and the e-MLSE linearly varies at the same inclination in both the R-type and the T-type. In addition, at LD35.18 GB, it can be seen that the e-MLSE and the i-MLSE become approximately the same value in both the R-type and the T-type, and a difference between the e-MLSE and the i-MLSE increases as a linear density becomes high. The reason for this is as follows. As described above, in the case of the high linear density, a data pattern that is likely to cause an error varies, and thus a difference between the e-MLSE to which the pattern is added, and the i-MLSE to which the pattern is not added increases.

According to the experiment results, e-MLSE is slightly poor in comparison to the above-described simulation results. This difference is a difference that is sufficiently explained by a situation in which the e-MLSE varies by approximately 1% in experiment results depending on a recording state in a measurement section, a situation in which the random noise such as the above-described amplifier noise further increases in the case of an experiment disc having a single-surface three-layer structure in comparison to the simulation, a difference in a recording mark, and the like.

Figure 32:
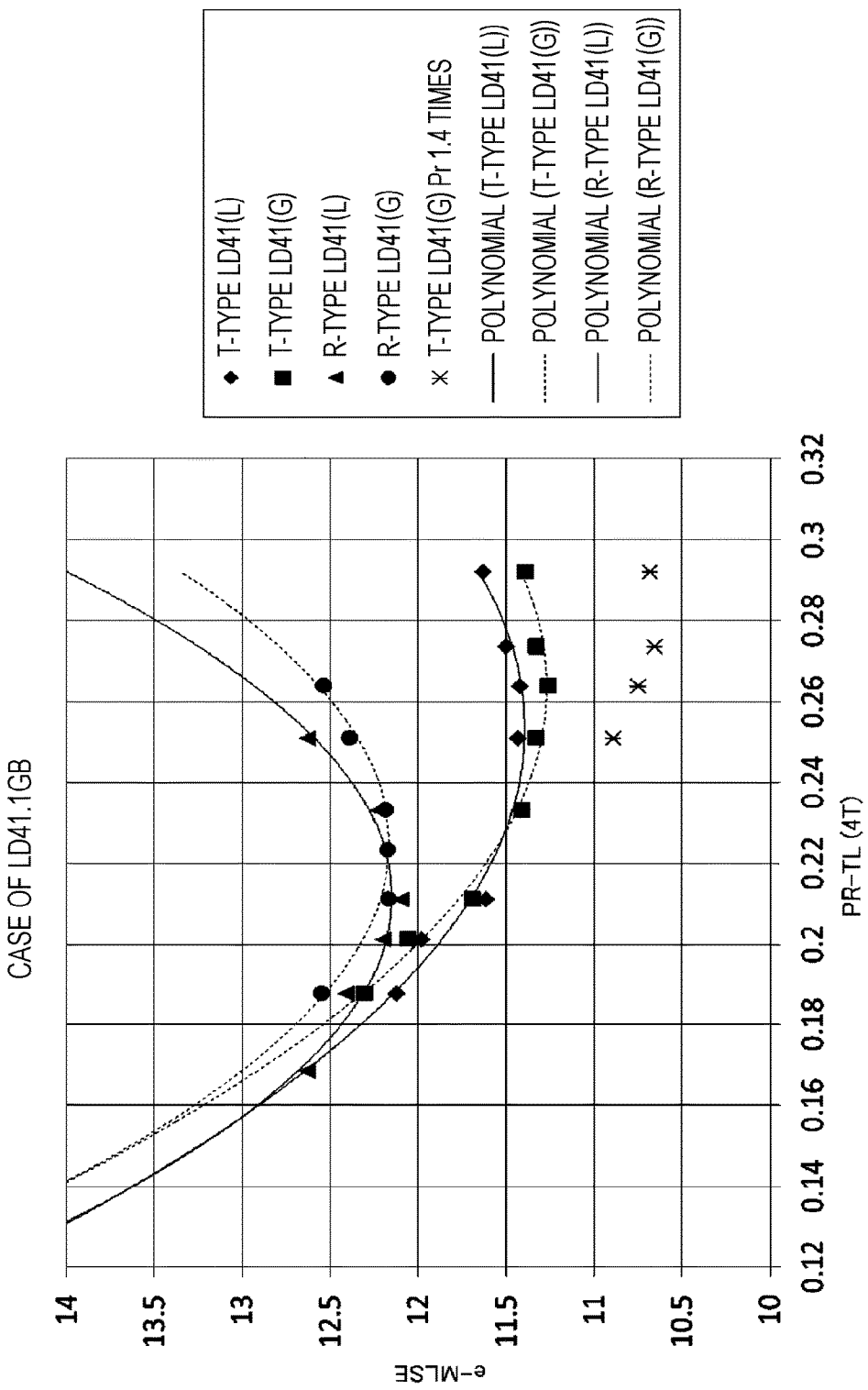
FIG. 32 is a graph illustrating a relationship between the PR-TL(4T) and the e-MLSE.

FIG. 32 illustrates results when adding e-MLSE in the case of increasing reproduction power to 1.4 times with respect to the groove of the T-type VHT4 at LD41.1 GB to FIG. 28 so as to grasp the degree of an effect due to the random noise. When the reproduction power is increased to 1.4 times, it can be seen that the e-MLSE is improved by approximately 1%. In addition, the optimal PR class (PR-TL (4T)) also slightly varies depending on the reproduction power.

(Example of Pattern Selection)

Figure 33:
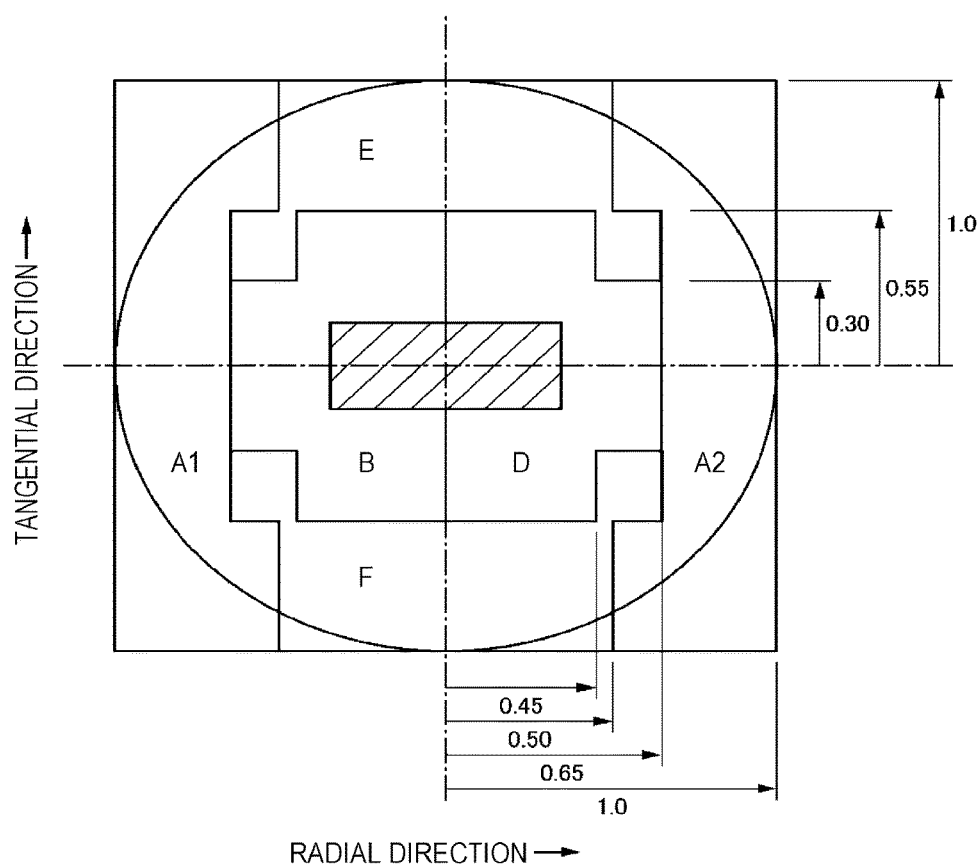
FIG. 33 is a schematic diagram illustrating detail specifications of an example of a division pattern.

FIG. 33 illustrates an example of a division pattern according to an embodiment of the present disclosure. Division is performed into six regions indicated by A1, A2, B, D, E, and F. In the present disclosure, a first region E and a second region F, which are divided in the tangential direction, are formed. The central region indicated by an oblique line is a light-shielding region that is provided for another-layer stray light countermeasure in a multi-layer disc. That is, the light-shielding region is provided at ±0.15 in the tangential direction and ±0.35 in the radial direction. In addition, respective regions are received by respective detectors and are allowed to pass through an IV amplifier, and respective channels are computed as illustrated in Table 2A.

TABLE 2A

|  | IVT4M | IVR4M | IVL4M |
| --- | --- | --- | --- |
| channel 1 | A1 + A2 | E + F | E + F |
| channel 2 | B + D | B + D | A1 + A2 |
| channel 3 | E | A1 | B |
| channel 4 | F | A2 | D |

As illustrated in Table 2A, detection signals of respective regions of the division pattern in FIG. 33 are combined with a selected combination pattern (hereinafter, appropriately referred to as a selection pattern) to form the following four channels Ch1 to Ch4. Selection patterns IVT4M, IVR4M, and IVL4M are formed. For example, detection signals of detectors of respective channels are combined in accordance with Table 2A.

Selection pattern IVT4M: Ch1=A1+A2, Ch2=B+D, Ch3=E, Ch4=F

Selection pattern IVR4M: Ch1=E+F, Ch2=B+D, Ch3=A1, Ch4=A2

Selection pattern IVL4M: Ch1=E+F, Ch2=A1+A2, Ch3=B, Ch4=D

IVT4M corresponds to "T-type" in the previous experiment results, and IVR4M corresponds to "R-type".

Furthermore, five-channel outputs or six-channel outputs may be formed as illustrated in Table 2B without limitation to formation of the four-channel outputs by using the division pattern in FIG. 33 as described above.

TABLE 2B

|  | IVTR5M | IVTL5M | IVTLR6M |
| --- | --- | --- | --- |
| channel 1 | E | E | E |
| channel 2 | F | F | F |
| channel 3 | B + D | A1 + A2 | A1 |
| channel 4 | A1 | B | A2 |
| channel 5 | A2 | D | B |
| channel 6 |  |  | D |

As illustrated in Table 2B, detection signals of the respective regions of the division pattern in FIG. 33 are combined with a selection pattern to form the following five channels Ch1 to Ch5 or six channels Ch1 to Ch6. Selection patterns IVTR5M, IVTL5M, and IVTLR6M are formed. For example, detection signals of detectors of respective channels may be combined in accordance with Table 2B.

Selection pattern IVTR5M: Ch1=E, Ch2=F, Ch3=B+D, Ch4=A1, Ch5=A2

Selection pattern IVTL5M: Ch1=E, Ch2=F, Ch3=A1+A2, Ch4=B, Ch5=D

Selection pattern IVTLR6M: Ch1=E, Ch2=F, Ch3=A1, Ch4=A2, Ch5=B, Ch6=D (Actual Convergence Arrival Point of Adaptive Equalizer)

Figure 34:
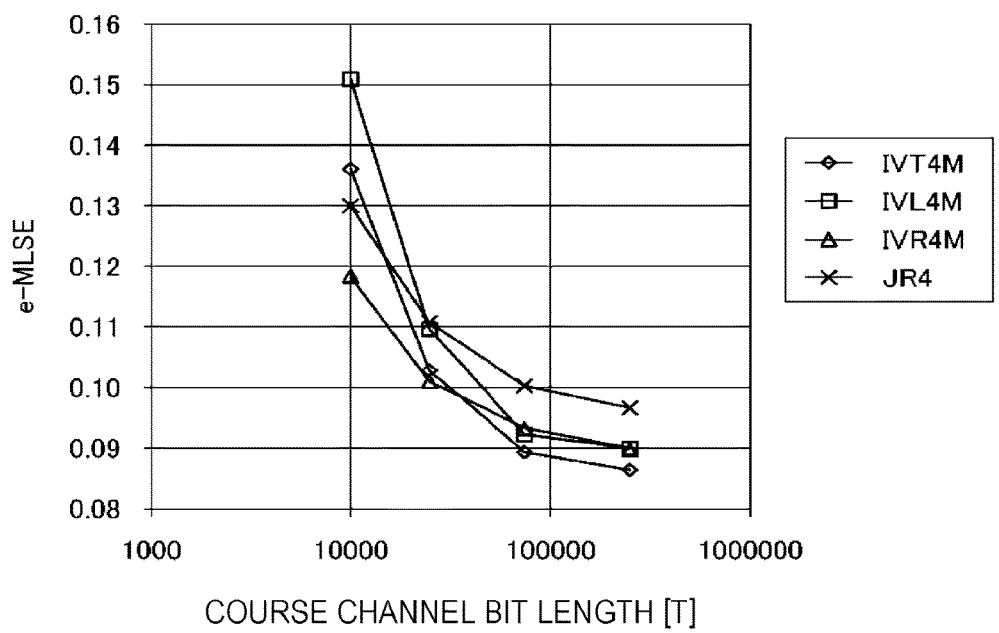
FIG. 34 is a graph illustrating a relationship between a course channel bit length and the e-MLSE.

With regard to respective selection patterns illustrated in Table 2A, FIG. 34 illustrate simulation results during a course in which an adaptive equalizer converges after starting from a state in which an equalization error is large. However, an amplifier noise and a disc noise are added, but a burst noise such as a defect is not added, and thus an e-MLSE value is improved in accordance with an increase in a course channel bit length. A pattern JR4 as Comparative Example is illustrated in FIG. 25. FIG. 34 illustrates simulation results in a case where a linear density is LD35.18 GB (50 GB/L), and a PR class is PR(1233321).

In an actual device, it is considered that an arrival extent of the horizontal axis of a graph varies depending on a substrate, a recording film, recording signal quality, and the like in a disc. When the quality of the disc and the like is good, and convergence can be well made, IVT4M has the most satisfactory characteristics. In contrast, in a case where quality of the disc and the like is poor, and disturbance of a signal that inhibits convergence is great, it can be said that IVR4M in which initial convergence is fast is advantageous. In addition, it can be said that convergence properties of IVL4M are bad. When an appropriate tap coefficient initial value is provided, it is possible to absorb a difference in the convergence properties to a certain degree. However, in a case where quality of a disc and the like is poor, and disturbance of a signal that inhibits convergence is great, the difference in the convergence properties is reflected on an average difference in characteristics.

Figure 35:
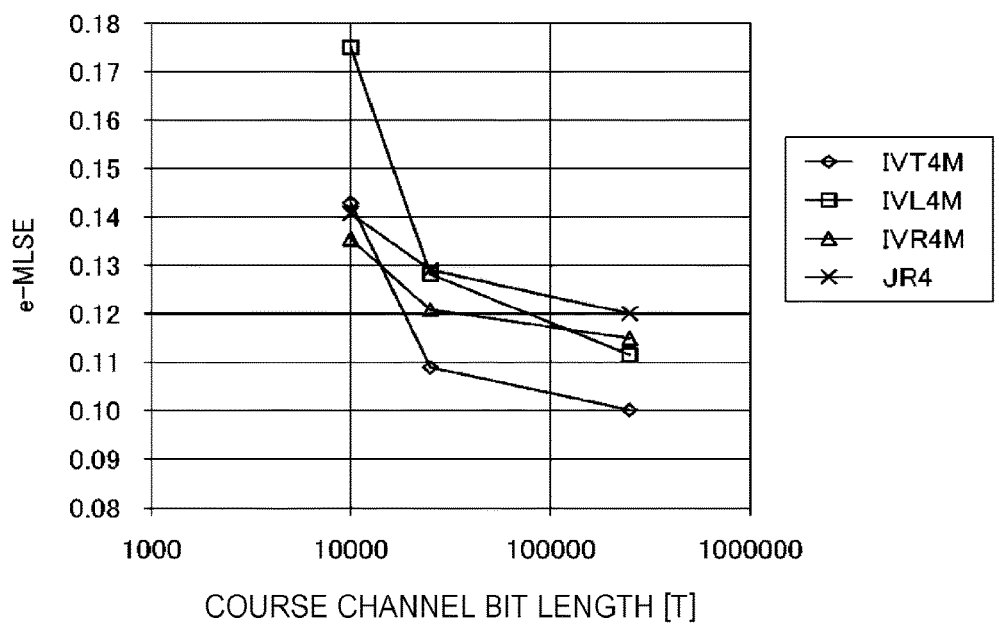
FIG. 35 is a graph illustrating a relationship between the course channel bit length and the e-MLSE.

FIG. 35 illustrates simulation results in a case where the linear density and the PR class are changed. FIG. 35 illustrates simulation results in which the linear density is (LD44 GB (62.5 GB/L)), and the PR class is PR(235777532). In a tendency for each pattern, as is the case with FIG. 26 in which a linear density is low, the convergence properties are excellent in IVR4M (and JR4) in which outer regions in the radial direction are set as respective channels, that is, the R-type.

However, it can be seen that excellence of characteristics is more significant in IVT4M, that is, the T-type except for the initial convergence, and thus excellent patterns are interchanged with each other between patterns capable of being realized by the same division pattern in accordance with a linear density and quality of a disc and the like.

A configuration capable of switching a plurality of patterns (optical filters) which are formed with the original same division pattern through mode switching of optoelectronic integrated circuit (OEIC) and the like is very effective for "coping with discs having various kinds of quality", "coping with other densities", and the like.

(Another Example of Pattern Selection)

Figure 36:
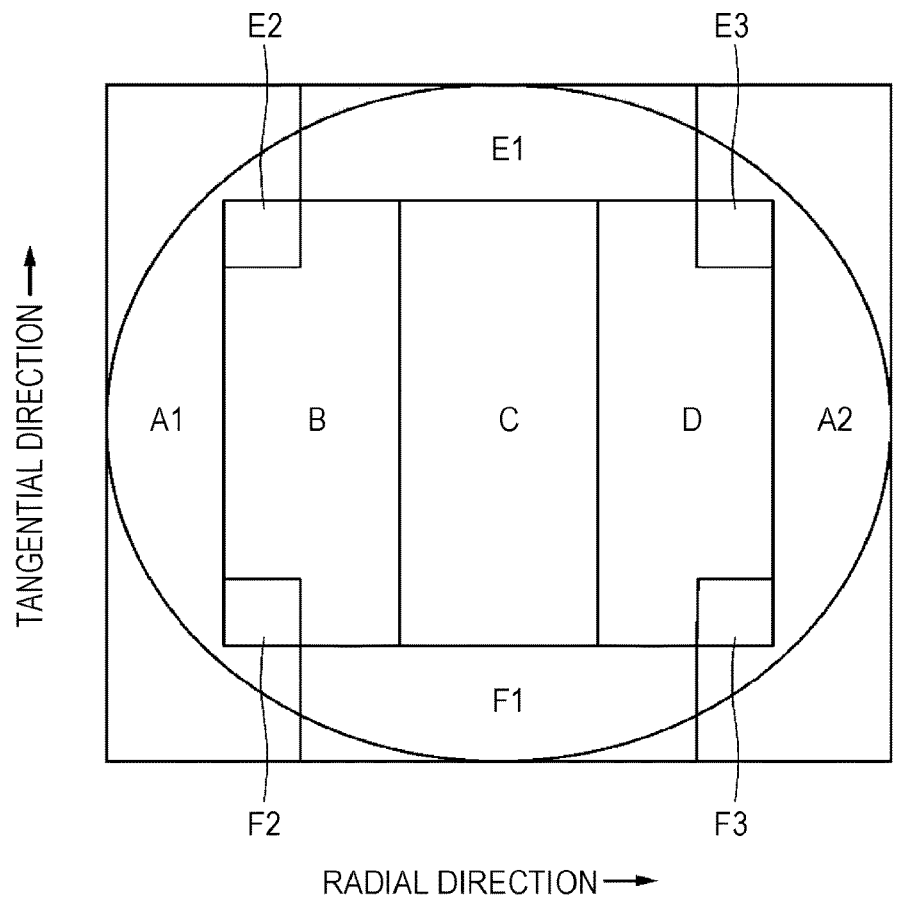
FIG. 36 is a schematic diagram illustrating a pattern IVNST6 in more detail.

Various optical filters as illustrated in Table 3 can be formed on the basis of division of a pattern IVNST6 illustrated in FIG. 36. The IVNST6 is obtained by dividing a central region B into three regions in the radial direction so as to increase the number of divisions of regions which are spatially and optically different in a band in the radial direction on the basis of IVT4. Here, when a pupil radius is assumed as 1.0, a region division position in the radial direction is set to positions which are located at ±0.25, ±0.5, and ±0.7, and a region division position in the tangential direction is set to positions which are located at ±0.45 and +0.65.

As illustrated in Table 3, in the case of four-channel outputs, it is efficient to employ a configuration capable of switching at least two among IVTSM4, IVSP4, IVos4, and IVR4 (region A is set to channels which are individual on right and left sides) in addition to IVT4. For example, in the case of realization with the OEIC, a voltage that is applied to a mode switching pin can be switched to three values of a high level, an intermediate level, and a low level. Furthermore, switching of IVTSP5 and IVNS5, and the like are possible even in the case of five-channel outputs without limitation to the four-channel outputs.

TABLE 3

|  | IVT4 | IVNST6 | IVTSP5 | IVTSM4 | IVNS5 | IVSP4 | IVos4 | IVR4 |
|---|---|---|---|---|---|---|---|---|
| channel 1 | A | A | A | A | A | A | A | E + F |
| channel 2 | B + C + D | B | B + Ks × C | C + Ksm × B + Ksm × D | B | B + Ks × C | B + Ks1 × C | B + C + D |
| channel 3 | E | C | D + Ks × C | E | C | D + Ks × C | D + Ks2 × C | A1 |
| channel 4 | F | D | E | F | D | E + F | E + F | A2 |
| channel 5 |  | E | F |  | E + F |  |  |  |
| channel 6 |  | F |  |  |  |  |  |  |

Second Embodiment (Pattern Selection)

Pattern selection in a second embodiment is performed as illustrated in Table 4A.

TABLE 4A

|  | IVT4M (SD) | IVT4M | IVR4M | IVL4M |
|---|---|---|---|---|
| channel 1 | A1 + A2 | A1 + A2 | E + F | E + F |
| channel 2 | B + D | B + D | B + D | A1 + A2 |
| channel 3 | E + F | E | A1 | B |
| channel 4 | E − F | F | A2 | D |

When being compared with the pattern selection (Table 2A) in the first embodiment, a selection pattern IVT4M (SD) is added.

Selection pattern IVT4M (SD): Ch1=A1+A2, Ch2=B+D, Ch3=E+F, Ch4=E−F

That is, this selection pattern forms the sum (E+F) and a difference (E−F) between the regions E and F and treats the sum (E+F) and the difference (E−F) as respective channels.

Furthermore, as described above, five-channel outputs or six-channel outputs may be formed as illustrated in Table 4B without limitation to formation of the four-channel outputs.

TABLE 4B

|  | IVTR5M | IVTR5M (SD) | IVTL5M | IVTL5M (SD) | IVTLR6M | IVTLR6M (SD) |
|---|---|---|---|---|---|---|
| channel 1 | E | E + F | E | E + F | E | E + F |
| channel 2 | F | E − F | F | E − F | F | E − F |
| channel 3 | B + D | B + D | A1 + A2 | A1 + A2 | A1 | A1 |
| channel 4 | A1 | A1 | B | B | A2 | A2 |
| channel 5 | A2 | A2 | D | D | B | B |
| channel 6 |  |  |  |  | D | D |

When being compared with the selection pattern (Table 2B) in the first embodiment, selection patterns IVTR5M (SD), IVTL5M (SD), and IVTLR6M (SD) are added.

Selection pattern IVTR5M (SD): Ch1=E+F, Ch2=E−F, Ch3=B+D, Ch4=A1, Ch5=A2

Selection pattern IVTL5M (SD): Ch1=E+F, Ch2=E−F, Ch3=A1+A2, Ch4=B, Ch5=D

Selection pattern IVTLR6M (SD): Ch1=E+F, Ch2=E−F, Ch3=A1, Ch4=A2, Ch5=B, Ch6=D (Frequency Amplitude Characteristics of Electrical Filter)

Figure 37:
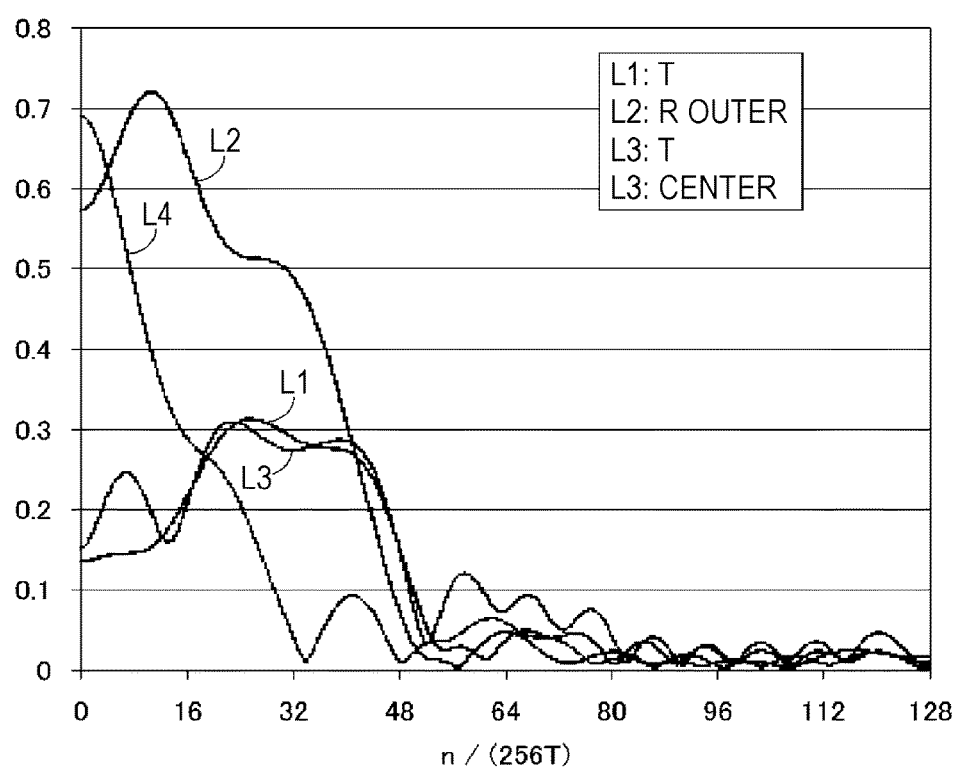
FIG. 37 is a graph illustrating frequency amplitude characteristics.

FIG. 37 illustrates frequency amplitude characteristics of an electrical filter that leads to respective channels of IVT4M at LD35.18 GB. T represents characteristics of a channel Ch3 or Ch4, R outer represents characteristics of a channel Ch1 (A1+A2), and the center represents characteristics of a channel Ch2 (B+D). The characteristics are close to the characteristics of IVT4 illustrated in FIG. 16 and FIGS. 17A and 17B.

Figure 38:
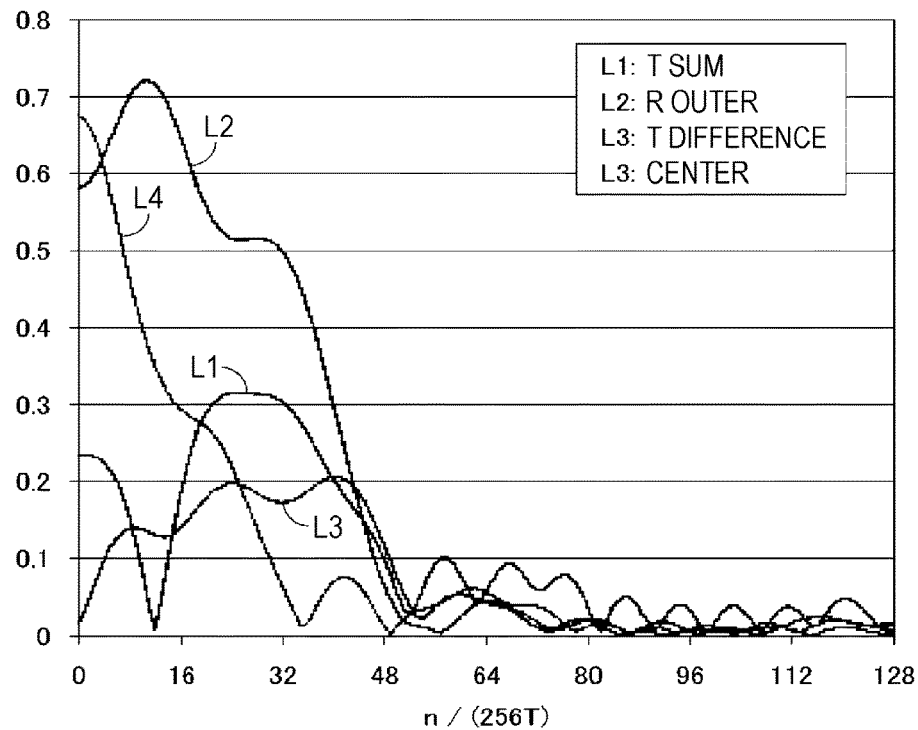
FIG. 38 is a graph illustrating the frequency amplitude characteristics.

FIG. 38 illustrates frequency amplitude characteristics of respective channels of IVT4M (SD). T sum represents characteristics of a channel Ch3 (E+F), T difference represents characteristics of a channel Ch4 (E−F), R outer represents characteristics of a channel Ch1 (A1+A2), and the center represents characteristics of a channel Ch2 (B+D). It can be seen that a phase difference of approximately 90 deg to 120 deg which is applied to two T-type outer channel in the tangential direction is separated into a sum channel (phase difference: 0) and a difference channel (phase difference: 180 deg) and is converted from each other.

(Actual Convergence Arrival Point of Adaptive Equalizer)

Figure 39:
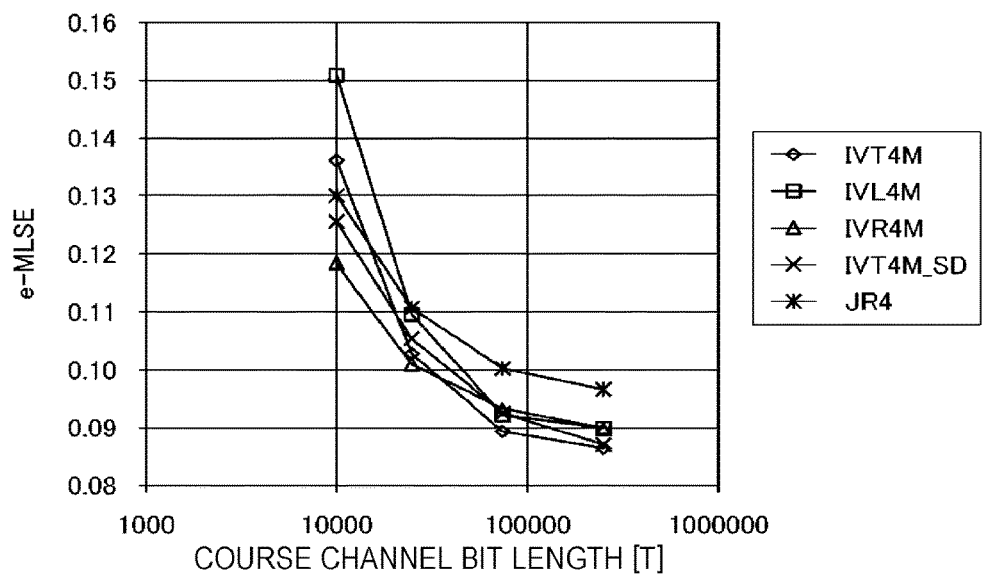
FIG. 39 is a graph illustrating a relationship between the course channel bit length and the e-MLSE.

With regard to respective selection patterns illustrated in Table 4A, FIG. 39 illustrates simulation results during a course in which an adaptive equalizer converges after starting from a state in which an equalization error is large. However, an amplifier noise and a disc noise are added, but a burst noise such as a defect is not added, and thus an e-MLSE value is improved in accordance with an increase in a course channel bit length. A pattern JR4 as Comparative Example is illustrated in FIG. 25. FIG. 39 illustrates simulation results in a case where a linear density is LD35.18 GB (50 GB/L), and a PR class is PR (1233321). In the selection pattern IVT4M (SD), initial convergence is fast, and a convergence destination is the same as in IVT4M.

(Tap Coefficient)

Figure 40:
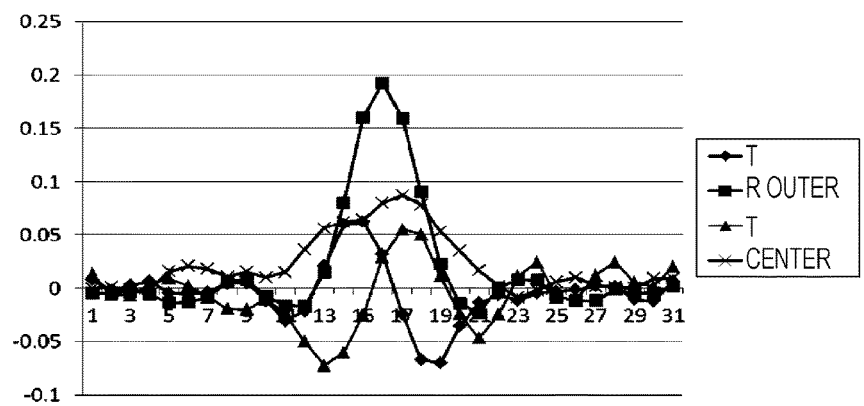
FIG. 40 is a graph illustrating an example of a tap coefficient of an electrical filter.
Figure 41:
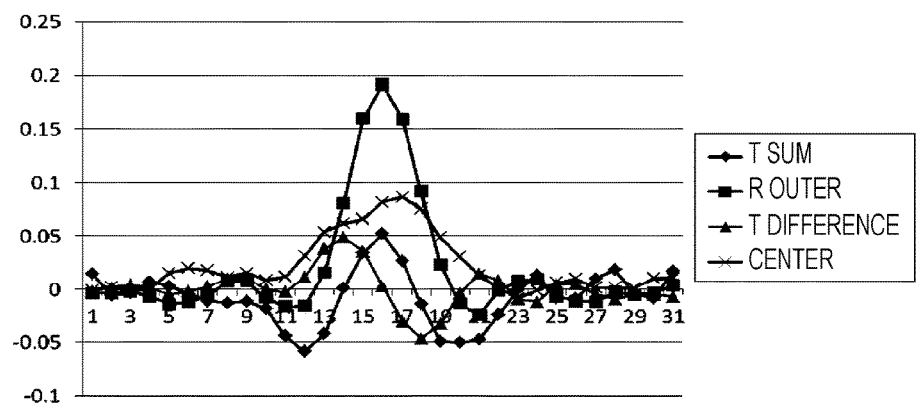
FIG. 41 is a graph illustrating an example of the tap coefficient of the electrical filter.

FIG. 40 illustrates tap coefficient of respective channels of the selection pattern IVT4M corresponding to the above-described electrical filter. For example, a tap number of an FIR filter is set to 31 taps. FIG. 41 illustrates tap coefficients of respective channels of the selection pattern IVT4M (SD) corresponding to the above-described electrical filter. A tap number is set to 31 taps. FIGS. 40 and 41 illustrates simulation results when performing recording and reproduction with respect to a groove in a case where a linear density is LD35.18 GB (50 GB/L), and a PR class is PR (1233321).

Figure 42:
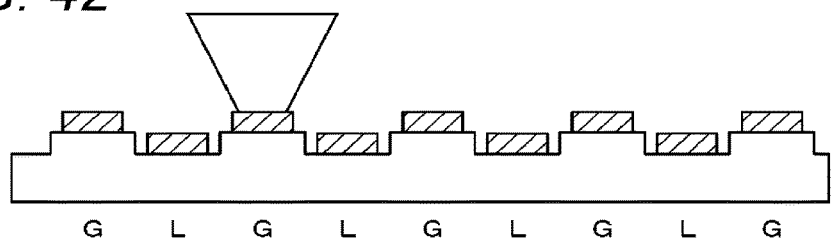
FIG. 42 is a schematic diagram illustrating an outline of a recording mark in land/groove recording.

In the above description, it is assumed that a mark recorded on the disc is discriminated with light and darkness. However, actually, in the case of land/groove recording method as illustrated in FIG. 42, a recording mark tends to obliquely expand as illustrated in the drawing. For example, the mark expands by approximately +0.03λ in both the land and the groove. Expansion/depression of the mark is referred to as a phase (λ). A positive phase represents expansion, and a negative phase represents depression. Furthermore, in a case where expansion occurs from a shape aspect, but a peripheral portion of the mark further expands in comparison to the central portion of the mark, and thus it looks like a depression, it is assumed that a reflectance is equivalently treated in an amplitude reflectance and a phase in cases including a case of a recording film in which a phase varies during reflection instead of unevenness as a shape, and the like.

Hereinafter, description will be given of simulation results under the following conditions.

Selection pattern: IVT4M (IVT4M (SD)) also has the same characteristics) and IVR4M Density 1: LD35.2 GB (53 nm/ch bit), PR (1233321) (IS17)

Density 2: LD44.0 GB (42.37 nm/ch bit), PR(123444321) (IS19)

Groove depth: (1/16)λ

Tp=225 nm×2 (L/G), mark width: 175 nm

Modulation degree is fixed to 55%, and characteristics are compared while changing phases of marks L and G in a range of ±0.06λ.

First, characteristics at the condition (LD35.2 GB) of Density 1 will be compared with each other.

(e-MLSE Bottom Characteristics (LD35 GB) of IVT4M and IVR4M)

FIG. 43A illustrates characteristics in the case of reproducing (referred to as groove reproduction) a mark that is recorded in a groove in the case of IVT4M. In FIG. 43A, the vertical axis of a square graph represents positive and negative of a phase of a mark that is recorded in a land, the horizontal axis of the square graph represents positive and negative of a phase of a mark that is recorded in a groove. In the square graph, a contour line (broken line) corresponding to an e-MLSE value is drawn. With regard to the e-MLSE, discrimination is made by symbols such as a, b, c, d, ... at angles. "a" represents a range in which the e-MLSE value is the smallest (satisfactory index), and as it transitions to b, c, d, ..., it reaches a range in which the e-MLSE value is large. This relationship is also true of other drawings. FIG. 43B illustrates characteristics in the case of reproducing (referred to as land reproduction) a mark that is recorded in a land of IVT4M.

FIG. 44A illustrates characteristics of groove reproduction of IVR4M. FIG. 44B illustrates characteristics of land reproduction of IVR4M.

When comparing FIGS. 43A and 43B and FIGS. 44A and 44B with each other, it can be seen that there is no great difference between both selection patterns in the groove reproduction, but IVT4M is superior to IVR4M in the land reproduction.

(e-MLSE (LD35 GB) of IVT4M and IVR4M in 0.1 Visual Field Deviation)

FIG. 45A illustrates characteristics of the groove reproduction of IVT4M in a case where 0.1 visual field deviation occurs in the radial direction when a radius of an objective lens is set to 1. FIG. 45B illustrates characteristics of the land reproduction of IVT4M.

Similarly, FIG. 46A illustrates characteristics of the groove reproduction of IVR4M in the case of 0.1 visual field deviation occurs in the radial direction when the radius of the objective lens is set to 1. FIG. 44B illustrates characteristics of the land reproduction of IVR4M.

When comparing FIGS. 45A and 45B and FIGS. 46A and 46B with each other, when a visual field deviates, IVT4M is generally excellent in the land reproduction. In contrast, IVR4M is superior to IVT4M in the groove reproduction.

(Deterioration Amount of e-MLSE of IVT4M and IVR4M in 0.1 Visual Field Deviation (LD35 GB))

FIG. 47A illustrates characteristics of an e-MLSE deterioration amount in the groove reproduction of IVT4M with respect the center of a visual field in a case where 0.1 visual field deviation occurs in the radial direction when the radius of the objective lens is set to 1. FIG. 47B illustrates characteristics of the e-MLSE deterioration amount in the land reproduction of IVT4M.

Similarly, FIG. 48A illustrates characteristics of an e-MLSE deterioration amount in the groove reproduction of IVR4M with respect the center of a visual field in a case where 0.1 visual field deviation occurs in the radial direction when the radius of the objective lens is set to 1. FIG. 48B illustrates characteristics of the e-MLSE deterioration amount in the land reproduction of IVR4M.

When comparing FIGS. 47A and 47B and FIGS. 48A and 48B with each other, in IVT4M, an advantage and a disadvantage of a mark phase are different in a tendency between the groove reproduction and the land reproduction. The deterioration amount is significantly smaller on an IVR4M side.

(e-MLSE Bottom Characteristic Difference (Positive when Relationship of IVR4M>IVT4M is Satisfied (LD35 GB))

FIG. 49A illustrates recording mark phase dependency of a difference (positive when an e-MLSE value satisfies a relationship of IVR4M>IVT4M) in e-MLSE characteristics of IVT4M and IVR4M in the groove reproduction. Similarly, FIG. 49B illustrates characteristics of the land reproduction. IVT4M is superior to IVR4M in both the groove and the land.

FIG. 50A illustrates recording mark phase dependency of a difference (positive when an e-MLSE value satisfies a relationship of IVR4M>IVT4M) in e-MLSE characteristics of IVT4M and IVR4M in the groove reproduction in the case of a visual field of 0.1. In the case of the groove reproduction, characteristic deterioration of IVT4M is great in a visual field of 0.1, and thus IVR4M is generally superior to IVT4M. FIG. 50B illustrates recording mark phase dependency of a difference (positive when an e-MLSE value satisfies a relationship of IVR4M>IVT4M) in e-MLSE characteristics of IVT4M and IVR4M in the land reproduction in the case of a visual field of 0.1. In the case of the land reproduction, characteristic deterioration of IVT4M is small even in a visual field of 0.1, and thus IVT4M is generally superior to IVR4M.

When comparing FIGS. 49A and 49B and FIGS. 50A and 50B with each other, it can be seen that IVT4M is superior to IVR4M in any case of the groove reproduction and the land reproduction at the center of a visual field, but in the case of a visual field of 0.1, a relationship varies so that IVR4M is superior to IVT4M in the groove reproduction, and IVT4M is superior to IVR4M in the land reproduction.

Next, characteristics at the condition (LD44.0 GB) of Density 2 will be compared with each other.

(e-MLSE Bottom Characteristics (LD44 GB) of IVT4M and IVR4M)

FIG. 51A illustrates characteristics of the groove reproduction of IVT4M. FIG. 51B illustrates characteristics of the land reproduction of IVT4M. A range of an e-MLSE value, which is surrounded by a broken line, represents a range of e-MLSE in the drawings.

FIG. 52A illustrates characteristics of the groove reproduction of IVR4M. FIG. 52B illustrates characteristics of the land reproduction of IVR4M. A range of an e-MLSE value, which is surrounded by a broken line, represents a range of e-MLSE in the drawings.

When comparing FIGS. 51A and 51B and FIGS. 52A and 52B with each other, IVT4M is overwhelmingly superior to IVR4M in any case of the groove reproduction and the land reproduction.

(e-MLSE Bottom Characteristic Difference (Positive when Relationship of IVR4M>IVT4M is Satisfied (LD44 GB))

FIG. 53A illustrates recording mark phase dependency of a difference (positive when an e-MLSE value satisfies a relationship of IVR4M>IVT4M) in e-MLSE characteristics of IVT4M and IVR4M in the groove reproduction. Similarly, FIG. 53B illustrates characteristics of the land reproduction.

From FIGS. 53A and 53B, it can be seen that IVT4M is overwhelmingly superior to IVR4M in any case of the groove reproduction and the land reproduction, and the superiority further increases when a groove recording mark phase is negative and a land recording mark phase is positive.

From the simulation results of the above-described selection patterns IVT4M and IVR4M, it can be seen that it is effective to appropriately switch the selection pattern similar to the following example.

(1) With respect to a disc having a plurality of linear densities, the selection pattern is switched in accordance with a linear density. For example, in a case where linear densities of LD35 GB and LD44 GB are present, IVR4M is used in LD35 GB with focus given to characteristic stability against a visual field deviation of the objective lens, and IVT4M is used in LD44 GB with focus given to overwhelming superiority of the bottom characteristics.

(2) The selection pattern is switched between the groove reproduction and the land reproduction. The mark phase is frequently positive in many regions, and thus IVR4M that is strong against a visual field deviation is selected in the groove reproduction, and IVT4M excellent in the bottom characteristics is selected in the land reproduction because an effect of the visual field deviation is small.

(3) The pattern is switched depending on a layer position of a multi-layer structure. For example, in the case of inorganic recording film, the mark phase depends on respective materials (hardness, heat dissipation, a variation in physical properties during recording, and the like) of a spacer (or a cover layer)/a dielectric layer/a recording layer/a dielectric layer/a spacer (or a disc substrate). In addition, it is also possible to set a selection pattern that is suitable in correspondence with ID (kind), which is determined, of a disc.

In addition, as described above, an optimal PR class is different in accordance with a linear density and an optical filter (division pattern), and thus it is possible to realize a further improvement of reproduction characteristics by selecting PR classes different from each other in accordance with (1) the linear density, (2) the land and the groove, and (3) the layer position of the multi-layer structure.

(e-MLSE and Tap Coefficient of IVT4M (SD) (LD35 GB Groove Recording)

It is possible to determine a mark phase of a groove from an amplitude of a tap coefficient of an adaptive equalizer of the channel 4 (E−F) in the groove reproduction. When also using another channel, it is possible to further raise accuracy. IVT4M and IVT4M (SD) are approximately the same as each other from an e-MLSE aspect, but it is easier to determine a relationship between a tap coefficient and a mark phase on an IVT4M (SD) side. Accordingly, the tap coefficient can be utilized as a disc evaluation index.

Figure 54:
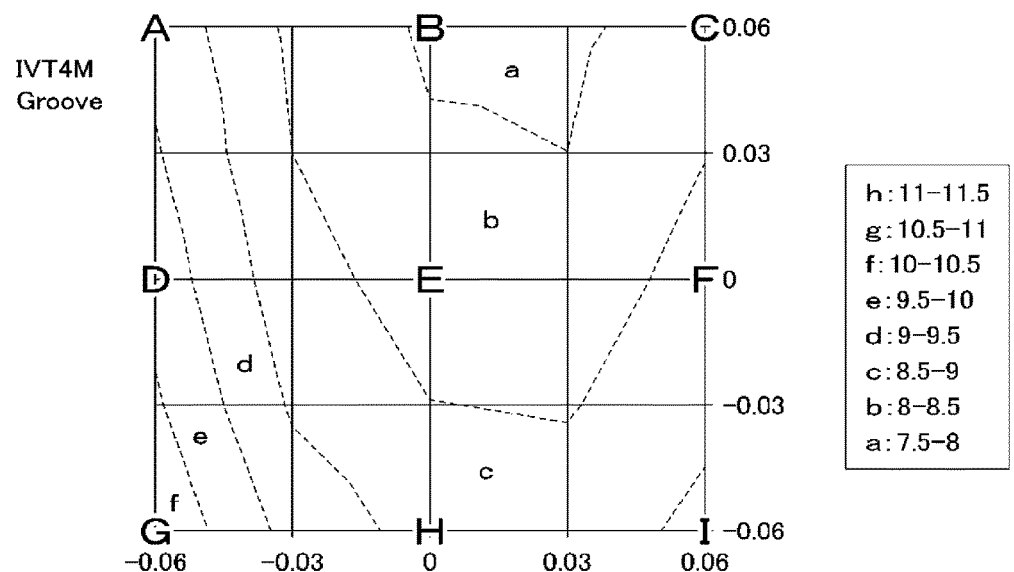
FIG. 54 is a graph illustrating a relationship between the mark phase and the e-MLSE.
Figure 55:
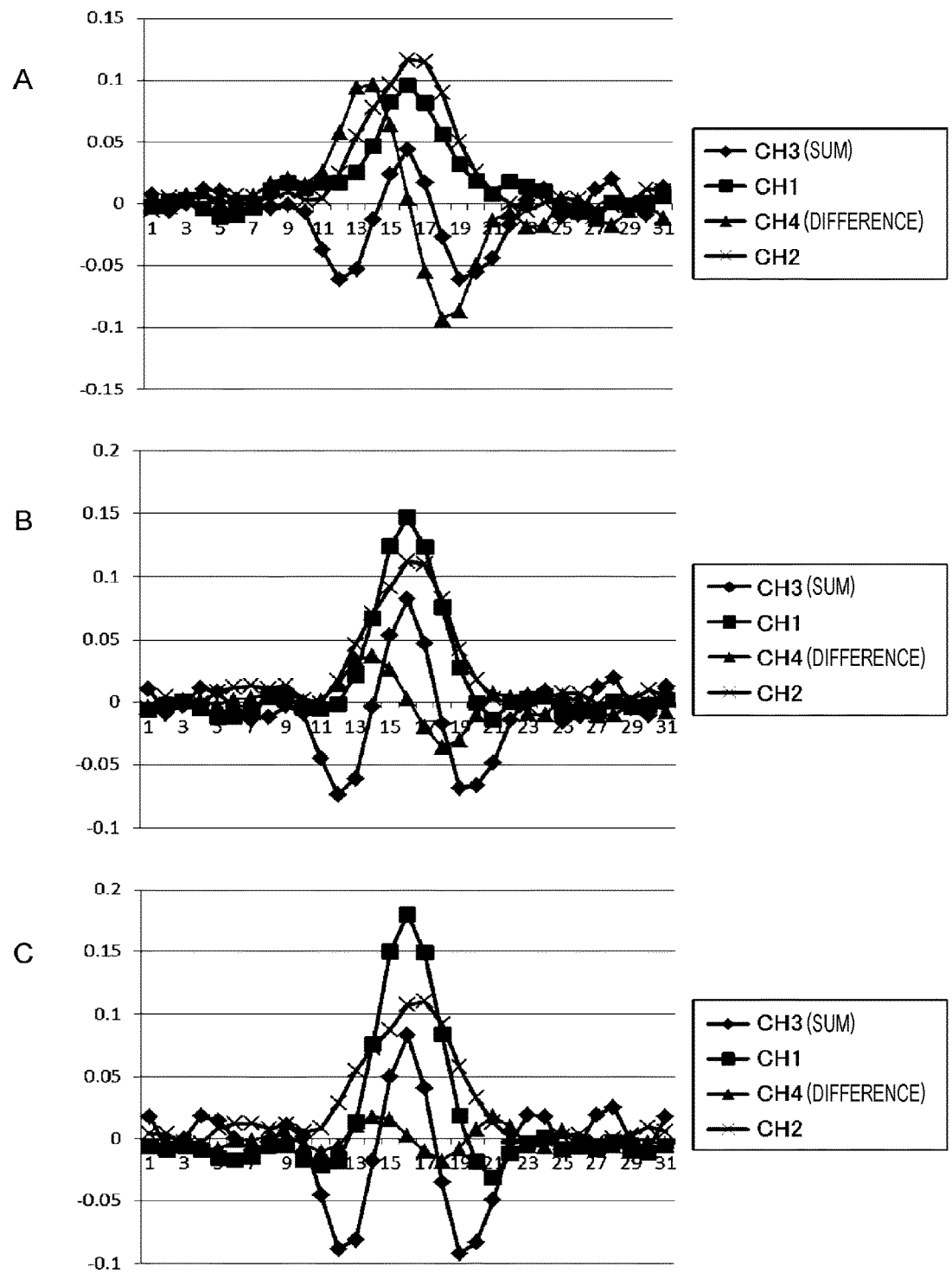
FIGS. 55A to 55C are graphs illustrating an example of a tap coefficient of an electrical filter in which the mark phase corresponds to values different from each other.
Figure 56:
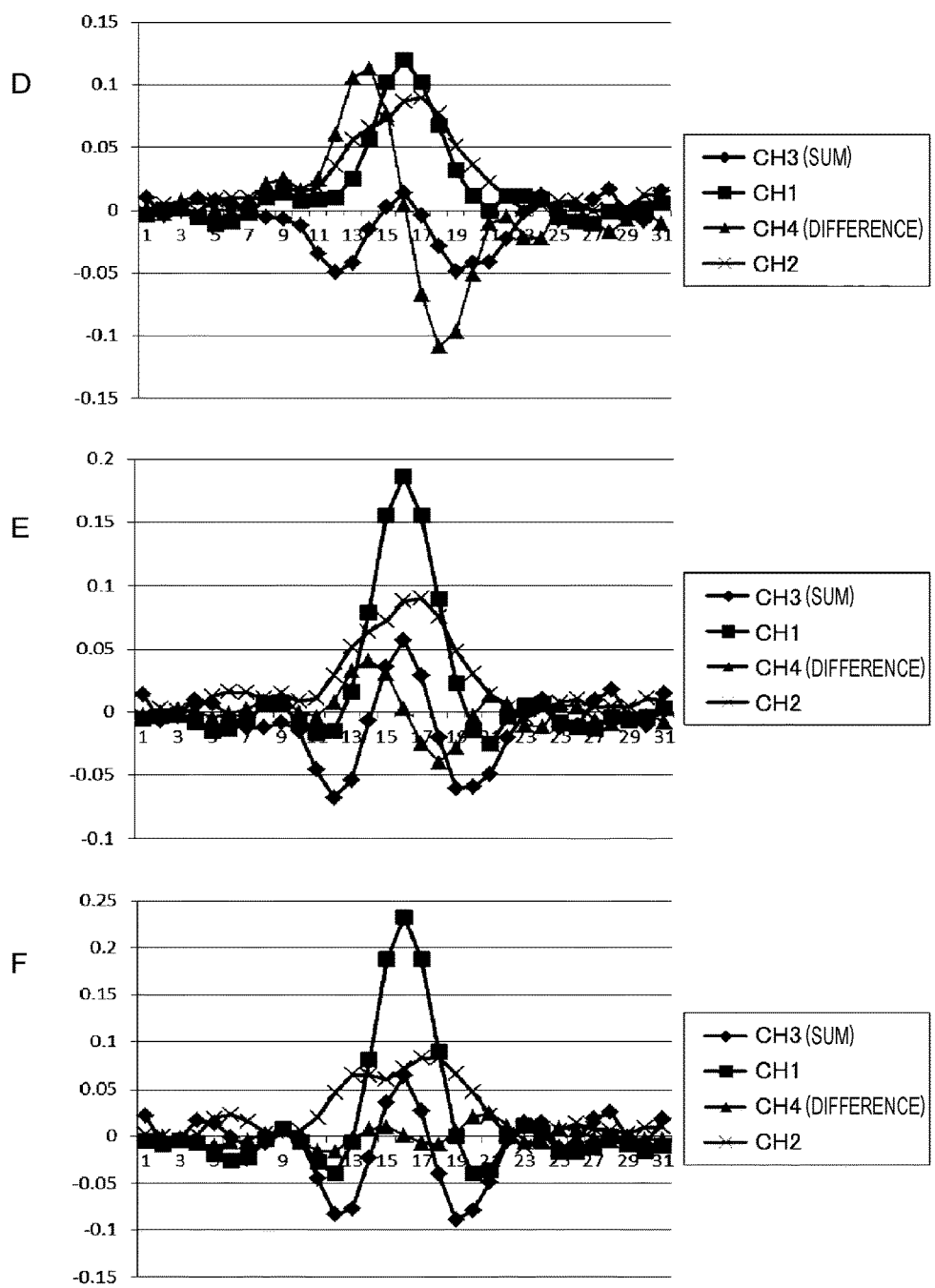
FIGS. 56D to 56F are graphs illustrating an example of the tap coefficient of the electrical filter in which the mark phase corresponds to values different from each other.
Figure 57:
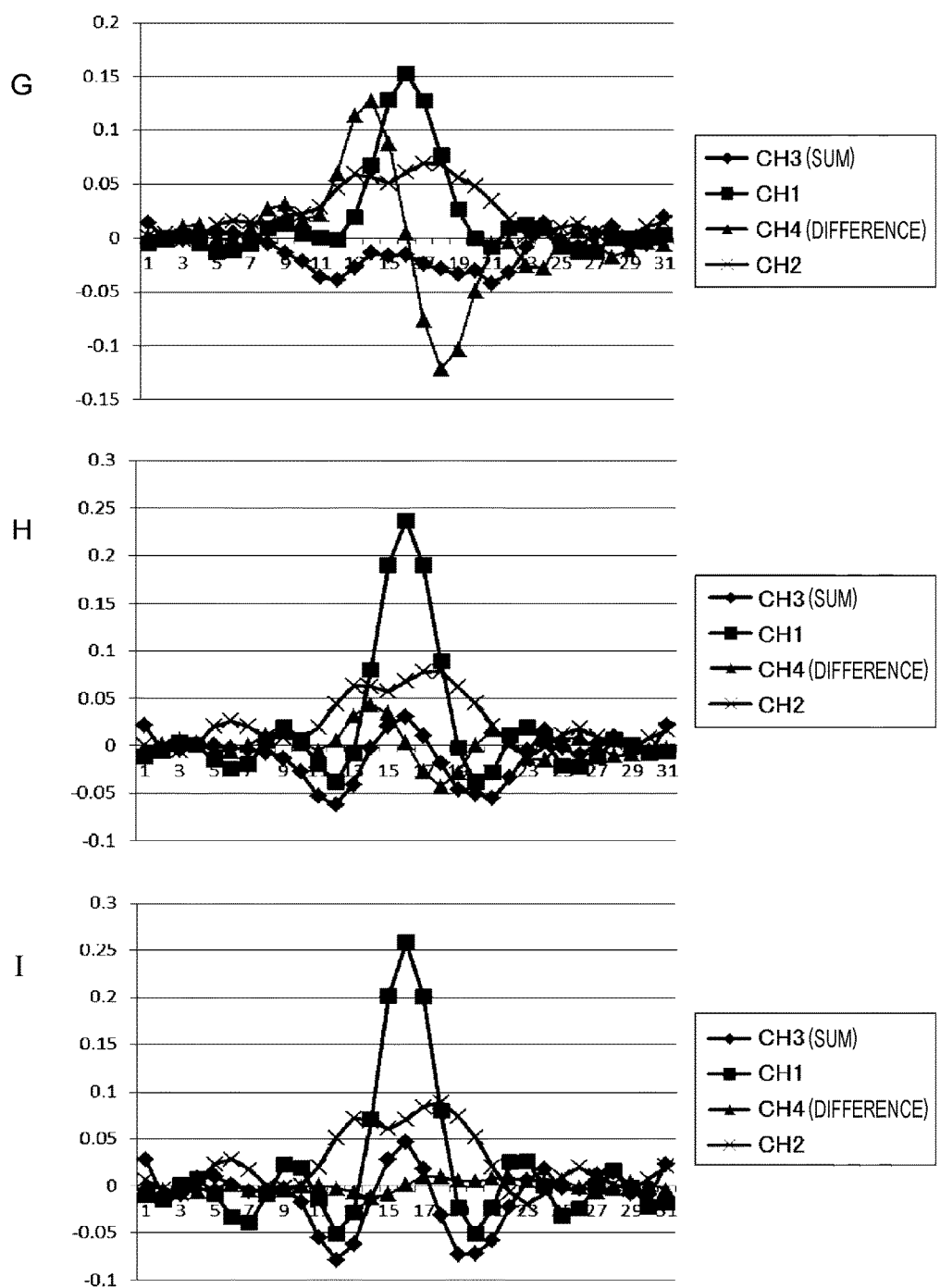
FIGS. 57G to 57I are graphs illustrating an example of the tap coefficient of the electrical filter in which the mark phase corresponds to values different from each other.

FIG. 54 illustrates a relationship between a groove recording mark phase and e-MLSE of IVT4M similar to FIG. 43A. In FIG. 54, nine points of A to I are set as a value of the mark phase. A relationship between each of A to I and a tap coefficient of an adaptive equalizer is illustrated in FIGS. 55A to 55C, FIGS. 56D to 56F, and FIGS. 57G to 57I. A to I in the drawings correspond to the above-described mark phase. As can be seen from FIGS. 55A to 55C, FIGS. 56D to 56F, and FIGS. 57G to 57I, at points (A, D, and G) in which a groove recording mark phase is negative, an amplitude of a tap coefficient of an adaptive equalizer corresponding to a difference channel 4 (E−F) is great. In contrast, as the groove recording mark phase becomes 0 (B, E, and H), and positive (C, F, and I), the amplitude of the tap coefficient of the adaptive equalizer corresponding to the difference channel 4 (E−F) rapidly decreases. In this manner, the tap coefficient corresponds to the groove recording mark phase in a one-to-one relationship, and thus it is possible to evaluate the optical disc from the tap coefficient.

(e-MLSE and Tap Coefficient of IVT4M (SD) (LD35 GB Land Recording)

It is possible to determine a mark phase of a land from an amplitude of a tap coefficient of an adaptive equalizer of the channel 4 (E−F) in the land reproduction. When also using another channel, it is possible to further raise accuracy. IVT4M and IVT4M (SD) are approximately the same as each other from an e-MLSE aspect, but it is easier to determine a relationship between a tap coefficient and a mark phase on an IVT4M (SD) side. Accordingly, the tap coefficient can be utilized as a disc evaluation index.

Figure 58:
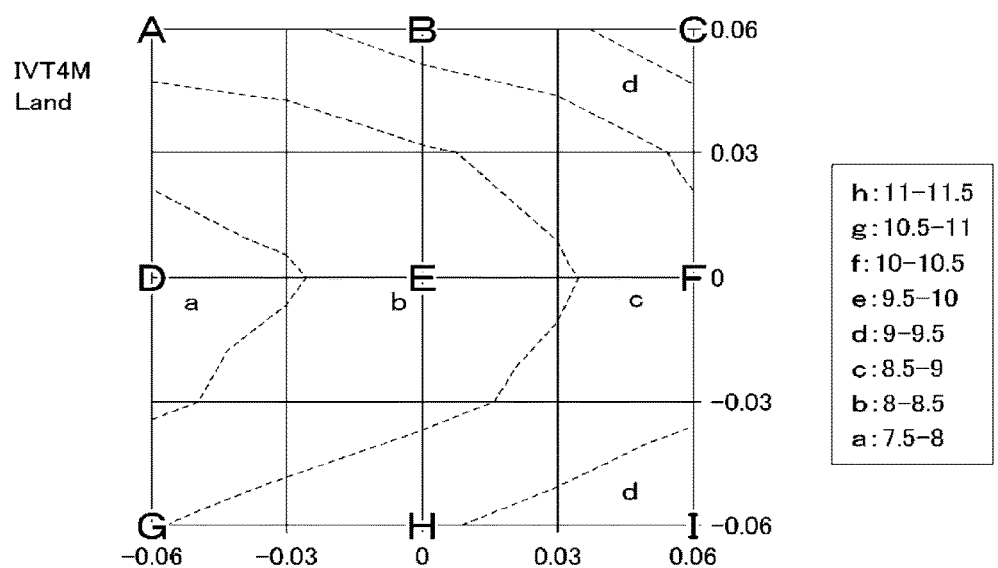
FIG. 58 is a graph illustrating a relationship between the mark phase and the e-MLSE.
Figure 59:
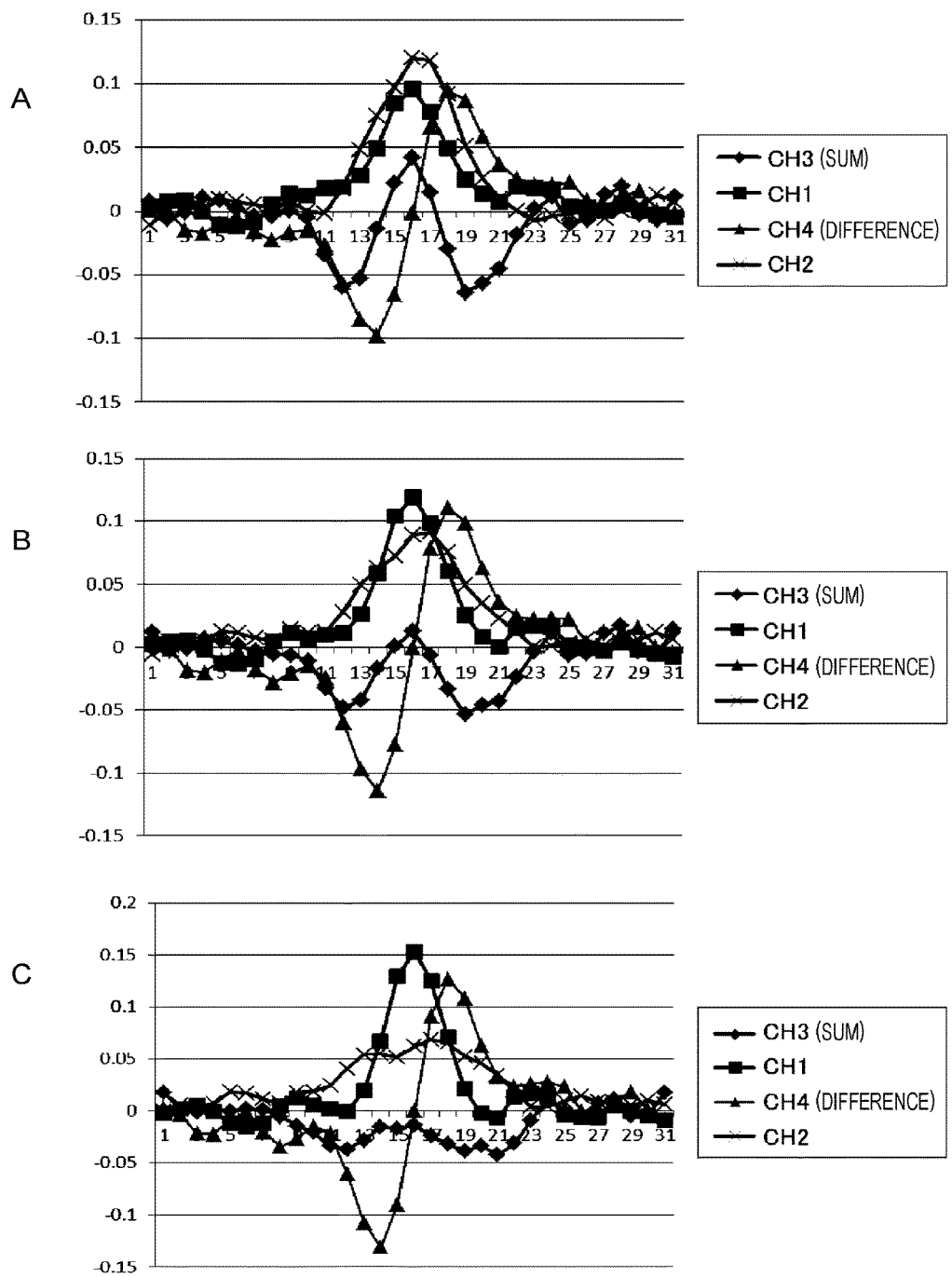
FIGS. 59A to 59C are graphs illustrating an example of the tap coefficient of the electrical filter in which the mark phase corresponds to values different from each other.
Figure 60:
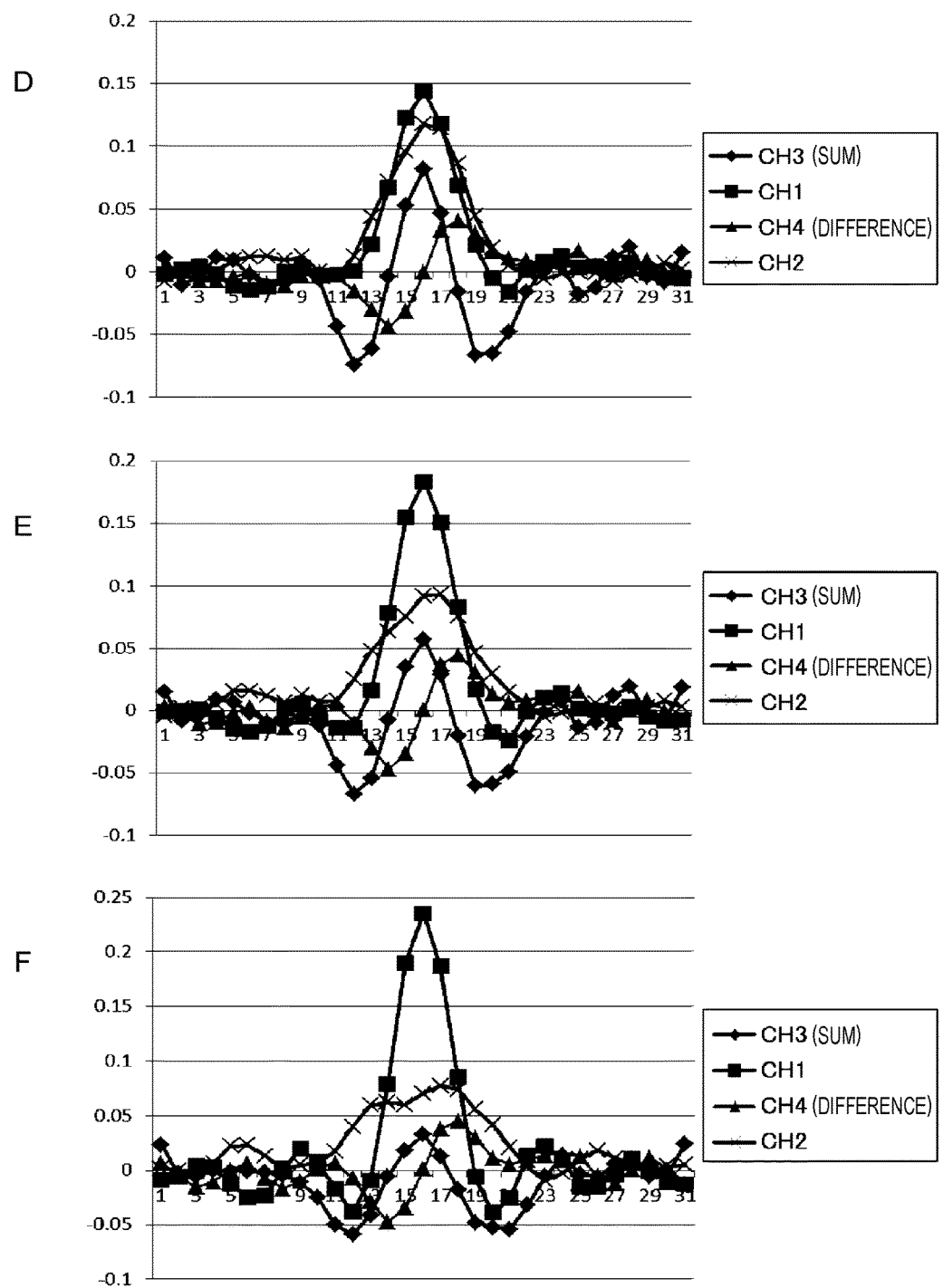
FIGS. 60D to 60F are graphs illustrating an example of the tap coefficient of the electrical filter in which the mark phase corresponds to values different from each other.
Figure 61:
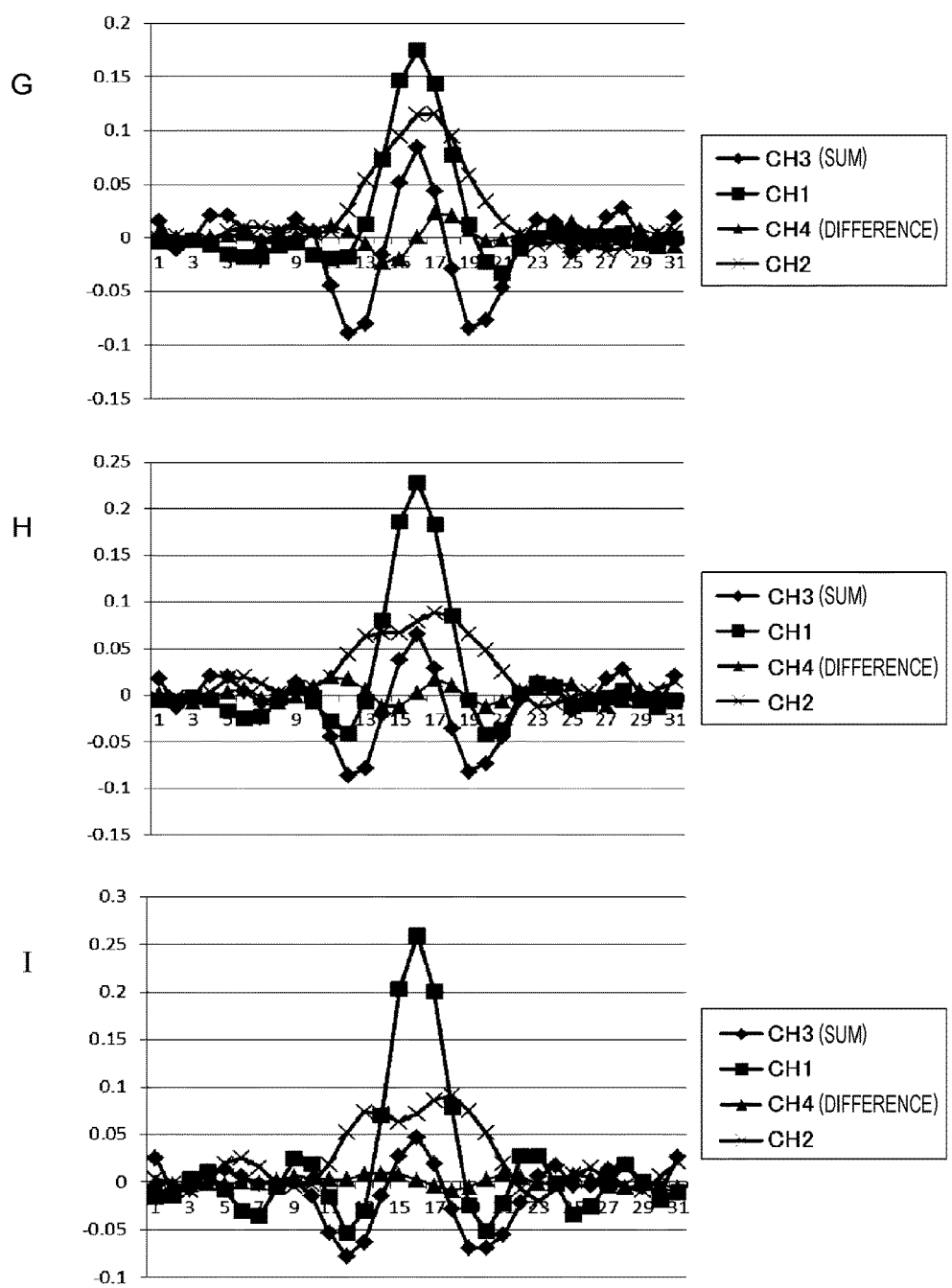
FIGS. 61G to 61I are graphs illustrating an example of the tap coefficient of the electrical filter in which the mark phase corresponds to values different from each other.

FIG. 58 illustrates a relationship between a land recording mark phase and e-MLSE of IVT4M similar to FIG. 43B. In FIG. 58, nine points of A to I are set as a value of the mark phase. A relationship between each of A to I and a tap coefficient of an adaptive equalizer is illustrated in FIGS. 59A to 59C, FIGS. 60D to 60F, and FIGS. 61G to 61I. A to I in the drawings correspond to the above-described mark phase. As can be seen from FIGS. 59A to 59C, FIGS. 60D to 60F, and FIGS. 61G to 61I, at points (A, B, C) in which a land recording mark phase is positive, an amplitude of a tap coefficient of an adaptive equalizer corresponding to a difference channel 4 (E−F) is great. In contrast, as the land recording mark phase becomes 0 (D, E, and F), and negative (G, H, and I), the amplitude of the tap coefficient of the adaptive equalizer corresponding to the difference channel 4 (E−F) rapidly decreases. In this manner, the tap coefficient corresponds to the land recording mark phase in a one-to-one relationship, and thus it is possible to evaluate the optical disc from the tap coefficient.

It is possible to appropriately switch the selection pattern from the simulation results with respect to the above-described selection patterns IVT4M (SD), the e-MLSE, and the tap coefficient. An example thereof will be described below.

(4) The pattern is switched in correspondence with a state of a tap coefficient that is optimized by an adaptive equalizer.

(4') Particularly, an amplitude of a difference channel in a system, in which a sum CH and a difference CH between a plurality of regions in the tangential direction are used, is used as an index.

3. Third Embodiment

A physical format of an optical disc which is suitable for a high linear density is defined from the embodiments of the above-described optical medium reproducing apparatus.

First example of a disc format: a linear density is set to be higher on a land side in comparison to a groove. When considering a case where the R-type optical filter is selected and used for the groove and the T-type optical filter is selected and used for the land in consideration of visual field characteristics, and the like, if using a format in which the linear density is set to be higher on the land side, it is possible to increase a total capacity.

Second example of the disc format: a reproduction signal is likely to be satisfactory on a trailing writing side, and the land is set to the trailing writing side.

Third example of the disc format: when reproducing a system of channels using the sum or a difference between a plurality of regions in the tangential direction as a reference drive, an amplitude of a difference channel is set to a predetermined range in a disc.

4. Modification Example

Hereinbefore, the embodiments of the present disclosure have been described in detail, but various medications based on the technical sprit of the present disclosure can be made without limitation to the respective embodiments. For example, numerical values of the wavelength of a laser light source, the track pitch, the recording linear density, and the like are illustrative only, and other numerical values can be used. In addition, as the index for evaluation of the reproduction performance, indexes other the above-described index may be used. In addition, the present disclosure is applicable to an optical disc drive that executes only one of recording and reproduction with respect to the optical disc.

In addition, the configurations, the methods, the processes, the shapes, the materials, the numerical values, and the like in the above-described embodiments may be combined with each other in a range not departing from the gist of the present disclosure.

Furthermore, the present disclosure can also employ the following configurations.

(1)
An optical medium reproducing apparatus, including:
a light source;
an objective lens that allows a light beam emitted from the light source to condense onto an optical medium;
a detection unit that divides a luminous flux of light beams reflected from the optical medium into a plurality of regions including a first region and a second region which are different in a position in a radial direction and/or a tangential direction, and combines a plurality of detection signals in correspondence with the amount of light that is incident to each of the plurality of regions with combination patterns which are selected to form signals of a plurality of channels;
a multi-input equalizer unit that includes a plurality of equalizer units to which the signals of the plurality of channels are respectively supplied, computes outputs of the plurality of equalizer units, and outputs the resultant value as an equalization signal; and
a binarization unit that performs binarization processing with respect to the equalization signal to obtain binary data,
wherein an addition signal channel including a constant multiplication of a detection signal of the first region and a detection signal of the second region is included in at least one of the combination patterns.

(2)
The optical medium reproducing apparatus according to (1),
wherein the first region and the second region are disposed at positions different in the tangential direction.

(3)
The optical medium reproducing apparatus according to (2),
wherein a sum signal channel of the detection signal of the first region and the detection signal of the second region, and a difference signal channel of the detection signal of the first region and the detection signal of the second region are included in at least one of the combination patterns.

(4)
The optical medium reproducing apparatus according to (1),
wherein the multi-input equalizer unit is set to a configuration of a multi-input adaptive equalizer unit, and
an initial value of a filter coefficient is changed in conjunction with change of the combination patterns.

(5)
The optical medium reproducing apparatus according to (1),
wherein the multi-input equalizer unit is set to a configuration of a multi-input adaptive equalizer unit, and
the optical medium reproducing apparatus further includes an equalization error computation unit that obtains an equalization error from an equalization target signal obtained on the basis of a binarization detection result in the binarization unit, and the equalization signal output from the multi-input adaptive equalizer unit, and supplies the equalization error to the adaptive equalizer unit as a control signal for adaptive equalization.

(6)
The optical medium reproducing apparatus according to (5),
wherein the multi-input adaptive equalizer unit performs partial response equalization processing with respect to an output signal,
the binarization unit performs maximum likelihood decoding processing as binarization processing with respect to the equalization signal of the multi-input adaptive equalizer unit, and
the equalization error computation unit obtains an equalization error through computation using an equalization target signal obtained through convolution processing of a binarization detection result obtained by the maximum likelihood decoding, and an equalization signal output from the multi-input adaptive equalizer unit.

(7)
The optical medium reproducing apparatus according to (5),
wherein the multi-input adaptive equalizer unit performs partial response equalization processing with respect to an output signal, and selects a class of the partial response equalization processing in correspondence with setting of the combination patterns.

(8)
The optical medium reproducing apparatus according to (1),
wherein the detection unit includes detectors which are divided in correspondence with the plurality of regions, and
detection signals of the plurality regions are fetched from the photodetectors.

(9)
The optical medium reproducing apparatus according to (1),
wherein an optical path conversion element for separation into the plurality of regions is disposed on an optical path that passes through the objective lens and reaches a detector, and a plurality of beams separated by the optical path conversion element are respectively input to detectors different from each other.

(10)
The optical medium reproducing apparatus according to (1),
wherein in the optical medium, a land and a groove are alternately formed, and
an optical signal, which is recorded in the land and the groove as information, is reproduced.

(11)
The optical medium reproducing apparatus according to (1),
wherein the combination patterns are set in correspondence with a linear density of the optical medium.

(12)
The optical medium reproducing apparatus according to (10),
wherein the combination patterns are set in reproduction of the land and reproduction of the groove.

(13)
The optical medium reproducing apparatus according to (1),
wherein the optical medium is a multi-layer optical medium, and the combination patterns are set in correspondence with a reproduction layer.

(14)
The optical medium reproduction apparatus according to (1),
wherein the combination patterns are set in accordance with a state of a tap coefficient that is optimized by the adaptive equalizer.

(15)
The optical medium reproducing apparatus according to (14),
wherein in a system in which a sum or a difference of the detection signal of the first region and the detection signal of the second region is used, the first region and the second region being located in the tangential direction among the plurality of regions, an amplitude of a tap coefficient corresponding to a signal composed of the difference is set as an index.

(16)

An optical medium reproducing method, including:

dividing a luminous flux of light beams reflected from an optical medium into a plurality of regions including a first region and a second region which are different in a position in a radial direction and/or a tangential direction;

combining a plurality of detection signals in correspondence with the amount of light that is incident to each of the plurality of regions by a detection unit with combination patterns which are selected to form signals of a plurality of channels;

computing outputs of a plurality of equalizer units by a multi-input equalizer unit including the plurality of equalizer units to which the signals of the plurality of channels are respectively supplied, and outputting the resultant value as an equalization signal; and performing binarization processing with respect to the equalization signal by a binarization unit to obtain binary data, wherein a sum signal channel of the detection signal of the first region and the detection signal of the second region is included in at least one of the combination patterns.

(17)

The optical medium reproducing method according to (16), wherein the first region and the second region are disposed at positions different in the tangential direction.

(18)

The optical medium reproducing method according to (16), wherein a sum signal channel of the detection signal of the first region and the detection signal of the second region, and a difference signal channel of the detection signal of the first region and the detection signal of the second region are included in at least one of the combination patterns.

(19)

An optical medium in which a land and a groove are alternately formed, and information is recorded in both the land and the groove, wherein a linear density of the land is set to be higher than a linear density of the groove.

(20)

An optical medium that is reproduced by an optical medium reproducing apparatus, wherein the optical medium reproducing apparatus includes, a light source, an objective lens that allows a light beam emitted from the light source to condense onto an optical medium, a detection unit that divides a luminous flux of light beams reflected from the optical medium into a plurality of regions including a first region and a second region which are different in a position in a radial direction and/or a tangential direction, and combines a plurality of detection signals in correspondence with the amount of light that is incident to each of the plurality of regions with combination patterns which are selected to form signals of a plurality of channels, a multi-input equalizer unit that includes a plurality of equalizer units to which the signals of the plurality of channels are respectively supplied, computes outputs of the plurality of equalizer units, and outputs the resultant value as an equalization signal, and a binarization unit that performs binarization processing with respect to the equalization signal to obtain binary data, in the optical medium reproducing apparatus, an addition signal channel including a constant multiplication of a detection signal of the first region and a detection signal of the second region is included in at least one of the combination patterns, and an amplitude of a difference channel when reproducing a system, which uses a sum or a difference of the detection signal of the first region and the detection signal of the second region which are positioned in a position in the tangential direction among the plurality of regions, by using a reference drive, is in a predetermined range.

REFERENCE SIGNS LIST

13 Multi-input adaptive equalizer
14 Binarization detector
15 PR convolution unit
21 to 23 Adaptive equalizer unit
100 Optical disc
101 Optical pickup
105 Data detection processing unit

The invention claimed is:

1. An optical medium reproducing apparatus, comprising:
a light source;
an objective lens that allows a light beam emitted from the light source to condense onto an optical medium;
a detection unit that divides a luminous flux of light beams reflected from the optical medium into a plurality of regions including a first region and a second region which are different in a position in a radial direction and/or a tangential direction, and combines a plurality of detection signals in correspondence with the amount of light that is incident to each of the plurality of regions with combination patterns which are selected to form signals of a plurality of channels;
a multi-input equalizer that includes a plurality of equalizer circuits to which the signals of the plurality of channels are respectively supplied, computes outputs of the plurality of equalizer circuits, and outputs the resultant value as an equalization signal; and
a binarization circuit configured to perform binarization processing with respect to the equalization signal to obtain binary data,
wherein an addition signal channel including a constant multiplication of a detection signal of the first region and a detection signal of the second region is included in at least one of the combination patterns.

2. The optical medium reproducing apparatus according to claim 1,
wherein the first region and the second region are disposed at positions different in the tangential direction.

3. The optical medium reproducing apparatus according to claim 2,
wherein a sum signal channel of the detection signal of the first region and the detection signal of the second region, and a difference signal channel of the detection signal of the first region and the detection signal of the second region are included in at least one of the combination patterns.

4. The optical medium reproducing apparatus according to claim 1,
wherein the multi-input equalizer is set to a configuration of a multi-input adaptive equalizer, and
an initial value of a filter coefficient is changed in conjunction with change of the combination patterns.

5. The optical medium reproducing apparatus according to claim 1, wherein the multi-input equalizer is set to a configuration of a multi-input adaptive equalizer, and the optical medium reproducing apparatus further comprises an equalization error computation circuit that obtains an equalization error from an equalization target signal obtained on the basis of a binarization detection result in the binarization circuit, and the equalization signal output from the multi-input adaptive equalizer, and supplies the equalization error to the multi-input adaptive equalizer as a control signal for adaptive equalization.

6. The optical medium reproducing apparatus according to claim 5, wherein the multi-input adaptive equalizer performs partial response equalization processing with respect to an output signal, the binarization circuit performs maximum likelihood decoding processing as binarization processing with respect to the equalization signal of the multi-input adaptive equalizer, and the equalization error computation circuit obtains an equalization error through computation using an equalization target signal obtained through convolution processing of a binarization detection result obtained by the maximum likelihood decoding, and an equalization signal output from the multi-input adaptive equalizer.

7. The optical medium reproducing apparatus according to claim 5, wherein the multi-input adaptive equalizer performs partial response equalization processing with respect to an output signal, and selects a class of the partial response equalization processing in correspondence with setting of the combination patterns.

8. The optical medium reproducing apparatus according to claim 1, wherein the detection unit includes detectors which are divided in correspondence with the plurality of regions, and detection signals of the plurality regions are fetched from the photodetectors.

9. The optical medium reproducing apparatus according to claim 1, wherein an optical path conversion element for separation into the plurality of regions is disposed on an optical path that passes through the objective lens and reaches a detector, and a plurality of beams separated by the optical path conversion element are respectively input to detectors different from each other.

10. The optical medium reproducing apparatus according to claim 1, wherein in the optical medium, a land and a groove are alternately formed, and an optical signal, which is recorded in the land and the groove as information, is reproduced.

11. The optical medium reproducing apparatus according to claim 1, wherein the combination patterns are set in correspondence with a linear density of the optical medium.

12. The optical medium reproducing apparatus according to claim 10, wherein the combination patterns are set in reproduction of the land and reproduction of the groove.

13. The optical medium reproducing apparatus according to claim 1, wherein the optical medium is a multi-layer optical medium, and the combination patterns are set in correspondence with a reproduction layer.

14. The optical medium reproduction apparatus according to claim 1, wherein the combination patterns are set in accordance with a state of a tap coefficient that is optimized by the adaptive equalizer.

15. The optical medium reproducing apparatus according to claim 14, wherein in a system in which a sum or a difference of the detection signal of the first region and the detection signal of the second region is used, the first region and the second region being located in the tangential direction among the plurality of regions, an amplitude of a tap coefficient corresponding to a signal composed of the difference is set as an index.

16. An optical medium reproducing method, comprising:

dividing a luminous flux of light beams reflected from an optical medium into a plurality of regions including a first region and a second region which are different in a position in a radial direction and/or a tangential direction;

combining a plurality of detection signals in correspondence with the amount of light that is incident to each of the plurality of regions by a detection unit with combination patterns which are selected to form signals of a plurality of channels;

computing outputs of a plurality of equalizer circuits by a multi-input equalizer including the plurality of equalizer circuits to which the signals of the plurality of channels are respectively supplied, and outputting the resultant value as an equalization signal; and performing binarization processing with respect to the equalization signal by a binarization circuit to obtain binary data, wherein a sum signal channel of the detection signal of the first region and the detection signal of the second region is included in at least one of the combination patterns.

17. The optical medium reproducing method according to claim 16, wherein the first region and the second region are disposed at positions different in the tangential direction.

18. The optical medium reproducing method according to claim 16, wherein a sum signal channel of the detection signal of the first region and the detection signal of the second region, and a difference signal channel of the detection signal of the first region and the detection signal of the second region are included in at least one of the combination patterns.

* * * * *